US00RE48344E

(19) United States
(12) Reissued Patent
Weiland et al.

(10) Patent Number: US RE48,344 E
(45) Date of Reissued Patent: Dec. 8, 2020

(54) SLEEP SYSTEM

(71) Applicant: Sauder Manufacturing Co., Archbold, IN (US)

(72) Inventors: Blair Weiland, Fort Wayne, IN (US); Steven Stieglitz, Harlan, IN (US); Anthony J. Warncke, Archbold, OH (US); Martin J. Krause, Jr., Fort Wayne, IN (US); Joel D. Alberda, Leo, IN (US); Donald E. Newfer, Auburn, IN (US)

(73) Assignee: Sauder Manufacturing Co., Archbold, OH (US)

(21) Appl. No.: 15/697,747

(22) Filed: Sep. 7, 2017

Related U.S. Patent Documents

Reissue of:
(64) Patent No.: 9,125,496
Issued: Sep. 8, 2015
Appl. No.: 13/528,499
Filed: Jun. 20, 2012

U.S. Applications:
(63) Continuation-in-part of application No. 13/168,438, filed on Jun. 24, 2011, now Pat. No. 9,027,178.

(60) Provisional application No. 61/358,699, filed on Jun. 25, 2010.

(51) Int. Cl.

| | |
|---|---|
| ***A47C 17/165*** | (2006.01) |
| ***A47B 83/04*** | (2006.01) |
| ***A47C 7/50*** | (2006.01) |
| ***A47C 17/62*** | (2006.01) |
| ***A47C 17/16*** | (2006.01) |

(52) U.S. Cl.
CPC ..... *A47C 17/165* (2013.01); *A47B 83/04* (2013.01); *A47C 7/506* (2013.01); *A47C 7/5068* (2018.08); *A47C 17/163* (2013.01); *A47C 17/1655* (2013.01); *A47C 17/62* (2013.01)

(58) Field of Classification Search
None
See application file for complete search history.

(56) References Cited

U.S. PATENT DOCUMENTS

| | | | | |
|---|---|---|---|---|
| 481,385 | A * | 8/1892 | Barger | 5/2.1 |
| 1,426,463 | A * | 8/1922 | Coopersmith | A47C 17/48 5/12.1 |
| 2,028,426 | A | 1/1936 | Wunderlich | |
| 2,295,083 | A | 9/1942 | Jonassen | |
| 2,330,059 | A | 9/1943 | Krakauer | |
| 2,426,097 | A * | 8/1947 | Heller | A47B 23/02 126/30 |
| 2,435,936 | A | 2/1948 | Wilson | |
| 2,437,949 | A | 3/1948 | Fox | |

(Continued)

FOREIGN PATENT DOCUMENTS

| | | | |
|---|---|---|---|
| FR | 2652250 | A2 * | 3/1991 |
| GB | 2172798 | A * | 10/1986 |
| GB | 2277679 | A * | 11/1994 |

*Primary Examiner* — Glenn K Dawson
(74) *Attorney, Agent, or Firm* — McGarry Bair PC

(57) ABSTRACT

A furniture system (600) includes an inner back (620) and a conversion mechanism (800) which operates so as to move the inner back (620) from a sofa configuration to a sleep configuration. A table assembly (700) is also provided which utilizes a table mechanism (710) so as to permit a user to manually adjust the height of a table top (701) among three functional positions.

24 Claims, 76 Drawing Sheets

(56) References Cited

U.S. PATENT DOCUMENTS 2,564,512 A * 8/1951 Specht ..... 5/2.1
2,634,429 A 4/1953 Hopeman
2,672,626 A 3/1954 Watt
2,692,639 A * 10/1954 Genovese ..... A47C 13/00 297/105
2,714,729 A 8/1955 Bohnsack
2,899,691 A * 8/1959 Davis et al. ..... A47C 17/36 5/18.1
2,028,105 A 3/1960 Bohnsack
2,957,185 A * 10/1960 Barrett ..... A47C 17/14 5/59.1
2,997,723 A * 8/1961 Nicassio ..... A47C 17/36 5/2.1
3,048,855 A * 8/1962 Frank ..... 5/7
3,069,699 A * 12/1962 Lande ..... A47C 17/16 5/59.1
3,301,736 A * 1/1967 Smith ..... B29C 49/26 118/306
3,341,198 A * 9/1967 Turpin, Sr. ..... A63D 15/04 297/163
3,811,728 A * 5/1974 Redemske ..... A47B 83/00 297/440.14
3,913,973 A * 10/1975 Mintz ..... A47C 17/62 16/34
4,048,680 A 9/1977 Rogers
4,104,747 A 8/1978 Bell
D321,797 S 11/1991 Paris
5,088,135 A * 2/1992 Violette ..... A47C 17/34 297/146
5,104,182 A * 4/1992 Rasnick ..... A47C 7/62 297/113
D326,367 S 5/1992 Messina
5,224,228 A 7/1993 Larrimore
5,280,656 A * 1/1994 Gossett ..... A47C 17/04 297/118
5,303,976 A * 4/1994 Nobile ..... A47C 7/62 297/146
5,531,506 A * 7/1996 Scott ..... A47C 7/68 297/125
5,601,348 A * 2/1997 Minkovski ..... A47B 83/04 108/42
5,621,930 A * 4/1997 Reppas et al. ..... 5/136
5,695,239 A 12/1997 Johnson
5,754,995 A * 5/1998 Behrendt ..... A47B 85/00 312/240
6,109,189 A * 8/2000 Tarver ..... A47K 4/00 108/147.2
6,508,526 B2 * 1/2003 Reppas et al. ..... 312/237
6,604,471 B1 * 8/2003 Tarver, Jr. ..... B61D 31/00 108/35
6,637,812 B2 * 10/2003 Laughlin ..... A47C 4/02 297/118
6,651,274 B2 11/2003 Swihart
6,779,208 B2 * 8/2004 Lim et al. ..... 5/136
6,904,628 B2 6/2005 Murphy
6,934,979 B2 8/2005 Swan
D555,383 S 11/2007 Borgonovo
7,549,182 B2 6/2009 Murphy
7,607,180 B2 10/2009 Griepentrog
7,770,965 B2 * 8/2010 Zwezdaryk ..... A47C 15/008 128/845
8,616,630 B1 * 12/2013 Midkiff ..... A47B 83/02 108/44
9,027,178 B2 * 5/2015 Wieland ..... A47C 7/506 5/2.1
2004/0195798 A1 10/2004 Newfer
2005/0267900 A1 12/2005 Ahmed
2007/0136952 A1 6/2007 Sargent
2008/0148478 A1 6/2008 Patella
2010/0264791 A1 * 10/2010 Rajeswaran ..... A47B 83/00 312/237
2012/0131745 A1 5/2012 Wieland
2015/0067963 A1 * 3/2015 Grimoldi ..... A47C 17/165 5/37.1
2016/0051047 A1 * 2/2016 Natuzzi ..... A47B 5/04 297/65

* cited by examiner

SLEEP SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part of U.S. patent application Ser. No. 13/168,438 filed Jun. 24, 2011, and incorporated by reference herein, and which claims priority of U.S. Provisional Patent Application Ser. No. 61/358,699, filed Jun. 25, 2010 and incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to furniture systems having the capability of converting between sofa and sleep surface configurations and, more particularly, furniture systems which may be adapted to healthcare environments for providing various environmental applications additional to sleeping and sitting, and providing such applications within a relatively small footprint.

2. Background Art

Various furniture systems are known in the prior art which include the capability of converting between differing types of furniture configurations. For example, it is known in the art to provide for the capability of converting a furniture system in the form of a sofa to one which provides for a bed or other sleep surface. However, many of the known systems have various disadvantages associated with their conversions between sofa and sleep surface configurations. A number of convertible furniture systems include components which are useful with respect to only one of the configurations. Some of these systems include "fold out" components which provide for bed surfaces when the furniture system is in a sleep surface configuration, but do not require the bed surface component for any useful purpose when the furniture system is in the sofa configuration.

Still further, a number of convertible furniture systems include back supports which are used when the furniture system is in a sofa configuration. However, when the known furniture systems are in a sleep surface configuration, the back support is retained in the same position as in the sofa configuration, and serves no useful purpose in the sleep surface configuration.

Also, it is not uncommon for known systems to require either forward or rearward movement of various furniture components when the known furniture system is moved from a sofa configuration to a sleep configuration. These forward and/or rearward movements can cause space difficulties with respect to placement of the furniture system. For example, forward encroachment of one or more of the furniture system components into a room can result in prevention of the furniture system being placed in a convenient location.

Still further, many of the known convertible furniture systems include relatively complex linkages for movement of various furniture components during conversion. The complexity of these linkages can result in substantial expense and are often relatively more subject to breakdown or damage. In addition, some linkages can present potential safety hazards. More specifically, complex linkages associated with known convertible furniture systems often include dangerous "pinch points" which can exist during linkage movement. Safety hazards associated with such linkage pinch points are exacerbated when the linkages are normally visible and physically accessible to children or others.

As an example of known convertible systems, Murphy, et al, U.S. Pat. No. 6,904,628 generally describes a sofa bed having a frame with opposing arms, and a seat. A subseat is hinged to the seat, and a connecting rod pivotably interconnects the subseat and the backrest. Pairs of center legs and end legs are pivotably attached to the subseat and seat, respectively. Mechanisms are provided for folding and unfolding the center and the end legs. The configuration includes a leg-folding mechanism which is pivotably interconnected with the center and the end legs. The frame, backrest, seat and subseat are configured so that the backrest, seat and subseat move from a folded position to an unfolded position. In the folded position, the backrest is generally upright, the seat is generally horizontal and the subseat is positioned beneath the seat in a first inverted orientation. In the unfolded position, the backrest, subseat and seat are generally horizontal, and the subseat is positioned between the backrest and the seat in a second non-inverted orientation. The leg-folding mechanism includes a center leg mechanism and an end leg mechanism. The center leg is pivotably interconnected with the subseat at a second pivot, with the second pivot being rearward of a first pivot when the sofa bed is in an unfolded position. The center leg mechanism includes a brace which is pivotably connected with the center leg and with the seat. The subseat and the seat are interconnected by means of a hinge. The hinge includes a subseat plate fixed to the subseat. The center leg is pivotably interconnected to the subseat plate at the second pivot.

Patella, U.S. Patent Application Publication No. 2008/0148478 describes a sofa bed having a base structure with a series of mutually hinged frames. The frames are supported by the base structure and support a series of padding elements. A kinematic mechanism is utilized to change the positions of the frames. The base structure includes a set of small legs, a spacer and a hinge plate consisting of two flat surfaces. The hinge plate is fixed on the small leg which consists of two flat surfaces with a rectangular hole. The hole is tapped on one side to lodge the spacer. An assembly procedure removes the clearance in the coupling between the hinge and the spacer, and obtains a perpendicular configuration between the spacer and the small leg.

Murphy, U.S. Pat. No. 7,549,182 discloses a seating unit having a frame and backrest section, with the backrest section having a cushion. Body, hinge and foot sections share a common cushion, and a folding mechanism includes a series of pivotably interconnected links which are configured so as to move the backrest, body, hinge and foot sections between folded and unfolded positions. In the unfolded position, the backrest, body, hinge and foot sections are horizontally disposed and serially aligned. The backrest cushion and the common cushion face upwardly. In the folded position, the backrest section is upright, with the backrest cushion facing forwardly. The body section is horizontally disposed, and the foot section overlies the body section. The hinge section is vertically disposed and extends between the body and foot sections. The common cushion is folded upon itself. A portion of the common cushion overlying the body section and a portion of the common cushion underlying the foot section are compressed against each other. In addition, the body, hinge and foot sections each include a panel. A fixed support hinge includes a flexible sheet member which is fixed to the body and hinge section panels. A second support hinge which includes a flexible sheet member is fixed to the hinge and foot section panels.

In addition to providing for a furniture system having the capability of converting between sofa (or sitting) and sleep configurations, it would also be advantageous to provide a furniture system for providing other functional applications within its own structural framework. For example, hospitals were previously constructed with patient rooms having two, four or even more beds. Spatial requirements would often be somewhat of an issue, although the costs of building space were substantially lower in the past, relative to today's building space costs. Today, hospitals are almost universally moving to single occupancy rooms. Whether in single or multiple-occupancy rooms, all such rooms much provide appropriate space so that the normal functions associated with the patients' rest, recovery and care are achieved safely and within an efficient space.

Still further, and in accordance with today's knowledge regarding patients after-care and recovery following illnesses, operations and the like, it is important to promote social interaction between patients and their families and friends. In this regard, it is advantageous to provide a spatial environment within patient rooms which is comfortable for visiting family members and friends. In fact, it is particularly advantageous if the patient rooms can essentially serve as a "family room" for all those who come to visit and care for the ailing patient. However, for efficiency and in view of building costs, today's single occupancy rooms tend to be relatively smaller in size than patient rooms constructed in the past. Further, however, notwithstanding that the patient rooms may be smaller, efficiency and safety require careful room planning and strict adherence to "clearance" requirements for patients and medical staff That is, all of the furniture associated with the patient room must provide for safe and "quick" passage around the furniture, not only for persons, but also for movement of equipment and the like.

As earlier mentioned, hospitals recognize the relatively high value of including family members and close friends fully in the patient recovery process. To achieve this inclusion, hospitals much "embrace" the family and their needs in new and imaginative ways in these newer single occupancy and smaller footprint rooms. Such imagination requires creativity in furniture design beyond the conventional. For example, it is relatively well known and clear that it is advantageous to provide visiting family and friends with comfortable places to sit. However, beyond the need for such furniture, family and friends often also need a place to "desk." That is, it would be advantageous for the family and friends to have efficient means and structure to use a laptop, write letters, place phone calls and use other electronic devices. In addition, desking provides for the capability of comfortably eating meals, or otherwise just having a place to put personal items (such as a purse) or various decorations (vases of flowers, etc.).

In addition to the foregoing, the healthcare industry has also recognized that encouraging overnight stays of family members both facilitates patient recovery, and also can aid in providing staff with a measure of relief. Accordingly, it would be advantageous if furniture systems used in the single occupancy rooms could also include sleep surfaces. With respect to all of the foregoing, there are presently few, if any, comprehensive solutions for this combination of structural and functional needs to be met within today's hospital facilities.

SUMMARY OF THE INVENTION

In accordance with the invention, an efficient and comfortable seating unit is incorporated within a furniture system which may be adapted for use in hospital patient rooms or other building structures where it is advantageous to provide a number of environmental functions, within relatively small footprints. In this regard, the invention includes a seating unit as a foundation, to which structure has been added which provides for desking and sleeping in one furniture unit having relatively efficient spatial requirements. The furniture system essentially acts as a virtual "family unit" within a confined space, such as a hospital patient room. In accordance with certain aspects of the invention, the furniture system requires a relatively small and compact footprint which does not encroach on "working space" of a hospital room. Accordingly, medical staff can readily move about the hospital room, even in emergency situations, while family members can still remain in the room in a manner where they are not interfering with staff movement. The furniture system in accordance with the invention includes convenient seating, while also providing for working space. Still further, in accordance with certain aspects of the invention, the furniture system can be readily converted from a seating position to a sleeping configuration.

In accordance with various other aspects of the invention, the system can provide for integrated seating, work surface/desking, and sleeping configurations. Still further, in accordance with other aspects of the invention, the furniture system can include integrated footrests and integrated storage areas. In accordance with certain other advantages of the invention, the conversion from a seating position to a sleep configuration can occur within the structure's own footprint. In accordance with other aspects of the invention, the sleep surface can be separate from the seating surface. Still further, the conversion mechanisms for configuring and reconfiguring the furniture system can be concealed, such as within arms of the furniture system. The seating configurations can include multiple positions, such as forward and sideways positions. Still further, the work surface or desk associated with the furniture system in accordance with the invention can be converted, without the necessity of moving the work surface or desk out into the patient room.

In accordance with certain aspects of the invention, the sleep system assembly is convertible between various environmental applications. The assembly includes a supporting frame with a seat having an upper surface on which a user may sit when the assembly is in a sofa or sitting configuration. At least one linkage mechanism is provided, with the linkage mechanism directly or indirectly connected to the frame, and adapted to move the sleep system assembly between the sofa configuration and others of the environmental applications. A desk is positioned forwardly and extends in a horizontal plane when the sleep system assembly is in the sitting configuration.

In accordance with other aspects of the invention, the environmental applications include at least the sitting configuration, a sleeping configuration and a desking configuration. A footprint of the assembly is maintained as a predetermined footprint independent of the particular environmental application of the assembly at any given time. A back support is provided within the sofa configuration. The linkage mechanism is hidden from view at all times during operation and stationary position of the assembly.

The assembly is specifically adaptable between the sleep configuration and a desking application, and is also convertible between the sleep configuration and sitting configuration, and the sitting configuration and the desking application. The work surface can be coupled to a back front surface. The work surface moves in unison with the back front surface when the assembly is moving between configurations. When the assembly is in the sleep configuration, the work surface is in a vertically oriented configuration. The work surface can be converted between an operable position and a non-operable position, without the necessity of moving outside of a footprint of the sleep system assembly when in either of the positions.

The work surface is positioned so as to not extend forwardly beyond a front vertical plane of the entirety of the assembly. The work surface is capable of being stored between opposing seats of the assembly when the assembly is in the sleep configuration. In the sleep configuration, the work surface is fitted within opposing seats of the assembly.

When the assembly is in the sitting configuration, the assembly comprises pairs of bases and seats, configured so as to provide a spatial interior area between lateral sides of the seats and bases, with the seats and bases facing each other. When in this configuration, and users are seated on the seats, the users can position their legs forwardly of a front vertical plane of the assembly or, alternatively, can position their legs in a sideways orientation, with their legs extending into the interior spatial area.

In accordance with other aspects of the invention, the assembly comprises at least one integrated storage area. The assembly can also comprise at least one integrated footrest, with lever means for manipulating the footrest. Further, the work surface can be centered laterally between seats of the assembly, with a width which is smaller than the width of the spatial interior area.

BRIEF DESCRIPTION OF THE SEVERAL VIEWS OF THE DRAWING

The invention will now be described with reference to the drawings, in which.

DETAILED DESCRIPTION OF THE INVENTION

Figure 1:
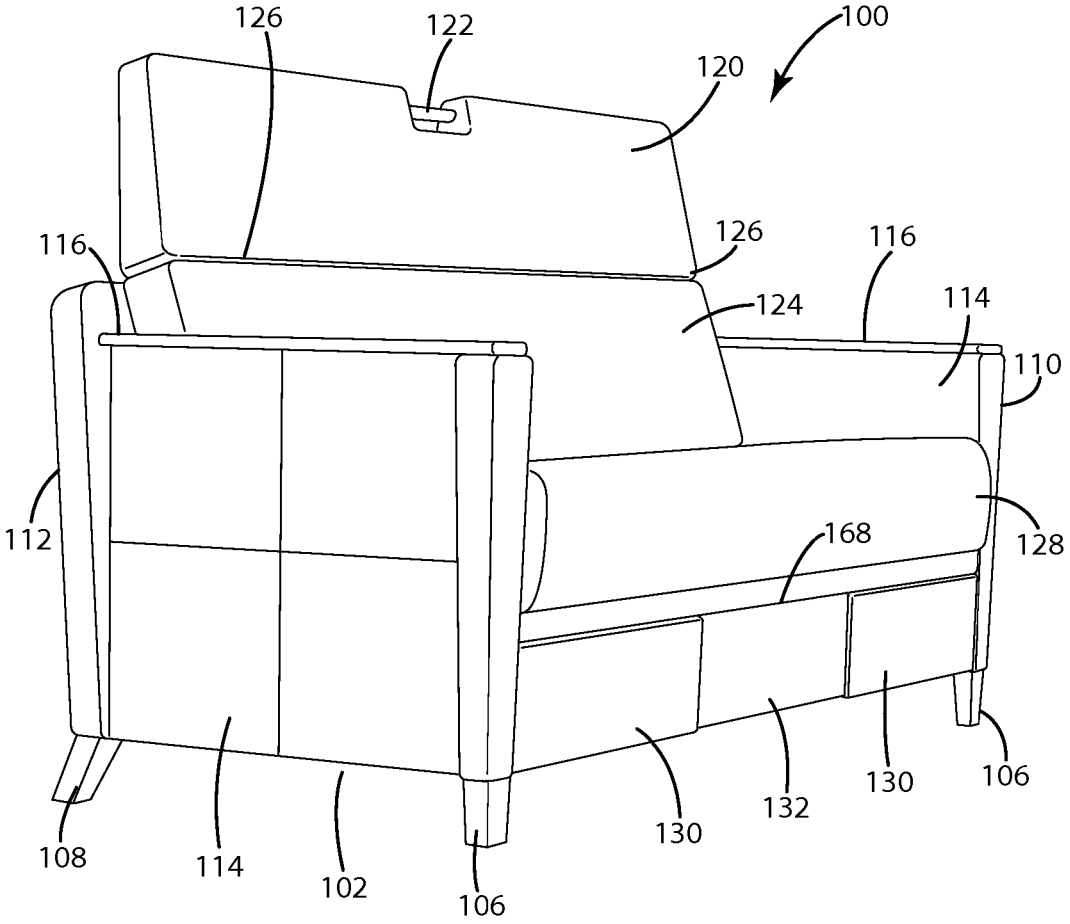
FIG. 1 is a left-side perspective view of a first embodiment of a furniture system, with the furniture system illustrated in a sofa configuration, and having one or more retracted ottomans and a retracted drawer.

The principles of the invention are disclosed, by way of example, with respect to a series of embodiments of furniture systems in accordance with the invention, as described herein and illustrated in FIGS. 31-54. Furniture systems in accordance with the invention have the capability of converting what is characterized as a "sofa" or "seat" or "sitting" configuration, to a "bed" or "sleep surface" or "sleep" configuration. Although example embodiments of linkage mechanisms are disclosed herein for purposes of converting the furniture systems between the configurations, it should be emphasized that furniture systems in accordance with various principles of the invention are not limited to any specific type of linkage mechanism. That is, various linkage mechanisms can be utilized without departing from the primary novel concepts of the invention. The furniture systems in accordance with the invention provide a highly efficient and compact seating unit as a foundation, and that includes the combination and addition of structures to meet the needs of "desking" and sleeping into a single space-efficient furniture unit. With such a unit, a virtual "family room" can be provided within a confined space, such as a hospital patient room. In addition, furniture systems in accordance with certain aspects of the invention, and as disclosed in the embodiments herein, can include integrated footrest and storage facilities, as well as multiple seating positions. Further, the desking or work surface areas can be positioned in functional configurations, without such work surfaces extending outwardly from the basic footprint of the furniture system. These and other aspects of the invention will be made apparent from the furniture systems embodied within FIGS. 31-54 and described in the following paragraphs.

For purposes of providing a full and detailed description of furniture systems in accordance with the invention as illustrated in FIGS. 31-54, example furniture systems utilizing linkage mechanisms to convert the systems between sofa and sleep configurations are described herein and illustrated in FIGS. 1-30. These systems illustrated in FIGS. 1-30 and described herein were previously described in a commonly owned provisional patent application titled "SLEEP SYSTEM MECHANISM" filed Dec. 14, 2009, and identified as U.S. Provisional Patent Application Ser. No. 61/286,285. In addition, certain concepts associated with the use of a table or desk associated with the sleep system assembly were disclosed and claimed in U.S. patent application Ser. No. 13/168,438 filed Jun. 24, 2011. The '438 patent application claims priority of the aforedescribed '285 provisional patent application. Further, the present application is a continuation-in-part of the '438 patent application. Furniture system 100 and other related furniture systems are disclosed herein in the immediately following paragraphs. Thereafter, a sleep system or furniture system 600 is disclosed, which forms an embodiment of the invention. It should be apparent that the invention relates at least in part to concepts associated with the use of a table or desk with the furniture system, with the table or desk having adjustment capabilities. Further, various concepts associated with mechanisms for conversion of furniture systems between sofa configurations and sleep configurations are also set forth herein.

Figure 2:
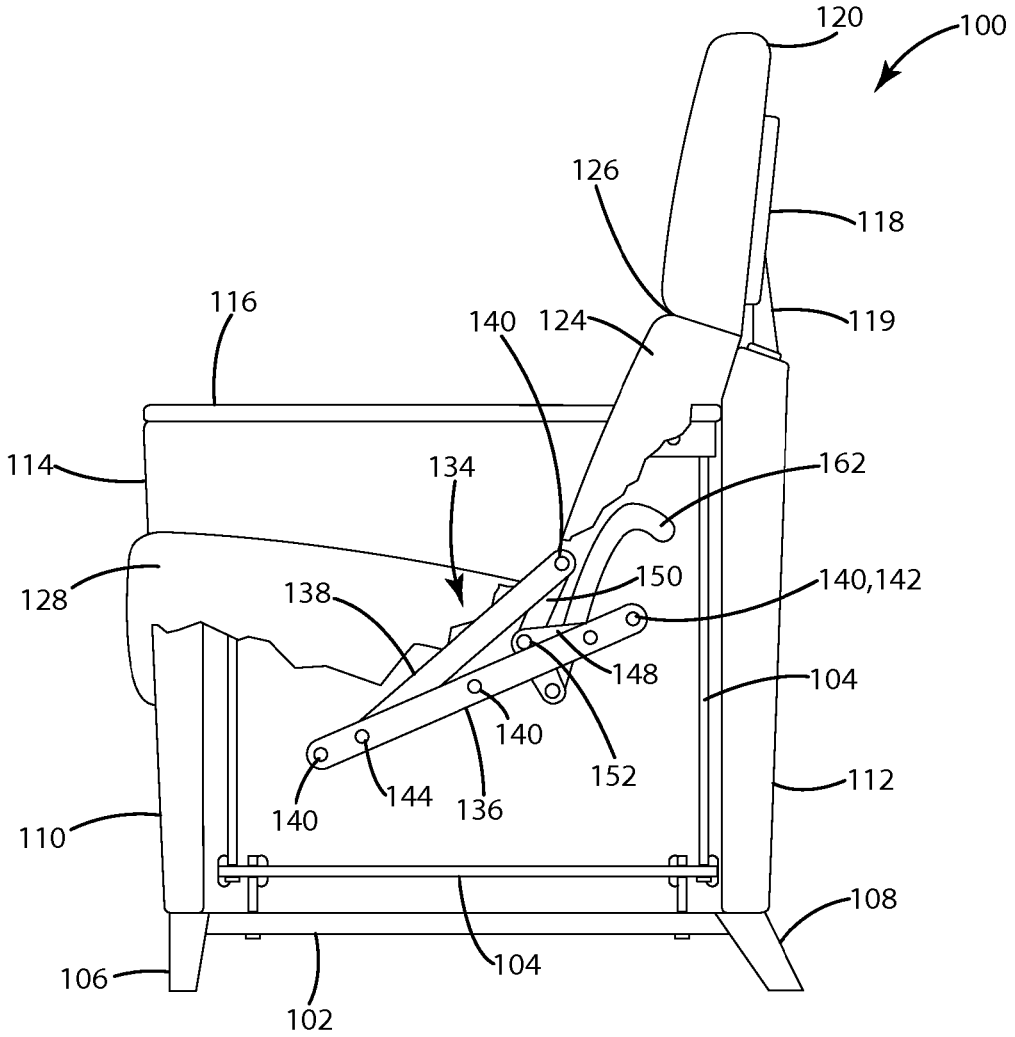
FIG. 2 is a right-side elevation view of the first embodiment of the furniture system shown in FIG. 1, and showing a portion of the right-side of the furniture system cut away so as to illustrate one of the sleep system linkage mechanisms used with the furniture system.
Figure 3:
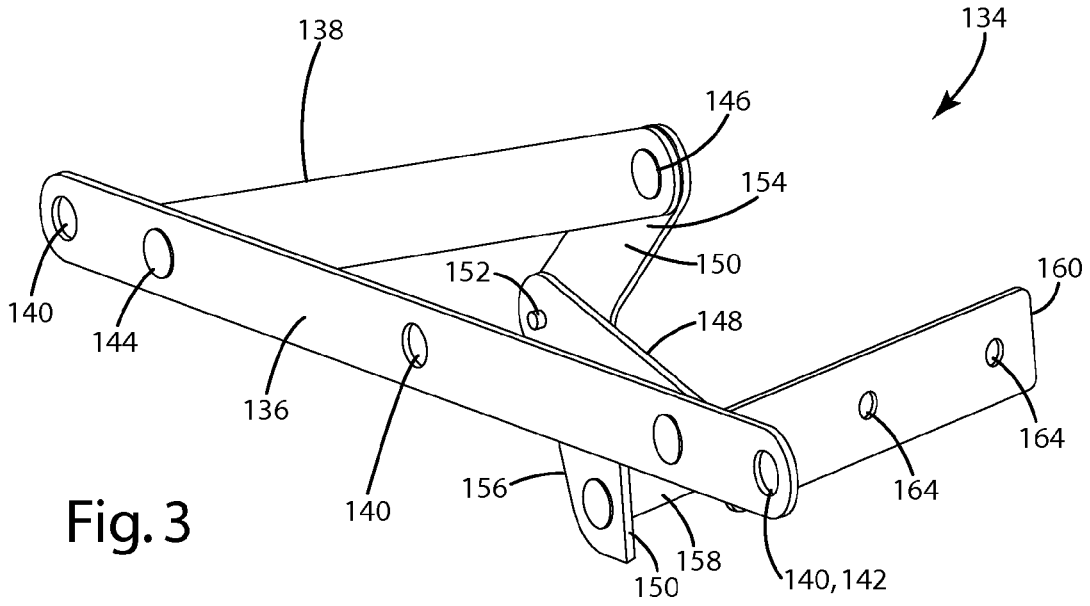
FIG. 3 is a forward, perspective view of the sleep system linkage mechanism illustrated in FIG. 2.
Figure 4:
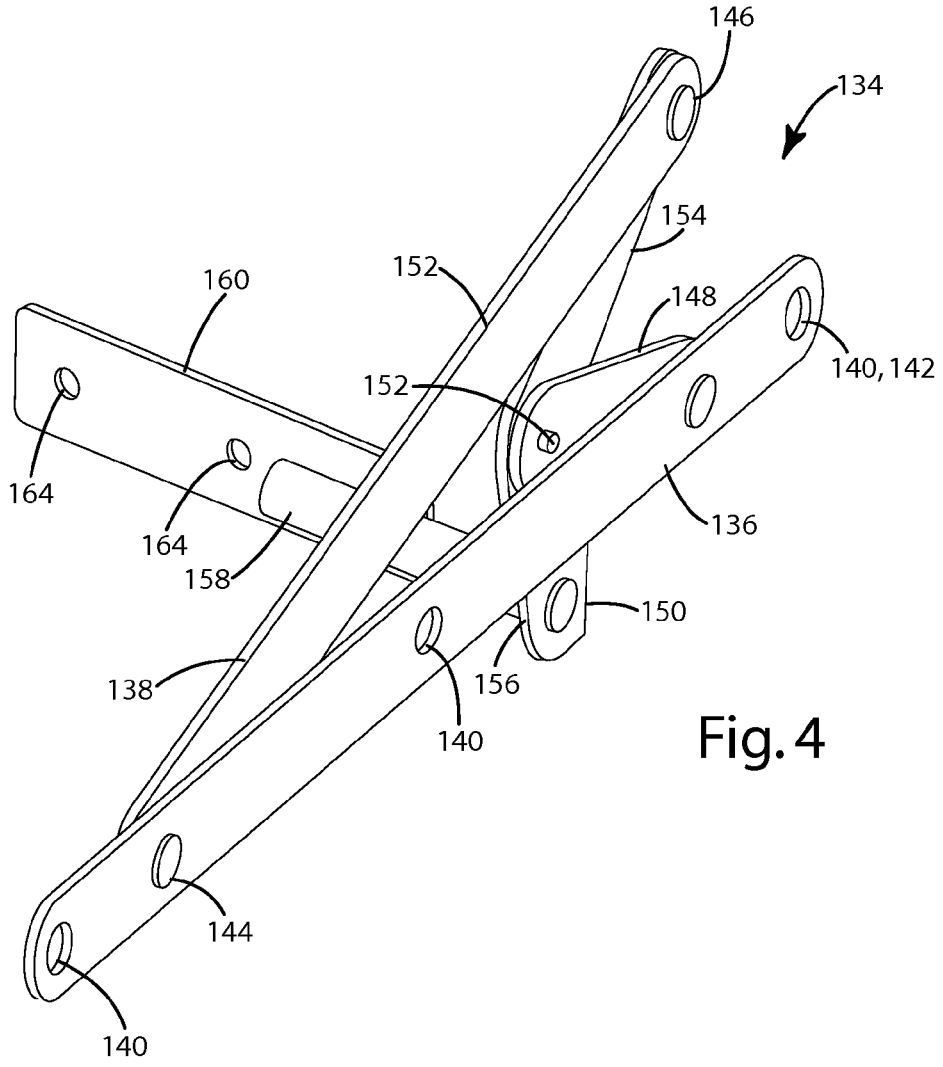
FIG. 4 is a perspective view of the linkage mechanism shown in FIG. 3, rotated 90 degrees in a horizontal plane relative to FIG. 3.
Figure 5:
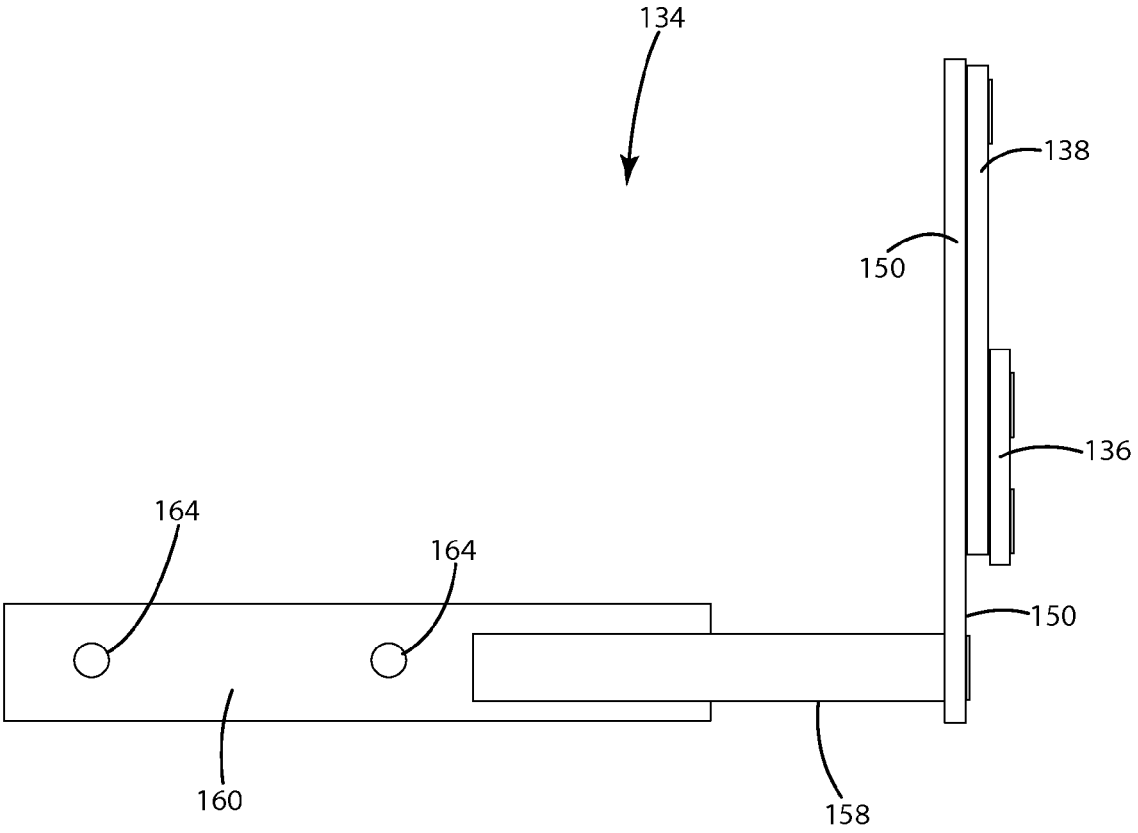
FIG. 5 is a front, elevation view of the linkage mechanism shown in FIG. 4.
Figure 6:
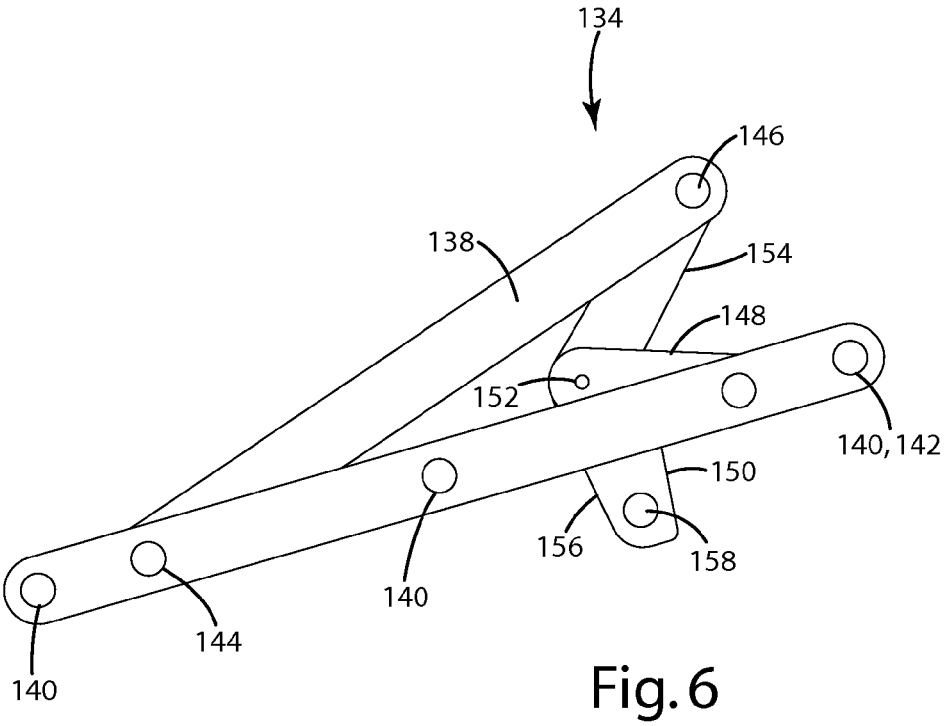
FIG. 6 is a side, elevation view of the linkage mechanism shown in FIG. 5, and illustrating the mechanism in a configuration corresponding to the furniture system being in a sofa configuration.
Figure 7:
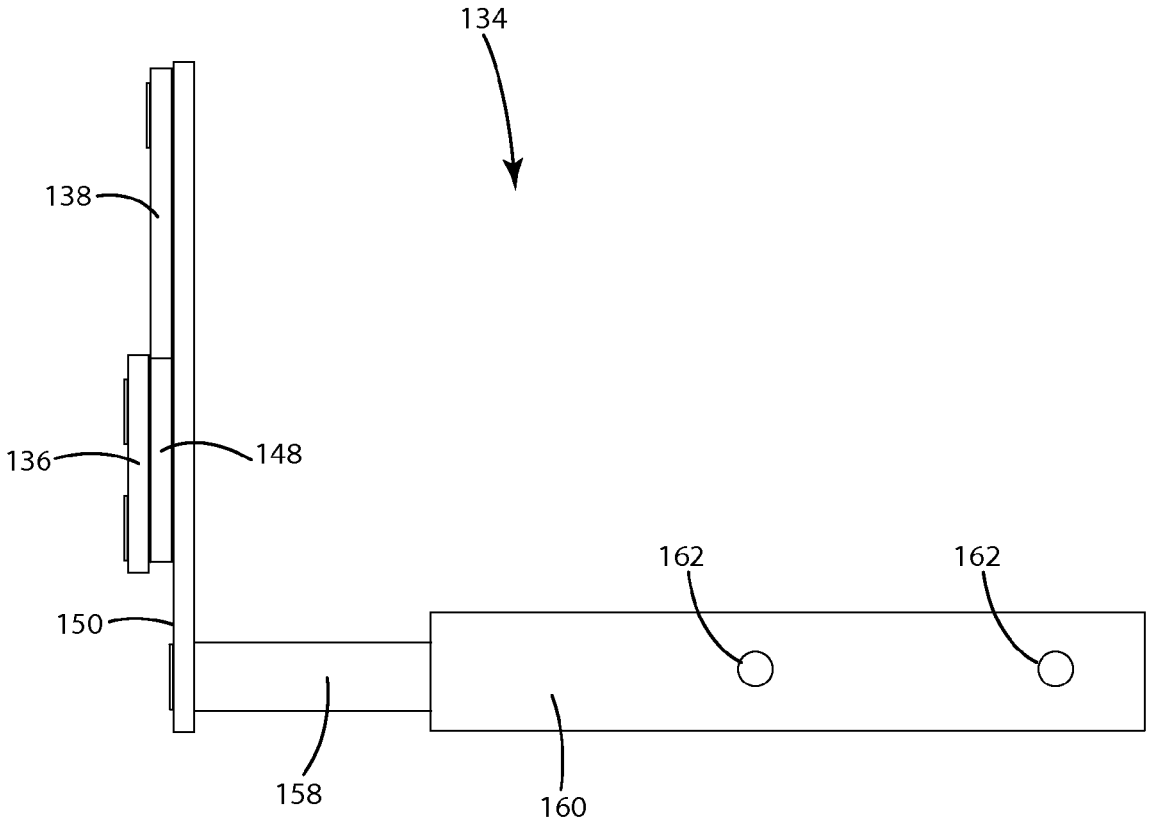
FIG. 7 is a rear, elevation view of the linkage mechanism shown in FIG. 6.
Figure 8:
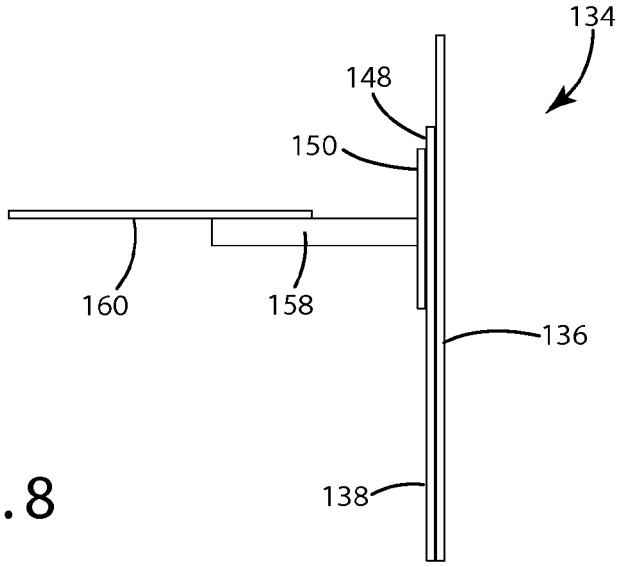
FIG. 8 is a view which can be characterized as a plan view of the linkage mechanism shown in FIG. 7.

Turning first to FIGS. 1 and 2, FIG. 1 illustrates the furniture system 100 in a left-side perspective view. In FIG. 1, the system 100 is shown in the "sofa" configuration. Correspondingly, FIG. 2 is a side, elevation and partially "cut away" view of the furniture system 100 shown in FIG. 1, again with the system in a sofa configuration. As shown in these illustrations, the furniture system 100 can include a lower base 102 having any of a number of various configurations. The lower base 102 is connected to other structural components through a connecting frame 104. The base 102 and connecting frame 104 can be structured in any of a number of various configurations. Integral with or otherwise secured to the lower base 102 are a series of front legs 106 and rear legs 108 (only one of the rear legs 108 being shown in FIGS. 1 and 2). Upstanding adjacent the front legs 106 are a pair of front corners 110. Located at the rear of the furniture system 100 and extending upwardly from the rear legs 108 is a stationary furniture back 112. Secured to the front of the stationary furniture back 112 adjacent the lateral edges thereof are a pair of sides 114. The sides 114 extend forwardly and can include corresponding arms or armrests 116 positioned on the top of the sides 114.

For purposes of strength and support, the furniture system 100 can also include a stationary high back support 118 extending upwardly from the stationary furniture back 112. The stationary high back support 118 can be positioned above the stationary furniture back 112 and secured through the use of a pair of support mounts 119. The overall shape and structural configuration of the stationary high back support 118, support mounts 119, and stationary furniture back 112 are best illustrated in drawings which show furniture system embodiments in a sleep or bed configuration, such as FIG. 16.

As further shown in FIGS. 1 and 2, the furniture system 100 also includes a movable high back cushion 120. The movable high back cushion 120, with the system 100 in a sofa configuration, can rest against the stationary high back support 118 as expressly shown in FIG. 2. The movable high back cushion 120 can include a handle 122 accessible to the user. As described subsequently herein, a user can be positioned in the front of the furniture system 100 and can pull forwardly on the handle 122 so as to initiate movement of the system 100 from a sofa configuration to a sleep or bed configuration. Coupled to the movable high back cushion 120 at the lower portion thereof is an intermediate back cushion 124. As shown in the drawings, the intermediate back cushion 124 can be somewhat angled relative to vertical when the system 100 is in the sofa configuration. Coupling between the movable back cushion 120 and the intermediate back cushion 124 can be provided through the use of a fabric hinge 126. The fabric hinge 126 can be configured so as to secure together the back cushion 120 and back cushion 124, while allowing some relative movement there between when the furniture system 100 is moved from the sofa configuration to the sleep or bed configuration. In addition to the foregoing components, the furniture system 100 also includes a seat cushion 128, shown in both FIGS. 1 and 2. As will be apparent from further description herein, the seat cushion 128 remains stationary during conversion movement of the furniture system 100 between the sofa configuration and the bed or sleep surface configuration.

In addition to the foregoing components of the furniture system 100, the system 100 can include one or a pair of extendable and retractable integrated ottomans 130. The ottomans 130 are shown in a retracted configuration in FIG. 1, and are positioned below the seat cushion 128 on opposing sides of the system 100. The ottomans 130 will be subsequently described herein, primarily with respect to FIGS. 25, 26 and 27. In addition to the ottomans 130, the furniture system 100 can also include an extendable and retractable drawer 132. As shown in FIG. 1, the drawer 132 can be located below the seat cushion 128 and intermediate the ottomans 130. FIG. 1 illustrates the drawer 132 in a retracted position.

The furniture system 100 can also include a pair of linkage mechanisms 134. FIG. 2 illustrates one of the linkage mechanisms 134. The structure and functional operation of the linkage mechanisms 134 will be described in subsequent paragraphs herein with respect to FIGS. 2-14. The drawings illustrate only one of the linkage mechanisms 134, and the subsequent description herein will primarily be directed only to a single linkage mechanism 134. However, both of the linkage mechanisms 134 will operate in tandem and are structurally and functionally equivalent.

Each of the linkage mechanisms 134 is configured and packaged so as to exist within the interiors of each of the sides 114 below the arms 116. Positioning the linkage mechanisms 134 in these "hidden" interiors essentially eliminates a safety hazard which exists with respect to other linkage systems which may have physically accessible "pinch points" and other structures of potential harm.

Turning to the details of the example embodiment of the linkage mechanisms 134, reference is first made to FIGS. 2-10. FIG. 2, as earlier described, illustrates one of the linkage mechanisms 134 as coupled to the furniture system 100 and secured within one of the sides 114. FIGS. 3-10 illustrate the linkage mechanism 134 in a "stand alone" configuration, with each of the illustrations showing the linkage mechanism 134 in various orientations. In each orientation, the linkage mechanism 134 is illustrated in the configuration shown in FIG. 2, which corresponds to the furniture system 100 being in a sofa configuration. The linkage mechanism 134 includes a mechanism base plate 136 having an elongated configuration as illustrated in each of FIGS. 2-10. The mechanism base plate 136 essentially remains stationary during functional operation of the linkage mechanism 134 as the furniture system 100 moves between the sofa position and the sleep or bed position. The mechanism base plate 136 is fixedly secured to the inner portion of a corresponding side 114 at frame connection points 140. As shown initially in FIG. 2, the mechanism base plate 136 includes three frame connections points 140. The connection points are essentially located at the ends of the base plate 136 and one connection point 140 is located adjacent the center area of base plate 136. For purposes of having the base plate 136 "stand away" from the side 114, the base plate 136 can be secured to the furniture system side 114 at the frame connection points 140 through a series of three plastic spacer bushings having flat head bolts (and associated T-nuts) inserted therethrough. As an example of sizing, the plastic spacer bushings can be 0.80 inches thick, with the bolts each being 5/16 inches in size. In addition to the foregoing, the plastic spacer bushing which is associated with the frame connection point 140 located at one end of the base plate 136 is identified not only with a numerical reference 140, but with numerical reference 142. The plastic spacer associated with this particular connection points 140, 142 will function as a stop for the linkage 148 (shown in FIG. 14) when the furniture system 100 is moved to a sleep position. It should be noted that FIG. 2 is illustrating the system 100 in the sofa position.

In addition to the mechanism base plate 136, the linkage mechanism 134 also includes a primary mechanism lever 138 having an elongated configuration as also shown in FIGS. 2-10. Front and rear views of the primary mechanism lever 138 can best be seen in FIGS. 6 and 9. The primary mechanism lever 138 has an elongated configuration and is pivotably coupled to the mechanism base plate 136 at a mechanism hinge point 144. The primary mechanism lever 138 can be characterized as one of two moving levers which govern the path of the intermediate back cushion 124 during movement in converting between sofa and bed or sleep surface configurations. With the primary mechanism lever 138 pivotably coupled at one end to the mechanism base plate 136 at mechanism hinge point 144, the opposing terminating end includes a pivot connection referenced as the main hinge point 146. The primary mechanism lever 138 can be characterized as linking this main hinge point 146 to the sofa frame or side 114 through the mechanism base plate 136.

Figure 9:
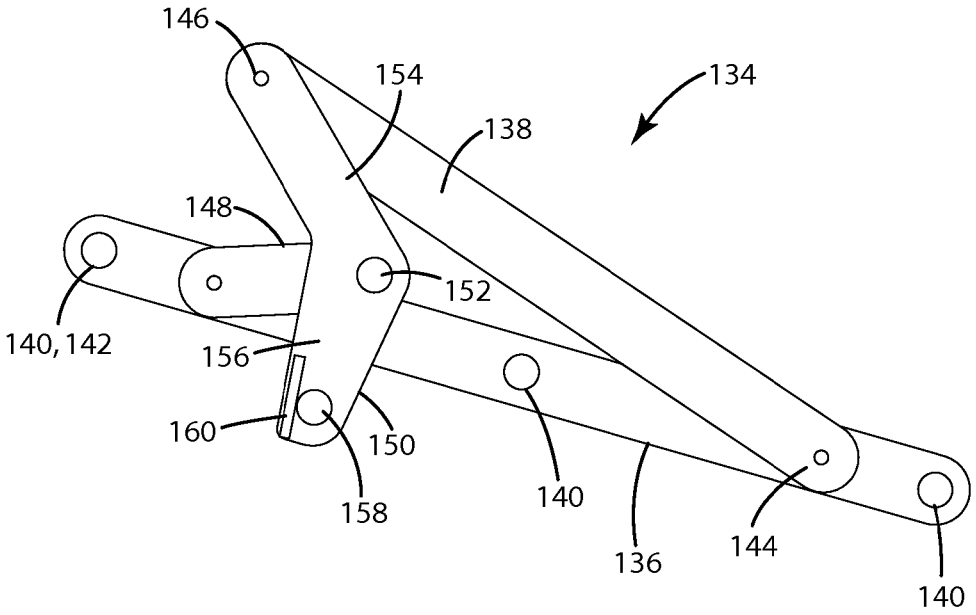
FIG. 9 is a side, elevation view of the linkage mechanism shown in FIG. 8, with the view directly opposing the side, elevation view of the linkage mechanism shown in FIG. 6.
Figure 10:
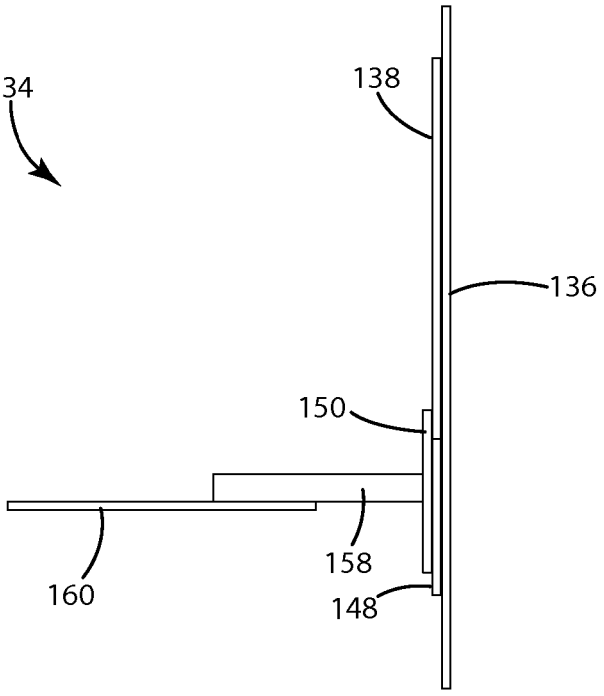
FIG. 10 is an underside view of the linkage mechanism shown in FIG. 9.

The linkage mechanism 134 further includes a secondary mechanism lever 148, again primarily shown in FIGS. 2-10. The secondary mechanism lever 148, as described subsequently herein, controls the rotational arc of the back cushions 120, 124 as they move between sofa and bed configurations. The secondary mechanism lever 148 is connected to the primary mechanism lever 138 at the main hinge point 146 through what is characterized as a mechanism control link 150. The mechanism control link 150 can be characterized as being locked into position relative to the back cushion 124. That is, the relative orientations of the link 150 and back cushion 124 remain the same during movement. The secondary mechanism lever 148 is hinged to the mechanism control link 150 at the hinge point 152 illustrated in the drawings. The mechanism control link 150 is particularly shown in its entirety in FIG. 9, and includes a first section 154 and an integral second section 156 which is angled relative to the first section as shown in FIG. 9. Also shown in FIG. 9 is the hinge point 152. The hinge point 152 is the pivotal connection between the mechanism control link 150 and the secondary mechanism lever 148. As further shown primarily in FIGS. 3-10, the linkage mechanism 134 also includes a mechanism drive shaft 158. The mechanism drive shaft 158 has a cylindrical and elongated configuration. One end of the mechanism drive shaft 158 is secured to one end of the second angled section 156 of the mechanism control link 150. The drive shaft 158 can be press fitted or otherwise secured to the mechanism control link 150 in any suitable manner. As further shown in a number of the drawings, including FIG. 3, a mechanism connection plate 160 is fixedly secured to an outer surface of the mechanism drive shaft 158. The mechanism connection plate 160 can be rectangular in configuration, with its elongated dimension running axially along the outer surface of the mechanism drive shaft 158. The connection plate 160 can be secured to the drive shaft 158 by any suitable means, including weldments and the like.

With reference back to FIG. 2, the inner portion of the side 114 shown therein includes a cut out portion in the form of a curvilinear clearance slot 162. The clearance slot 162 acts so as to provide for what could be characterized as minimum clearance for other components so as to avoid the occurrence of any pinch points associated with the sleep mechanism. To provide for a connection between moving components of the linkage mechanism 134 and the bed cushions 120, 124 of the furniture system 100, the connection plate 160 can be appropriately secured to these components of the system 100. As shown for example in FIG. 3, apertures 164 are formed through the connection plate 160 so as to provide the capability of securing the connection plate 160 to other components of the furniture system 100 through screws or other suitable connecting means. For example, the connection plate 160 can be secured through the use of 5/16 inch buttonhead bolts, with corresponding T-nuts.

Figure 11:
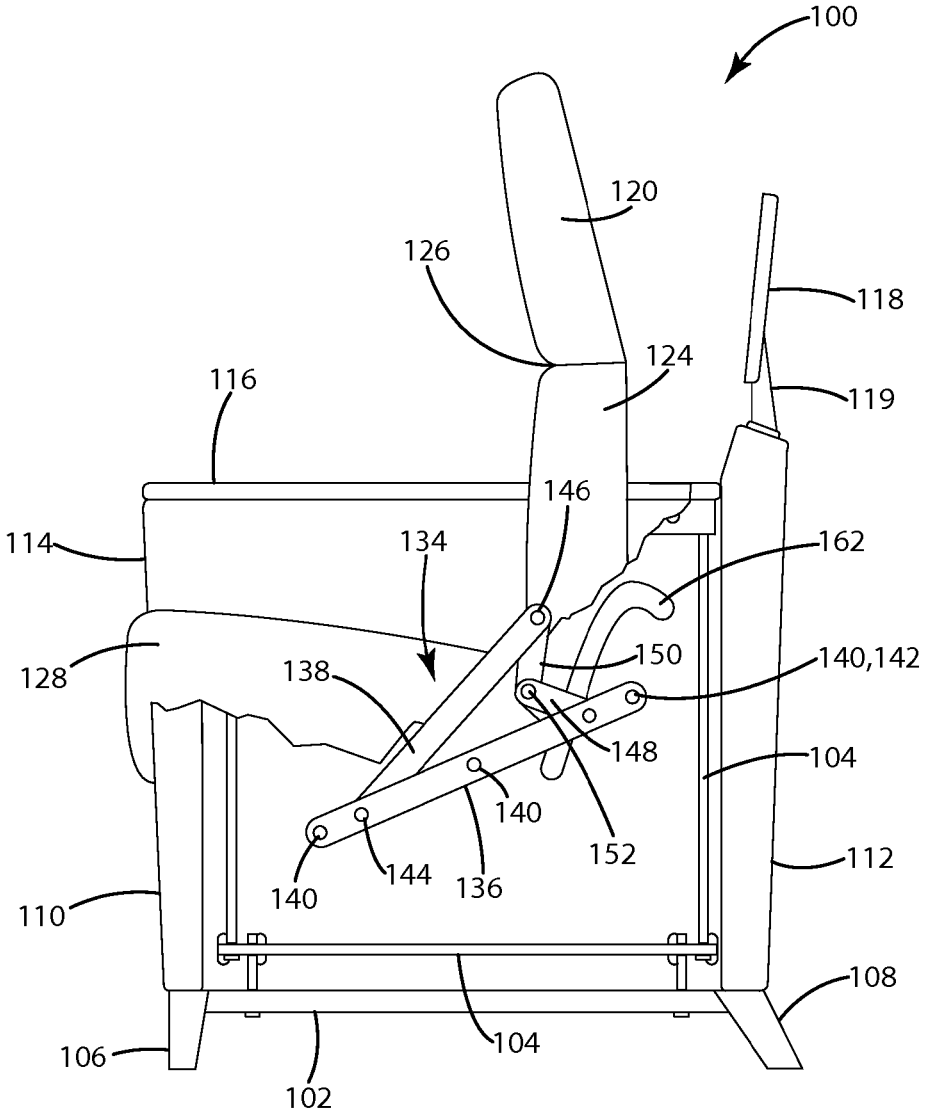
FIG. 11 is a side, elevation view of the furniture system shown in FIG. 2, with one of the linkage mechanisms shown within a cutout configuration, with the illustration similar to FIG. 2 but showing the furniture system and linkage mechanism in an "intermediate" position as the furniture system is moved between the sofa configuration and the bed or sleep surface configuration.
Figure 12:
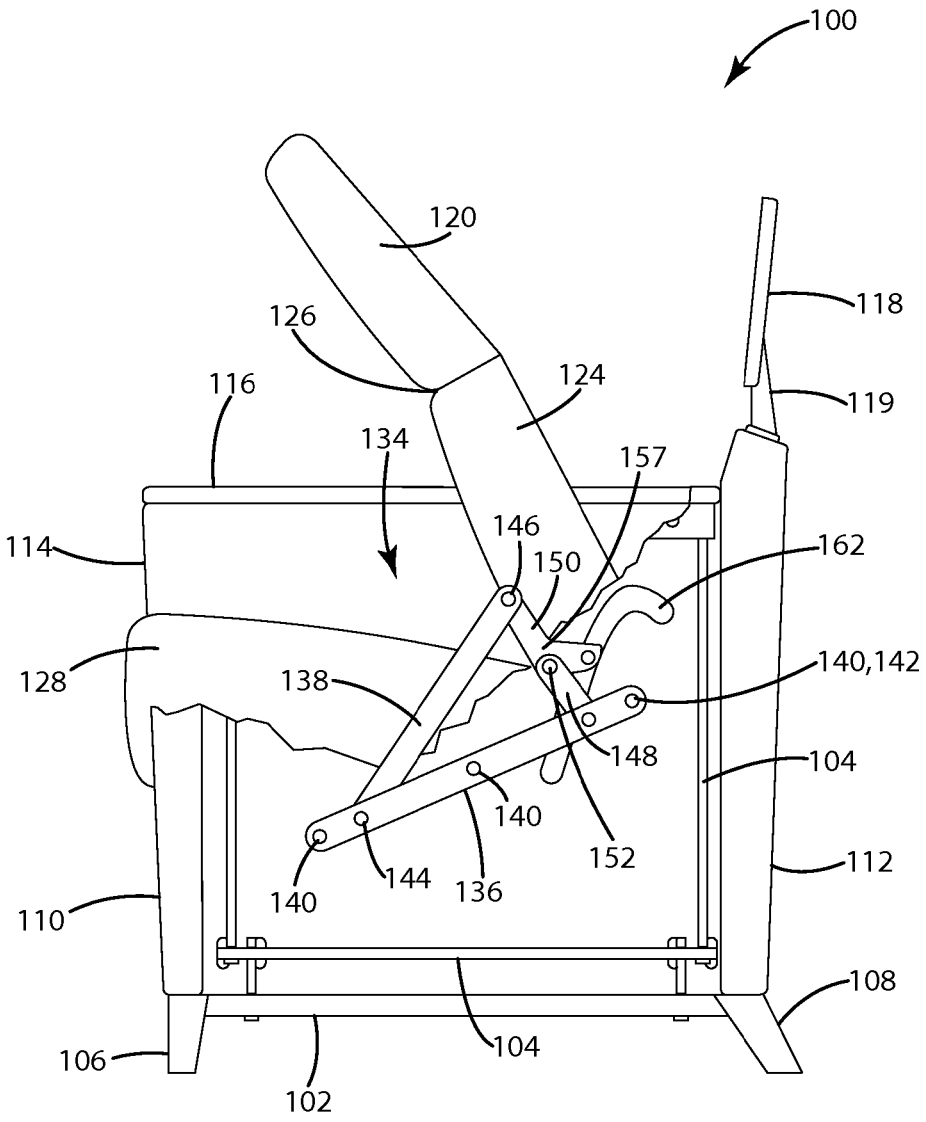
FIG. 12 is a side, elevation view of the furniture system shown in FIGS. 2 and 11, with one of the linkage mechanisms shown in a cutout configuration, and showing the furniture system, relative to FIG. 11, in a further transient position as the system is converted from the sofa configuration to the bed or sleep surface configuration.
Figure 13:
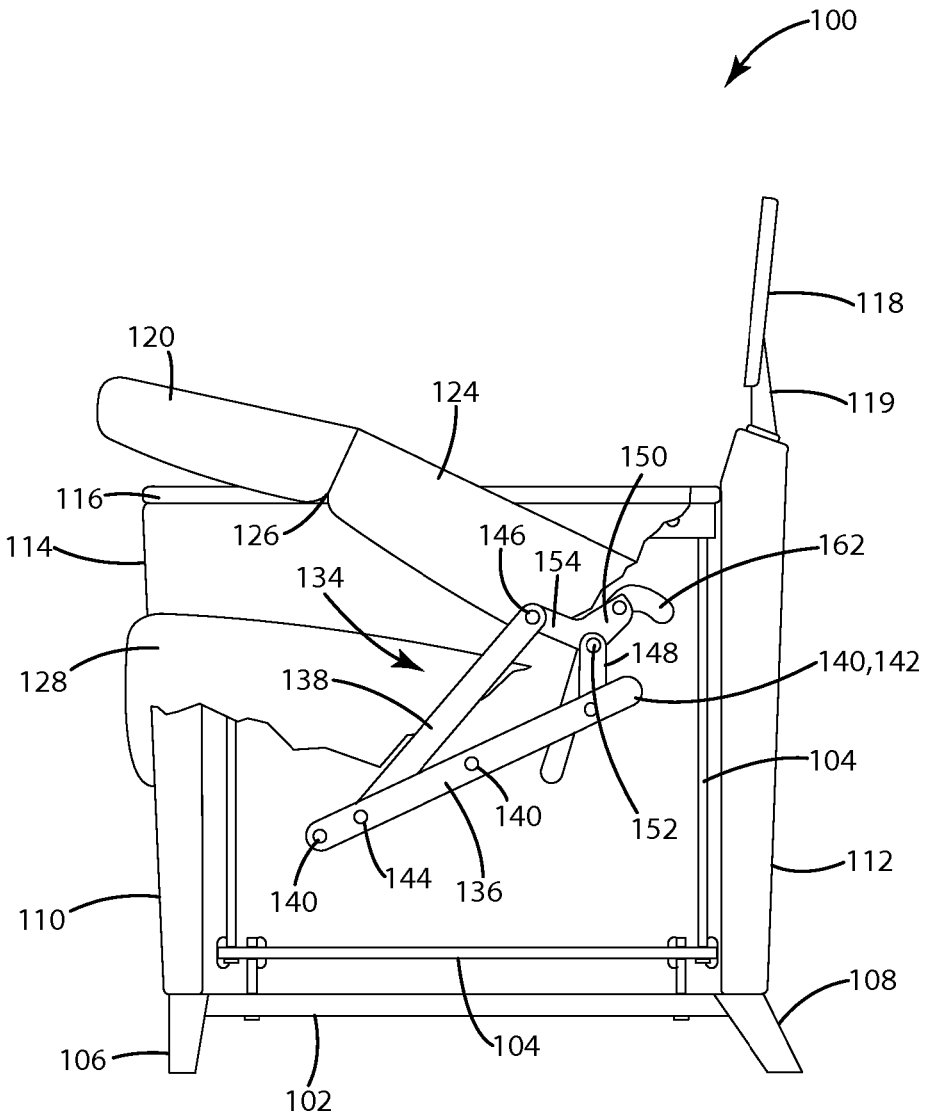
FIG. 13 is a side, elevation view of the furniture system shown in FIG. 12, and showing the system in further movement toward a bed or sleep surface configuration, with the back cushions moving further rearwardly.

Operation of the furniture system 100 with the linkage mechanisms 134 will now be described primarily with respect to FIGS. 2 and 11-14. FIG. 2, as previously described, illustrates the furniture system 100 in a sofa configuration. In this configuration, the user can pull forward on the top of high movable back cushion 120 through the handle 122 (the handle 122 is illustrated in FIG. 1). With the primary mechanism lever 138 linking the main hinge point 146 to the frame of the furniture system 100, the pulling forces exerted on the high movable bed cushion 120 will cause the main hinge point 146 to move upwardly and forwardly. This movement is particularly shown in FIGS. 11, 12 and 13. As specifically shown therein, this movement of the main hinge point 146 upwardly and forwardly permits the back cushions 120, 124 to also move upwardly and rotate forwardly in a manner so as to "clear" the seat cushion 128. Further, with this rotational arc of the back cushions 120, 124, the intermediate back cushion 124 is permitted to clear the seat cushion 128 without interfering with the stationary furniture back 112. FIGS. 12 and 13, in particular, show the back cushion 124 clearing the seat cushion 128, with corresponding clearance of the stationary furniture back 112. More specifically, the secondary mechanism lever 148, as earlier mentioned, controls the rotational arc of the back cushion 124. As illustrated in part in FIG. 2, with the furniture system 100 in the sofa configuration, the secondary mechanism lever 148 is in a substantially horizontal plane. During movement as illustrated in FIGS. 11, 12 and 13, the rotational arc of the secondary mechanism lever 148 and the back cushion 124 is initially upward. This upward movement provides for the requisite lift so as to clear the seat cushion 128.

As rotation of the back cushion 124 continues, the cushion will reach a position as particularly shown in FIG. 13. Further rotation will thereafter cause the back cushion 124 to essentially move rearwardly, with the primary mechanism lever 138 correspondingly moving downwardly. This movement will continue until the elongated primary mechanism lever 138 contacts the mechanism stop 142. With appropriate sizing and structural configuration of the various components of the linkage mechanisms 134, stoppage of the movement of the primary mechanism lever 138 will occur when the back cushions 120, 124 are essentially in a substantially planar configuration, as particularly shown in FIG. 14. This configuration corresponds to the bed or sleep surface configuration for the furniture system 100.

Figure 14:
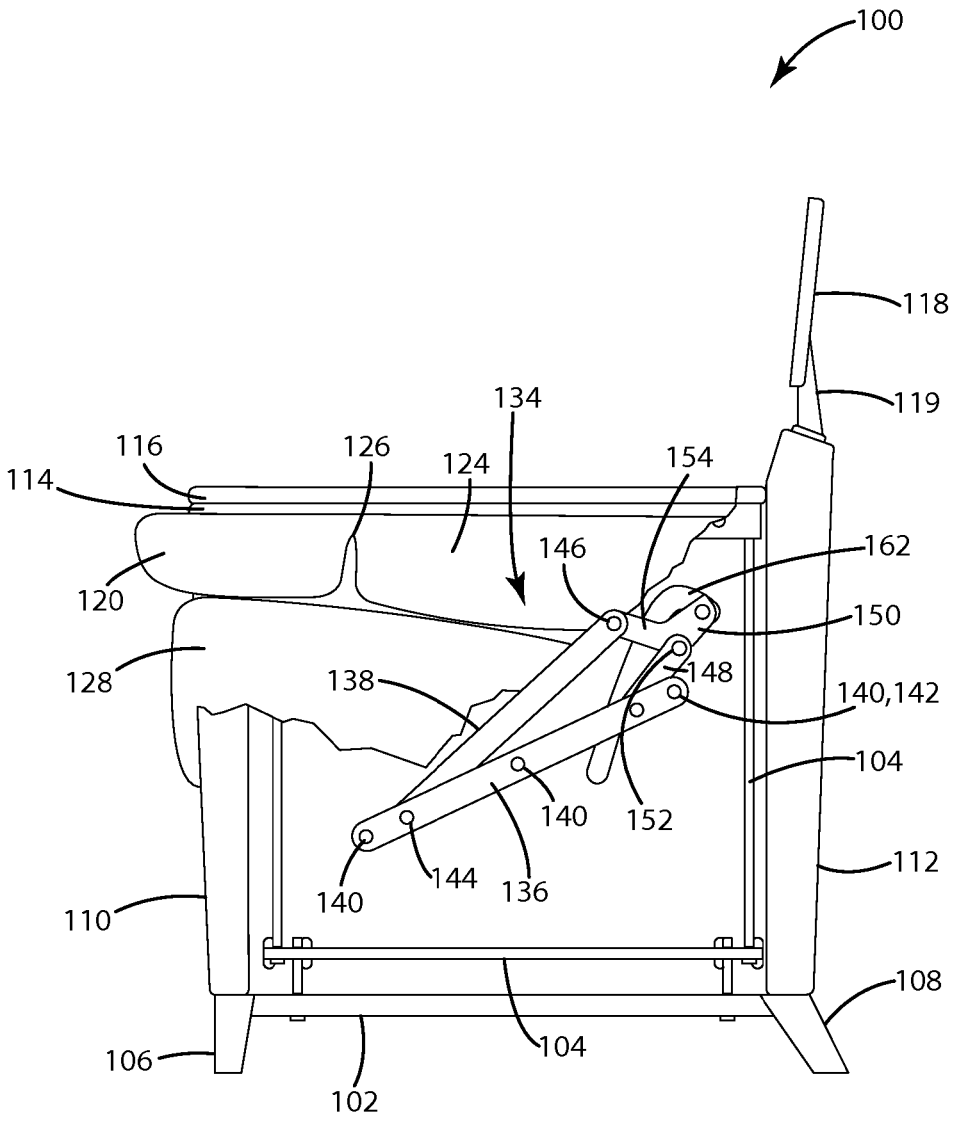
FIG. 14 is a side, elevation view of the furniture system shown in FIG. 13, and showing the furniture system in a final bed or sleep surface configuration, and further showing the position of the primary mechanism lever as it contacts a stop.

More specifically, the high movable back cushion 120 provides not only seating comfort when in the sofa configuration, but also provides a relatively large sleep surface when in the sleep or bed configuration. This occurs in substantial part because the particular motion of the system mechanism allows the lower "hidden" portion of the back to be pulled out from behind the seat cushion, and to therefore be utilized as part of a sleep surface. Also, in this bed or sleep configuration as shown in FIG. 14, the fabric hinge 126 has allowed a gap or a spacing 166 to be formed between the high movable back cushion 120 and the intermediate back cushion 124. This capability of exhibiting this spacing 166 provided by the fabric hinge 126 permits the back of the high movable back cushion 120 and the back of the intermediate back cushion 124 to locate in the same, level horizontal plane. The fabric hinge 126 allows this horizontal plane configuration to be achieved, while also allowing a somewhat angular orientation to exist between the cushions 120, 124 when the furniture system 100 is in the sofa position as shown in FIG. 2. In general, the fabric hinge 126 permits articulation of the back cushions 120, 124. Further, the interface between the height and angle of the seat cushion, and the front sides of the two back cushions, also plays a role in achieving the advantageous horizontal, planar sleep surface.

Further, when the furniture system is in the bed or sleep position as shown in FIG. 14, the secondary mechanism lever 148 can essentially be characterized as being oriented beyond center. With this configuration, the secondary mechanism lever 148 will essentially support the sleep surface formed by the back cushions 120, 124, with the back cushion 124 located in part within the area which overhangs the seat cushion 128. That is, downwardly directed forces exerted on the back cushion 124 within this area which overhangs the seat cushion 128 will essentially be translated to the mechanism 142 through the primary mechanism lever 138 and the coupling to the secondary mechanism lever 148. Movement will essentially be stopped when the secondary mechanism lever 148 abuts the spacer associated with the frame connection point 142, which essentially acts as a third attachment for the mechanism base plate 136.

As earlier mentioned, the linkage mechanisms 134 can be confined within the sides 114 of the system 100. Accordingly, there is an aesthetically favorable "clean" look to the sides of the system 100, with no linkage mechanisms 134 being visible. Also, the linkage mechanisms 134 do not exhibit any physically accessible or visual pinch points which can present a safety hazard. In this regard, the clearance slot 162 is hidden from view by the back and sufficient distance is provided between the slot 162 and the mechanism drive shaft 158 and mechanism connection plate 160 so as to avoid any pinch points which may be associated therewith. Further, with the linkage mechanisms 134, movement between sofa and sleep configurations is highly controlled, relatively error-proof, and requires only a "simple" path of motion. It should be emphasized that the reference to the "simple" or "single" path of motion refers to the required motion of the user. That is, to operate the furniture system 100, the user does not have to exert forces in multiple directions, take multiple stances or otherwise require any complex body movements. In this regard, the operational activities required by the user are essentially of minimal effort and can also be characterized as being "intuitive" for activities associated with converting an apparatus between a sofa position and a bed position.

With the system 100 as described herein, areas which can be characterized as "cleanouts" are provided at interfaces between the seat cushion 128 and the intermediate back cushion 124. These cleanout spaces also exist between the movable back cushions 120, 124 and the stationary furniture back 112. The formation of these spatial areas provides for allotted space for dirt and the like to fall (or to be pushed through) directly to a floor surface below the furniture system 100. This is a feature which can be particularly advantageous in settings such as health care facilities and areas of public access.

As previously described, the system 100 is shown in FIG. 1 with a pair of extendable and retractable ottomans 130 positioned on opposing sides of the front of the lower portion of the furniture system 100. The ottomans 130 are shown in FIG. 1 in a retracted position. In addition, a drawer can also be incorporated within the furniture system 100, such as the extendable and retractable drawer 132 positioned intermediate the ottomans 130. In FIG. 1, the drawer 132 is also shown in a retracted position. The drawer 132 includes a handle 168 for purposes of extending and retracting the drawer 132. For purposes of operating the ottomans 130, so as to move the same between its extended and retracted positions, manually operable actuator levers 170 can be located on the outer surfaces of the opposing sides 114 of the furniture system 100 (only one of these levers 170 being shown in FIG. 1). One of the levers 170 can be utilized to functionally operate the ottoman 130 closest to the lever 170. The mechanisms for linking levers such as levers 170 to extendable and retractable ottomans are relatively well known in the art. Any of a number of different connection mechanisms can be utilized to provide for the appropriate structure and functional operation.

Figure 15:
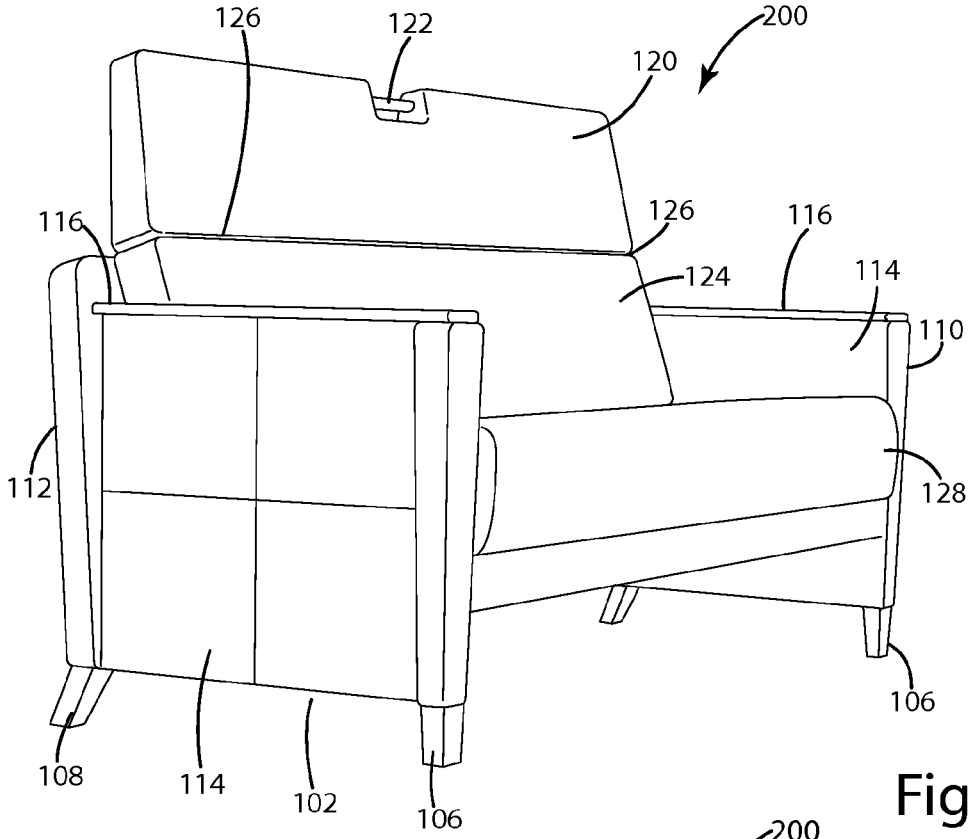
FIG. 15 is a left-side perspective view of a further embodiment of a furniture system in accordance with the invention, and showing the system in a sofa configuration, with recessed wood cap arms and an open base.
Figure 16:
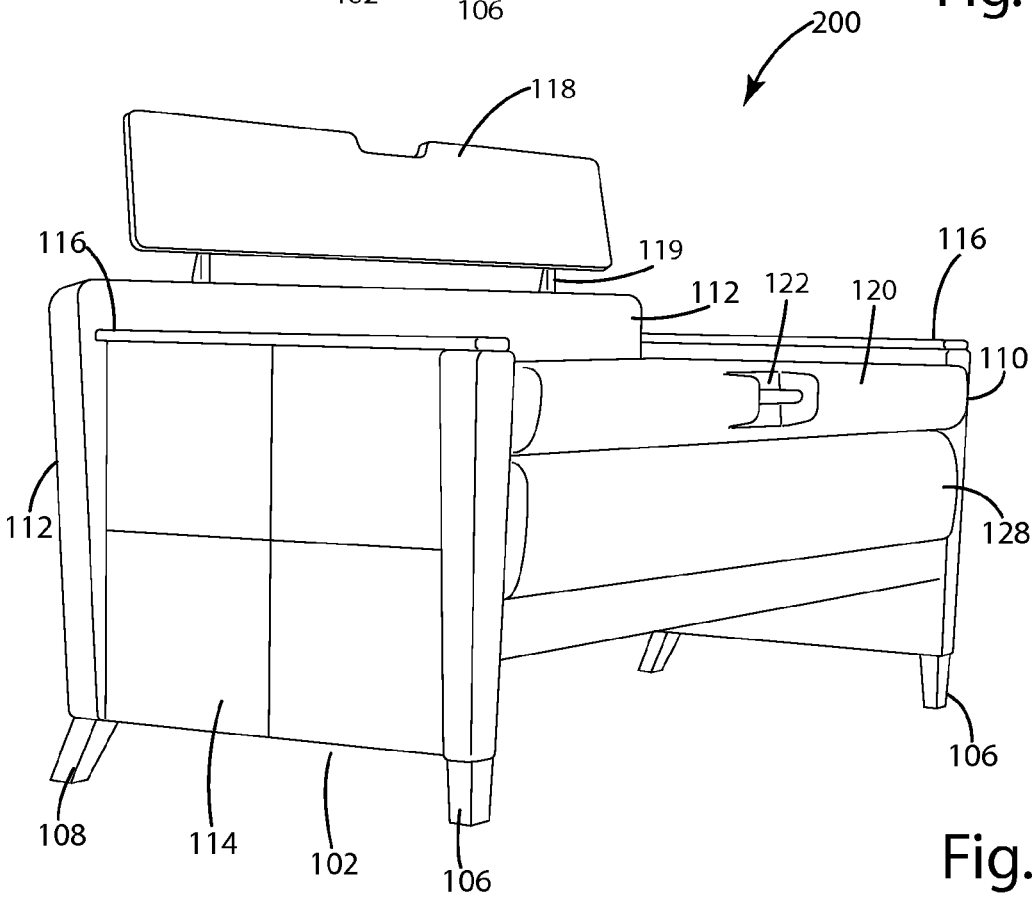
FIG. 16 is a left-side perspective view of the furniture system shown in FIG. 15, but showing the high back support and the furniture system in a sleep configuration.
Figure 17:
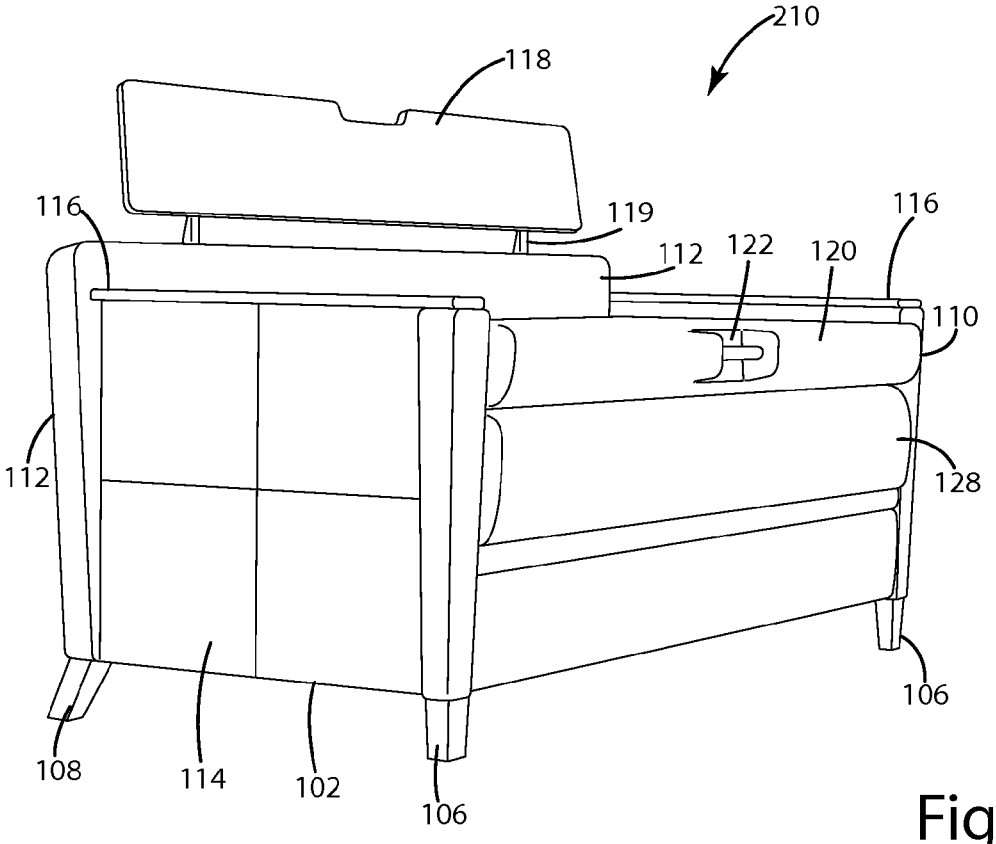
FIG. 17 is a left-side perspective view of a further embodiment of a furniture system in accordance with the invention, showing the system in a sleep position and having recessed wood cap arms with a continuous upholstered panel.
Figure 18:
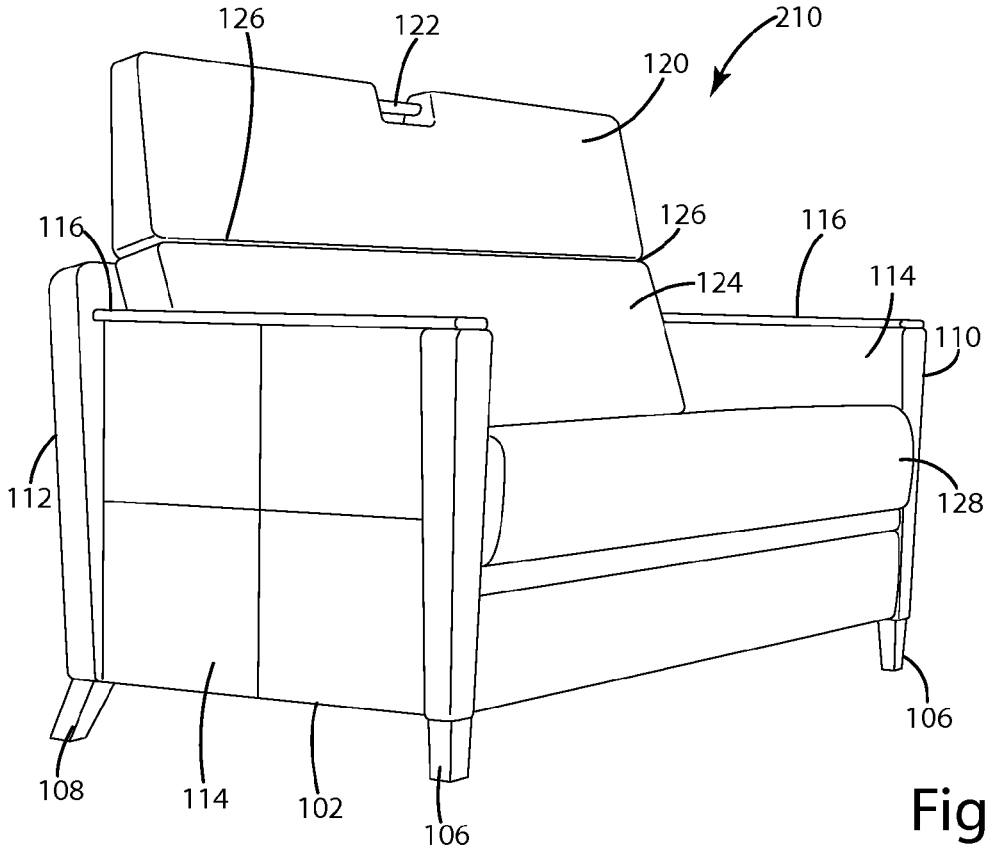
FIG. 18 is a left-side perspective view of the furniture system shown in FIG. 17, but showing the furniture system in a sofa position.
Figure 19:
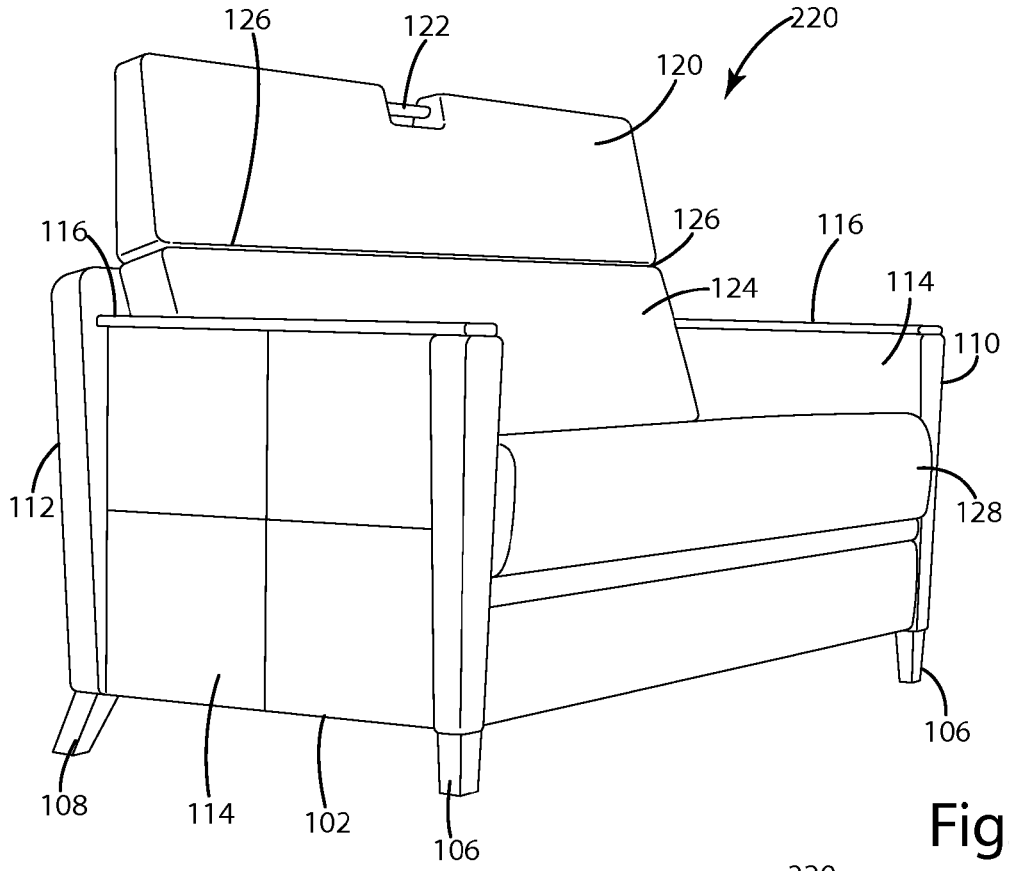
FIG. 19 is a left-side perspective view of a further embodiment of a furniture system in accordance with the invention, with the illustration showing the furniture system in a sofa position and having recessed wood insert/wood cap arms with a continuous upholstered panel.
Figure 20:
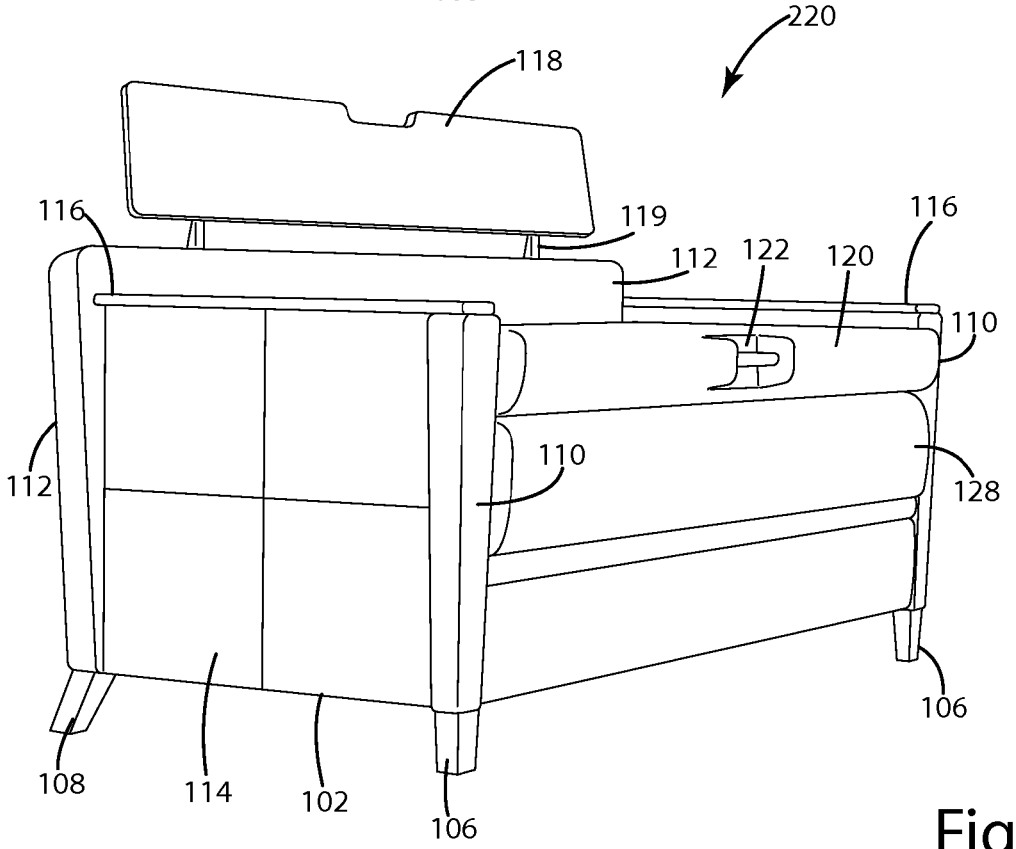
FIG. 20 is a left-side perspective view of the furniture system shown in FIG. 19, but showing the system in a sleep configuration.

The sides 114 and arms 116 of the furniture system 100 shown in FIG. 1 can be characterized as having a recessed configuration with wood cap arms. Correspondingly, FIGS. 15-29 illustrate various other embodiments of furniture systems showing the systems in both sofa and sleep configurations, and also showing various illustrations of the use of the ottomans 130 and drawer 132. For example, FIG. 15 illustrates a furniture system 200 in the sofa configuration. In this configuration, the sides 114 and arms 116 can be characterized as having a recessed configuration with wood cap arms. The system 200 can be characterized as an "open base" system, without ottomans or any drawer. FIG. 16 illustrates the furniture system 200 shown in FIG. 15, but showing the furniture system 200 in the sleep or bed configuration. FIG. 17 illustrates a further embodiment of a furniture system 210. The system 210 is shown in the sleep configuration and includes sides 114 and arms 116 having recessed configurations with wood cap arms. The lower front of the system 210 includes a continuous upholstered panel. The system 210 does not include any ottomans 130 or drawer 132. FIG. 18 illustrates the furniture system 210 shown in FIG. 17, but with the system 210 in the sofa configuration. FIG. 19 identifies a further embodiment of a furniture system characterized as furniture system 220. The furniture system 220 is shown in the sofa configuration in FIG. 19. The system 220 can be characterized as having sides 114 and arms 116 identified as recessed wood inserts with wood cap arms. The system 220 can also be characterized as one having a continuous upholstered panel. FIG. 20 is a further illustration of the system 220 shown in FIG. 19, but showing the system 220 in the sleep or bed configuration.

Figure 21:
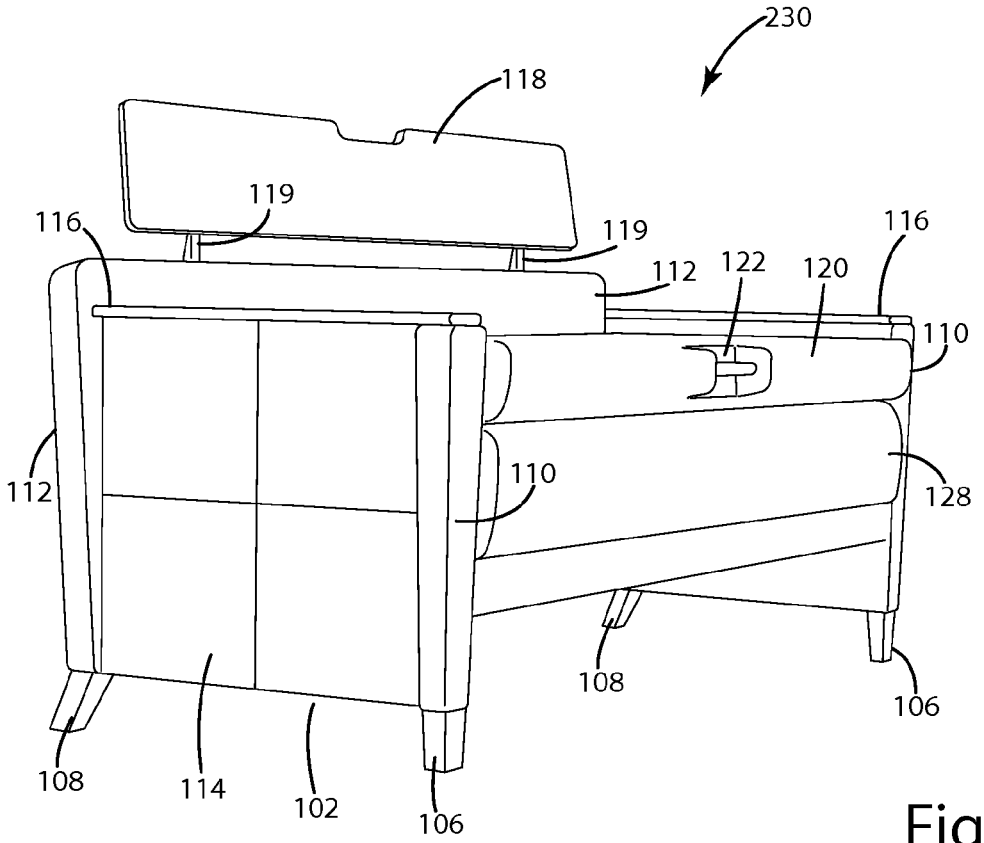
FIG. 21 is a left-side perspective view of a further embodiment of a furniture system in accordance with the invention, with the system shown in a sleep position and having recessed wood panel/wood cap arms with an open base.
Figure 22:
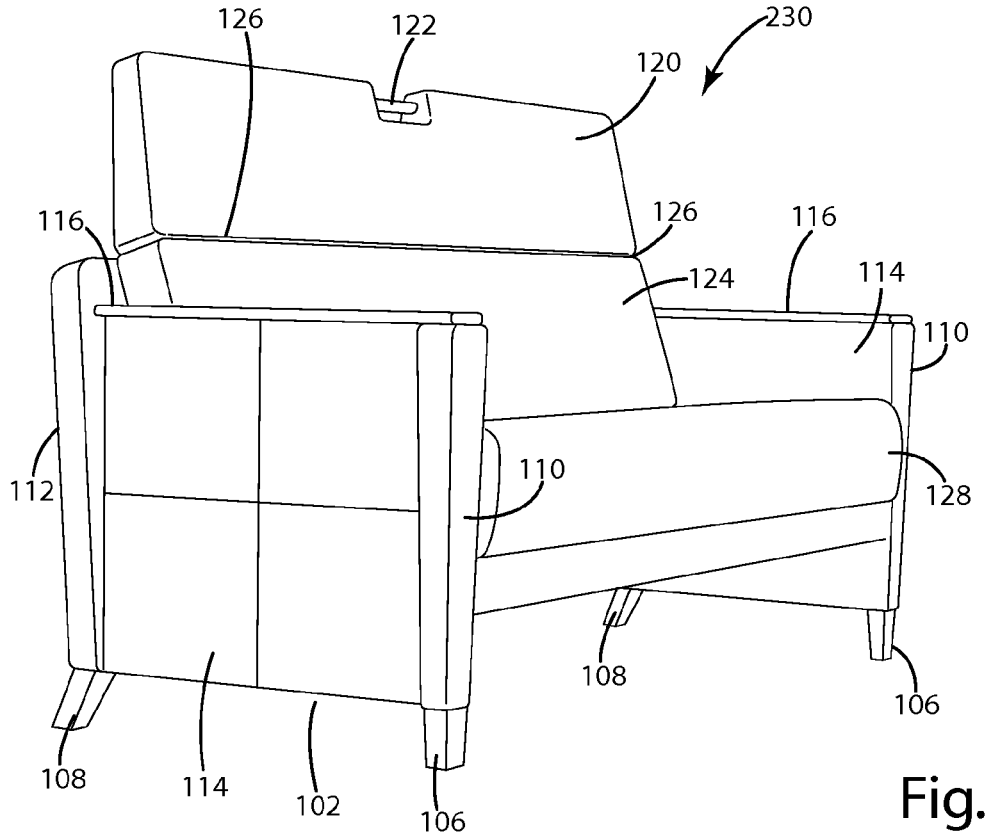
FIG. 22 is a left-side perspective view of a furniture system in accordance with FIG. 21, but showing the system in a sofa configuration.

FIG. 21 illustrates a further embodiment of a furniture system referenced as furniture system 230. The sides 114 and arms 116 of the system 230 can be characterized as having a recessed wood panel configuration, with wood cap arms. The system 230 also includes an open base, without ottomans 130 or a drawer 132. FIG. 22 is a further illustration of the furniture system 230 as shown in FIG. 21, but showing the system 230 in the sofa configuration.

Figure 23:
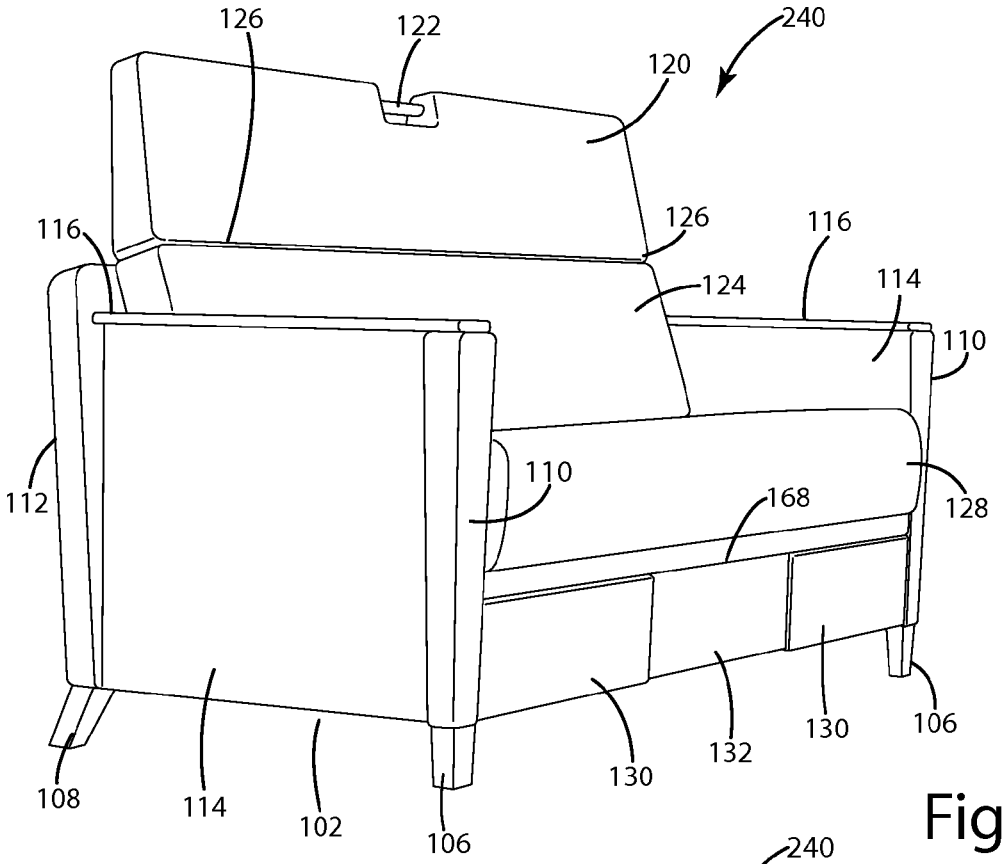
FIG. 23 is a left-side perspective view of a further embodiment of a furniture system in accordance with the invention, illustrating the furniture system in a sofa position and having recessed wood panel/wood cap arms with one or more retracted ottomans and a retracted drawer.
Figure 24:
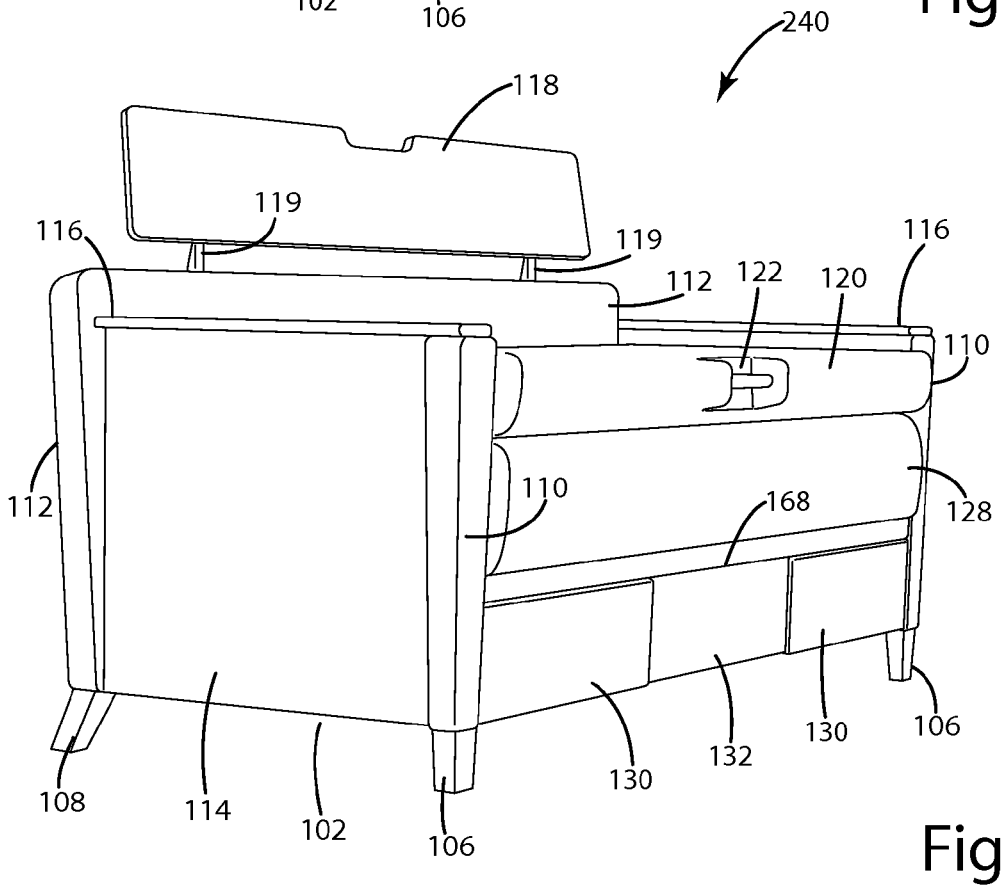
FIG. 24 is a left-side perspective view of the furniture system shown in FIG. 23, but showing the system in a sleep configuration.

FIG. 23 is an illustration somewhat similar to FIG. 1, but showing a furniture system 240. The system 240 includes sides 114 and arms 116 which can be characterized as having a recessed wood panel configuration, with wood cap arms. FIG. 23 also illustrates the ottoman and drawer options, and shows a pair of ottomans 130 and drawer 132 in retracted positions. FIG. 24 also illustrates the furniture system 240, but shows the furniture system 240 in the sleep or bed configuration.

Figure 25:
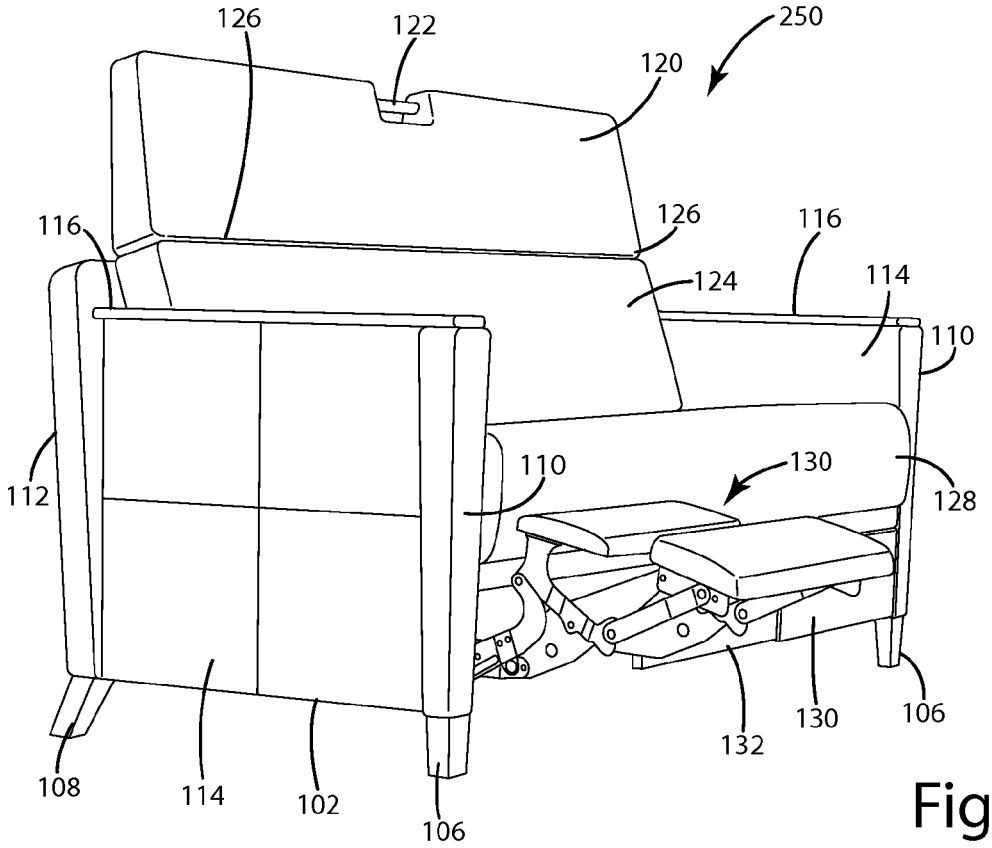
FIG. 25 is a left-side perspective view of a further embodiment of a furniture system, illustrating the system in a sofa configuration and having recessed wood cap arms, with a drawer in a retracted position and an ottoman in an extended position.
Figure 26:
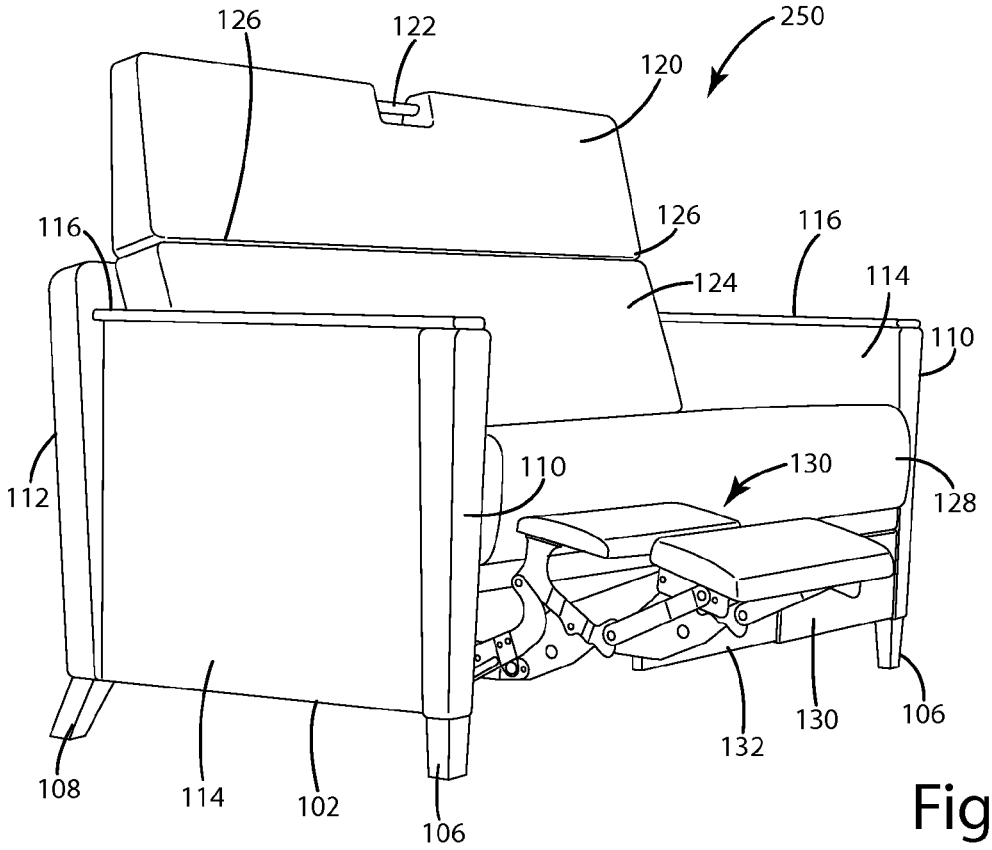
FIG. 26 is a left-side perspective view of the furniture system shown in FIG. 23, but showing an ottoman in an extended position.
Figure 27:
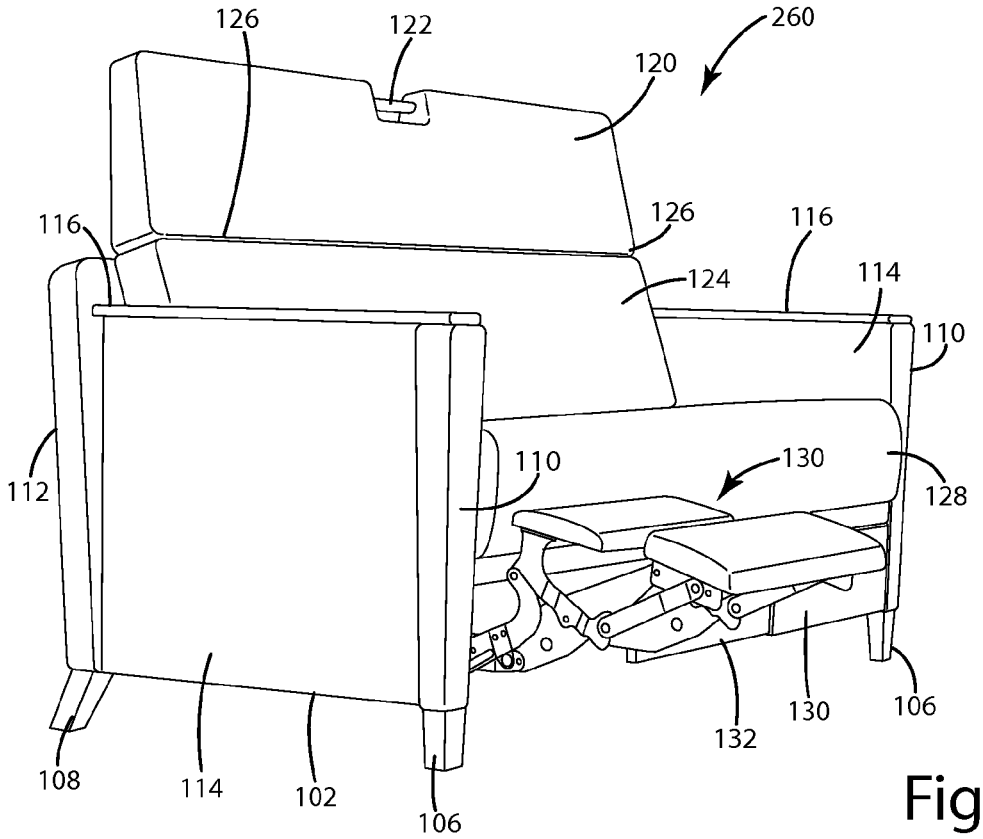
FIG. 27 is a left-side perspective view of a further embodiment of a furniture system, illustrating the furniture system in a sofa configuration and having upholstered arms with a retracted drawer and an extended ottoman.

FIG. 25 is an illustration of furniture system 242, showing a sofa with a recessed wood cap arm, having ottoman and drawer options. The ottoman 130 is shown in an extended position. FIG. 26 illustrates a furniture system 250 similar to the system shown in FIG. 24, with the system having a recessed wood panel with wood cap arms, and ottoman and drawer options with the ottoman 130 in an extended position. The sides 114 and arms 116 can be characterized as having recessed wood panels with wood cap arms. FIG. 27 illustrates a furniture system 260. The system is shown with an extended ottoman 130. The sides 114 and arms 116 of system 260 can be characterized as having upholstered configurations.

Figure 28:
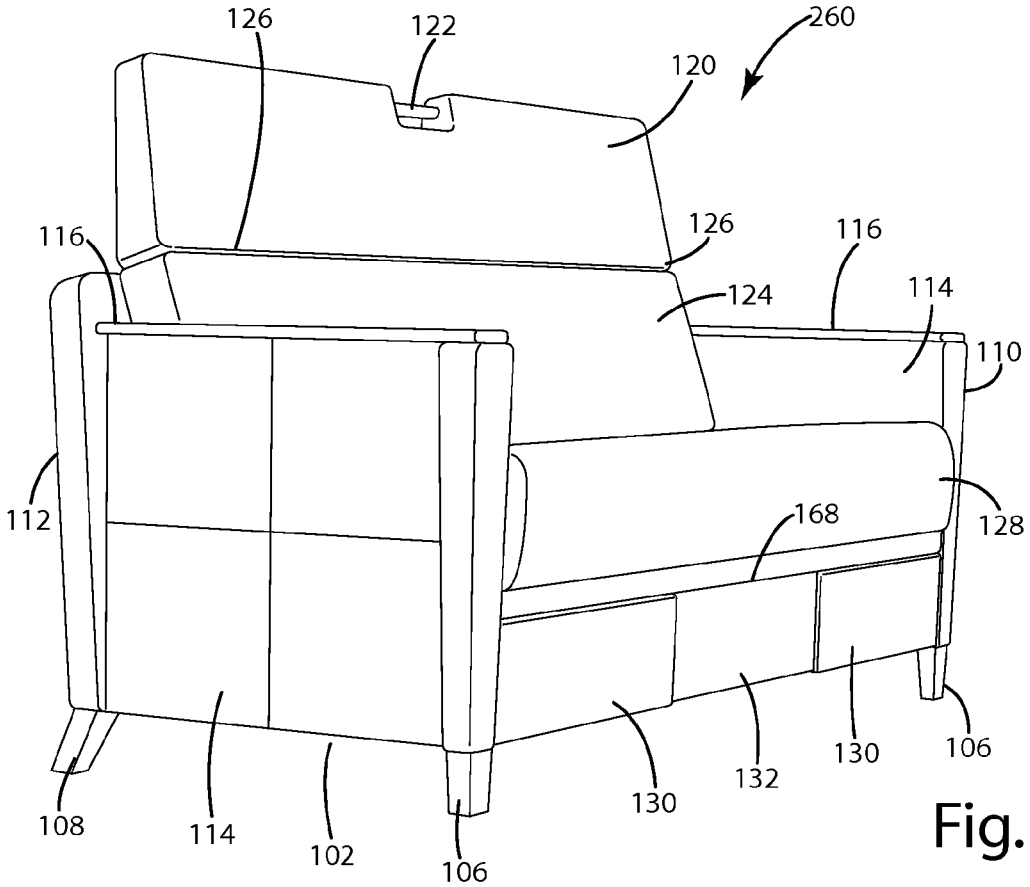
FIG. 28 is a left-side perspective view of the furniture system shown in FIG. 27, but with the ottoman in a retracted position.
Figure 29:
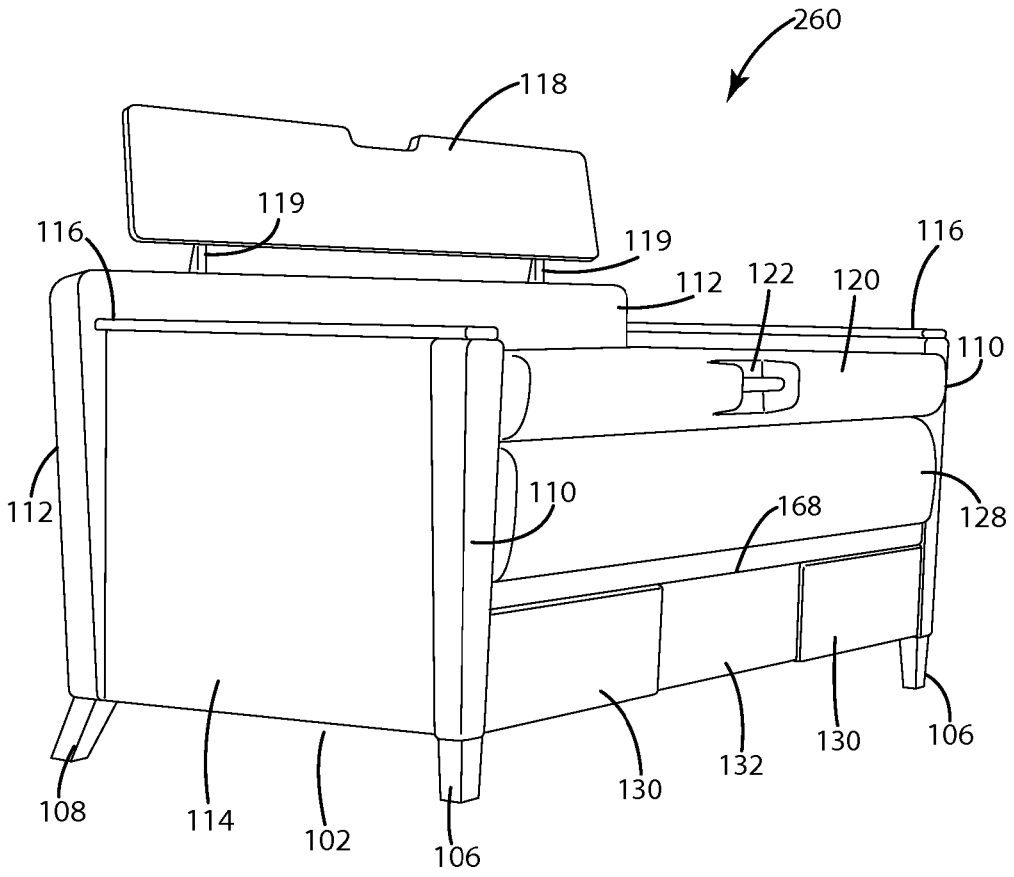
FIG. 29 is a left-side perspective view of the furniture system shown in FIG. 28, but showing the system in a sleep configuration.

FIG. 28 is a further view of the furniture system 260. In contrast to FIG. 27, the furniture system 260 in FIG. 28 is shown with the ottomans 130 in retracted positions. FIG. 29 illustrates the furniture system 260 with the ottomans 130 in a retracted position, and with the system 260 in a sleep or bed configuration.

Figure 30:
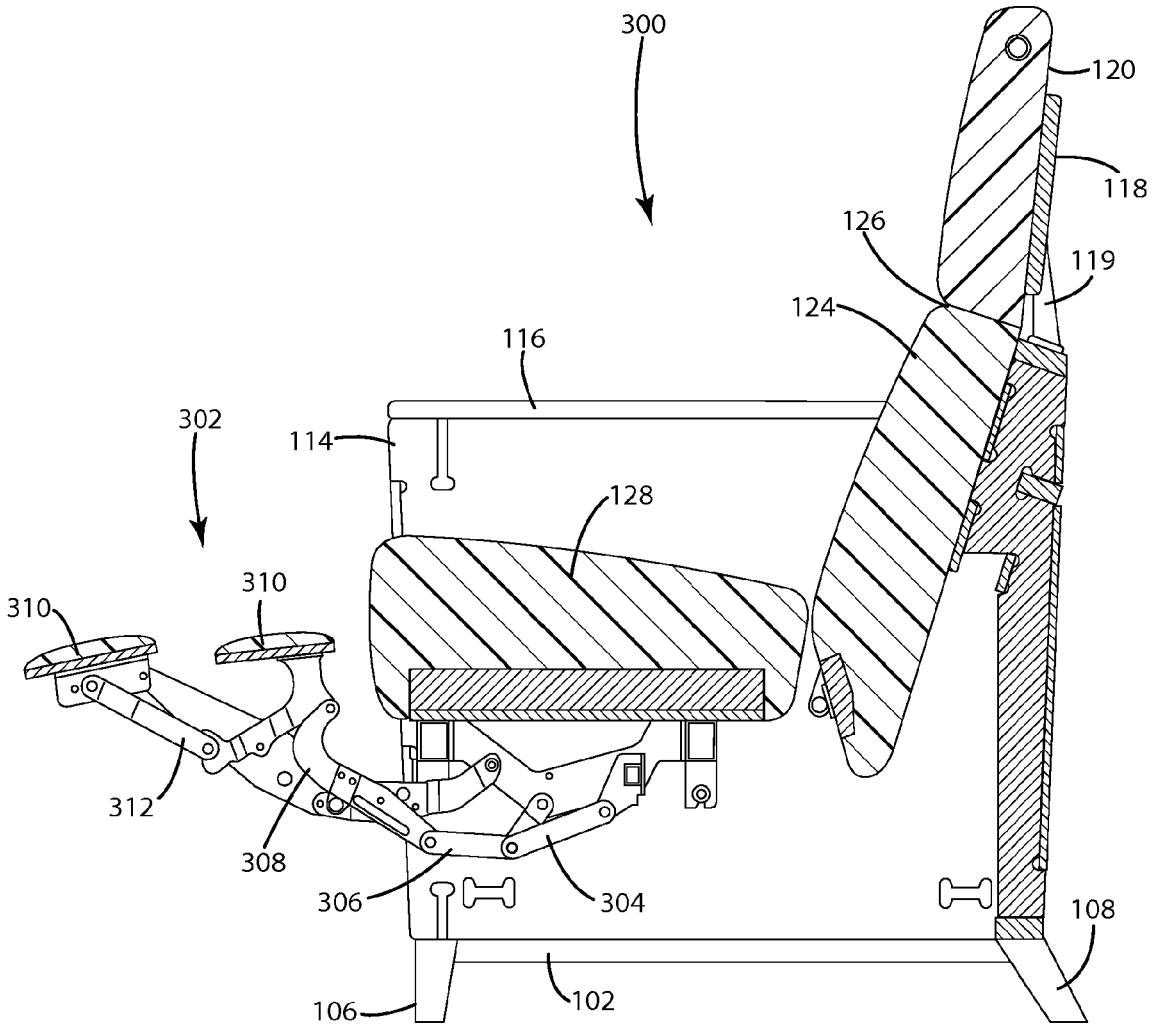
FIG. 30 is a side sectional view of an ottoman connected to a furniture system in accordance with the invention, and showing the ottoman in an extended position.

FIG. 30 illustrates a furniture system 300 in a vertical, sectional view, showing an example interconnection of an ottoman 302 to the furniture system 300, with the furniture system 300 having the convertible sofa/bed conversion mechanisms as previously described herein. It should be noted that FIG. 30 illustrates the ottoman 302 in an extended position. With reference to FIG. 30, the ottoman 302 is connected to appropriate elements of the sofa/bed configuration through a hardware assembly 304. The hardware assembly 304 includes a stationary support frame 306 fixedly secured to other elements of the sofa/bed configuration. It should be further emphasized that FIG. 30 is illustrating only one-half of the configuration of the ottoman 302 with the associated hardware assembly 304. Pivotably secured to a rear portion of the stationary support frame 306 is a pivot bracket 308. The pivot bracket 308, at an end opposing the connection to the stationary support frame 306, is coupled to a pivot link 310. The pivot link 310 is coupled both to the stationary support frame 306 and is associated with a second pivot bracket 312. The second pivot bracket 312 is coupled at one end in a pivotal matter to an external linkage 314. The external linkage 314 includes a first footpad link 316. The first footpad link 316 is coupled to a lower frame section of a first footpad 318. Coupled to the lower frame section of the first footpad 318 is a second footpad linkage 320. The second footpad linkage 320 is, in turn, coupled to the second footpad 322.

In accordance with the foregoing and as shown in FIG. 30, the hardware assembly 304 facilitates extension and retraction of the ottoman 302 in a relatively conventional manner. An ottoman having features associated with extension and retraction from seating furniture is disclosed in Johnson et al., U.S. Pat. No. 5,695,239, issued Dec. 9, 1997.

Figure 31:
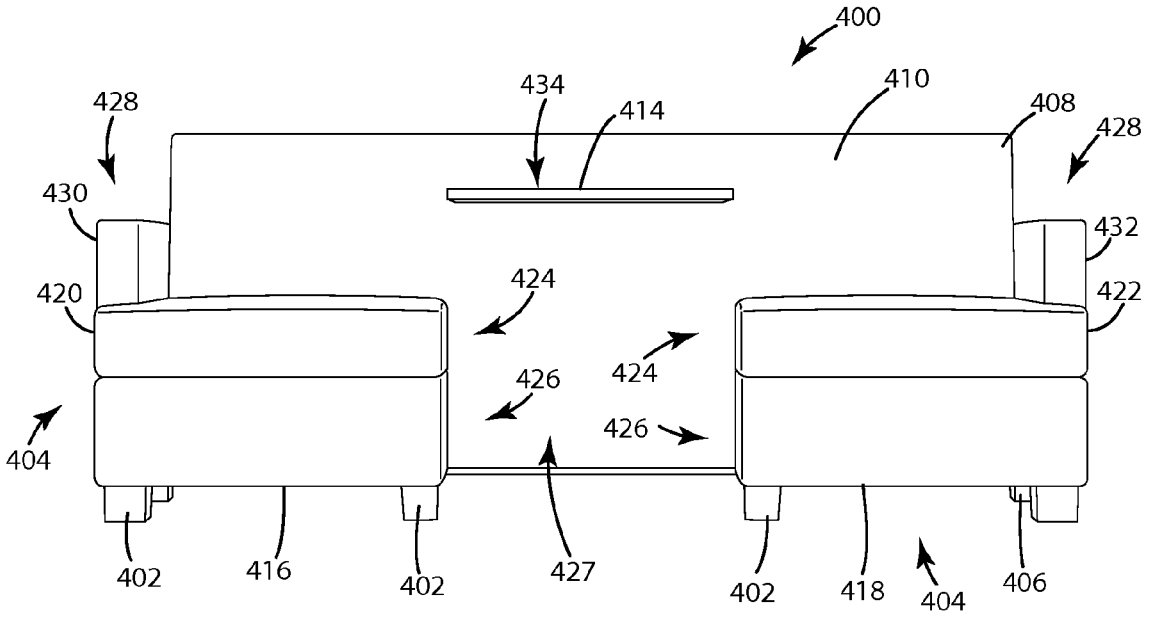
FIG. 31 is a front, elevation view of a furniture system in accordance with the invention, and showing the use of a desk and a sitting or sofa configuration.
Figure 32:
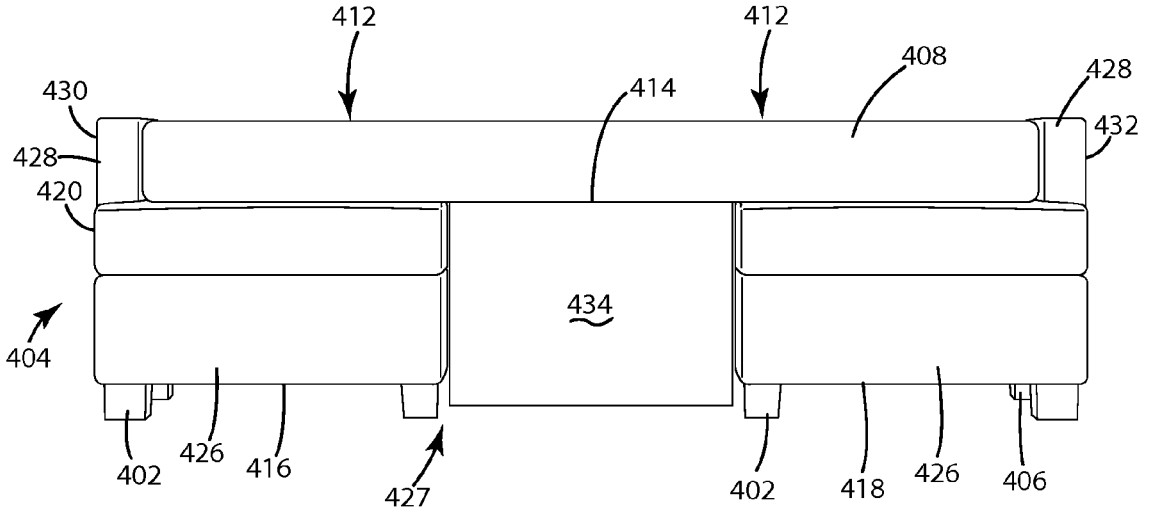
FIG. 32 is a front, elevation view of the furniture system shown in FIG. 31, but showing the system in a sleep configuration.
Figure 33:
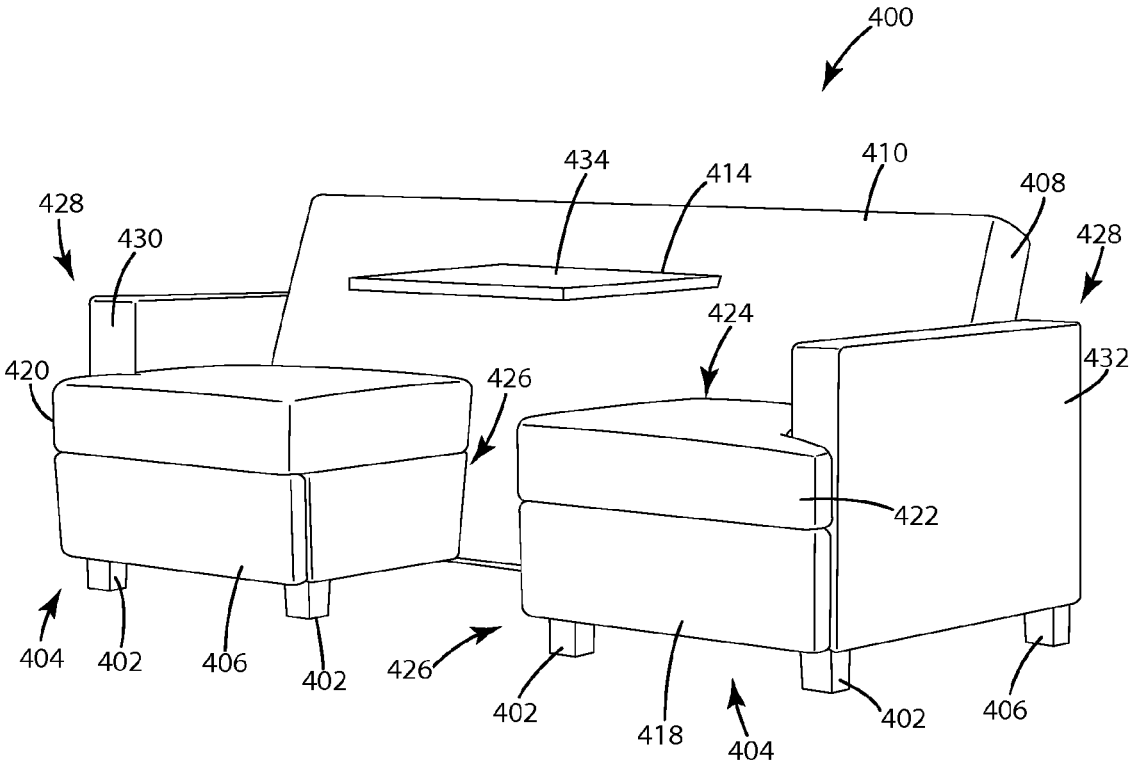
FIG. 33 is a right-side perspective view of the furniture system shown in FIG. 31.
Figure 34:
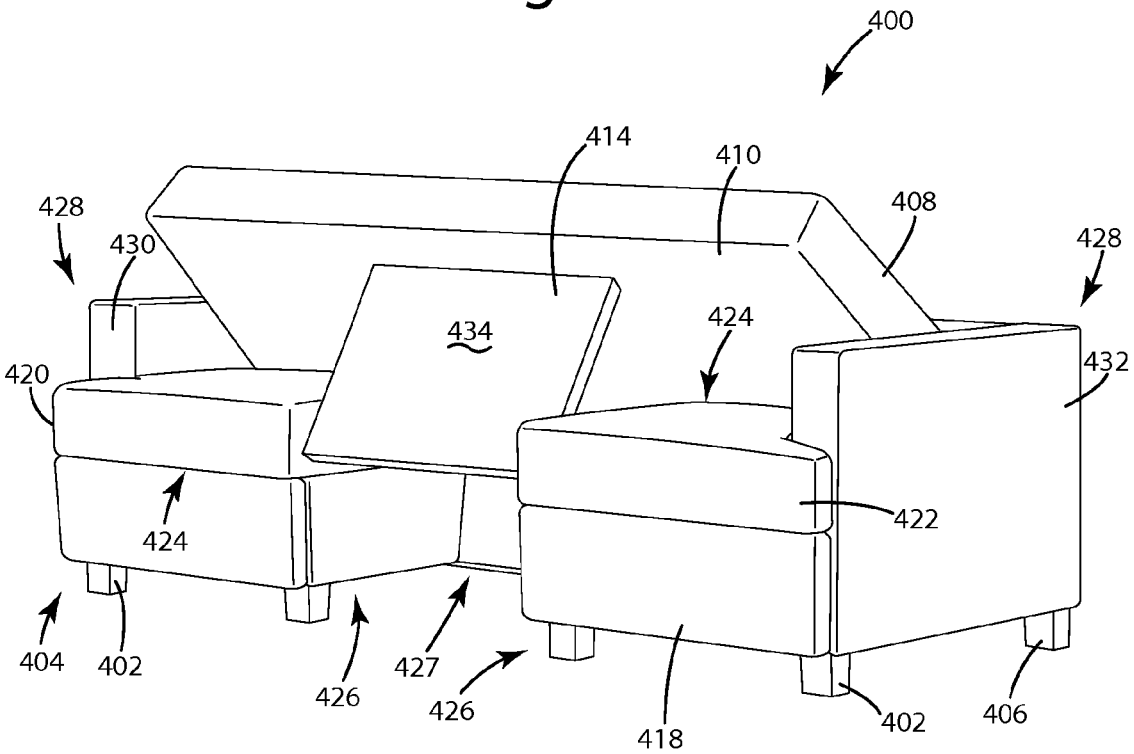
FIG. 34 is a right-side perspective view of the furniture system shown in FIG. 31, but showing the system in a position substantially half way between a sitting configuration and a sleep configuration.
Figure 35:
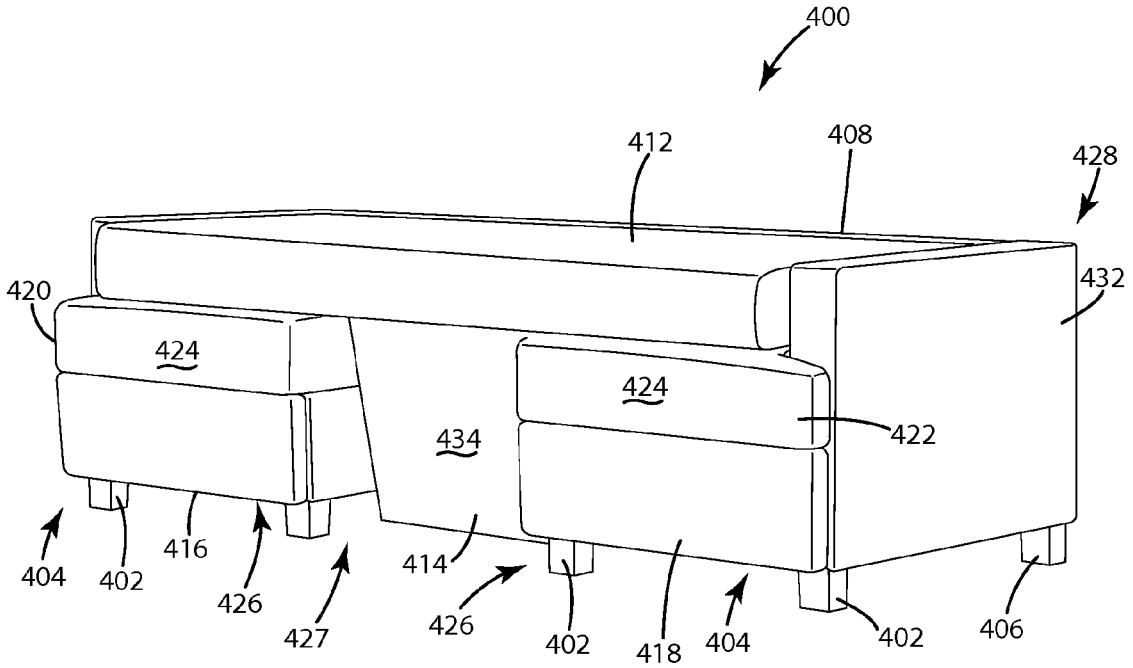
FIG. 35 is a right-side perspective view of the furniture system shown in FIG. 31, with the system in the configuration shown in FIG. 32.

Turning to FIGS. 31-35, FIG. 31 illustrates the furniture system 400 in a front, elevation view. The furniture system 400 in accordance with the invention can include sets of front legs 402, and corresponding rear legs 406 (with rear legs 406 being shown, for example, in FIGS. 33 and 34). The legs 402, 406 support a frame 404 for the entirety of the furniture system 400. The system 400 further includes a furniture back 408, with the furniture back 408 having a back front surface 410 (as shown in FIG. 31) and a rear back surface 412 (as shown in FIG. 32).

Extending forwardly from the upper central portion of the back front surface 410 is a desk 414. The desk 414 includes an upper work surface 434. The desk provides for an integrated work surface for use by individuals using the furniture system 400. The desk is preferably positioned so that it does not extend forwardly beyond the frontal vertical plane of the furniture system 400.

The furniture system 400 also includes a pair of bases 426. The bases 426 include a left-side base 416 and right-side base 418. Positioned above the bases 426 are a pair of seats 424. The seats 424 comprise a left-side seat 420 and right-side seat 422. Advantageously, and in accordance with the invention, it should be noted that with the size and configuration of the bases 426 and seats 424, a spatial interior area 427 exists between the lateral sides of the seats 424 and bases 426 which face each other. With this interior area 427, individuals seated on either of the seats 424 can position their legs forwardly of the front vertical plane of the furniture system 400 or, alternatively, can position themselves in a "sideways" orientation so that their legs extend into the spatial interior area 427. With this configuration, persons seated on either of the seats 424 can advantageously use the desk 414 while they are in extremely comfortable seating positions. It should also be noted at this time that for purposes of proper functional operation of the furniture system 400, it is preferable for the desk 414 to be centered laterally between the seats 424, and also to have a width which is smaller than the width of the spatial interior area 427. These dimensional considerations are advantageous so as to provide for the desk 414 to "fit between" the seats 424 when the furniture system 400 is moved to a sleep configuration.

In addition to the aforedescribed elements, the furniture system 400 can also include a pair of arms 428 positioned on opposing sides of the system 400. The arms 428 can include a left-side arm 430 and right-side arm 432. These arms 428 provide arm rests for individuals seated on the seats 424.

As earlier described, the furniture system in accordance with the invention can move between sitting configurations and sleep configurations. FIG. 31 illustrates the furniture system 400 in a sitting configuration. Correspondingly, FIG. 32 illustrates the furniture system 400 in a sleep configuration. It should be noted that in the sleep configuration, the rear surface 412 of the back 408 acts as the sleep surface for the user. Further, and advantageously in accordance with the invention, the desk 434 conveniently is stored between the seats 424 when the furniture system 400 is in the sleep configuration. Again, it should be noted that when the furniture system 400 is in either the sitting configuration or the sleep configuration, the desk 414 does not extend beyond the footprint of the basic furniture system 400.

For purposes of functional operation, the furniture system 400 (and other embodiments of furniture systems in accordance with the invention as described herein) can include a pair of linkage mechanisms 470. One of the linkage mechanisms 470 is illustrated in FIGS. 49-54. Each of FIGS. 49-54 illustrate the general configuration of one of the linkage mechanisms 470 when the furniture system 400 is moving between the sitting configuration and the sleep configuration. Details of the linkage mechanisms which can be utilized with furniture systems in accordance with the invention have been substantially described with respect to the linkage mechanism 134 associated with the furniture systems illustrated in FIGS. 1-30. Accordingly, a detailed description of the operation of linkage mechanism 470 will not be set forth herein. However, its specific operation will be apparent from the description of the operation of the linkage mechanism 134. Further, it should be emphasized that various types of linkage mechanisms can be utilized in accordance with the invention, other than linkage mechanism 470, without departing from the spirit and scope of the principal novel concepts of the invention.

In general, the linkage mechanism 470 can include a first link 472, as specifically shown in FIGS. 49-54. The first link 472 is substantially elongated and is connected at its end through a connection point 474 to the back 408. The other end of the first link 472 is connected through a link point 476 to the seat 424. This link and connection point 476 is further connected to one end of an extension link 478. The other end of the extension link 478 is connected through a link point 480 to a long link 482. The opposing end of the long link 482 is connected through a link point 484 to a short link 486. The short link 486 is connected to an intermediate link 488 through a connection point 496. The short link 486, while being connected to the long link 482 and link point 484, is connected to or otherwise integral with an intermediate link 488 at a connection point 496. At the opposing end of intermediate link 488, the link is connected to a further link 494 through a link point 492. The opposing end of the further link 494 is secured to the back 408 through the connection point 490.

Figure 49:
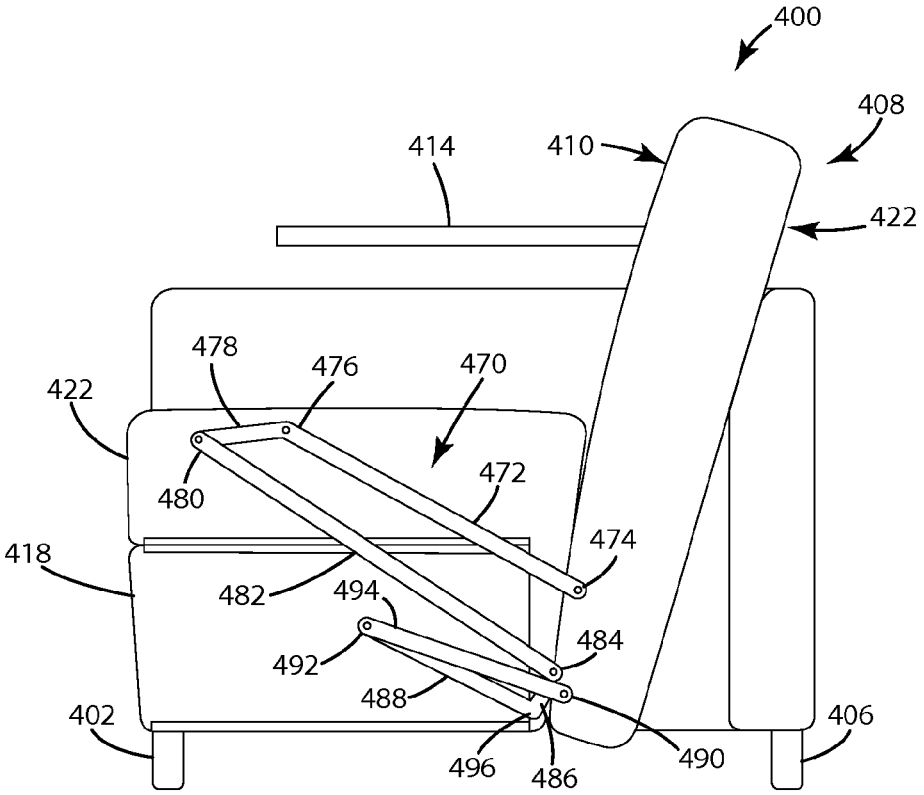
FIG. 49 is a side, elevation view of the furniture system shown in FIG. 1, with one of the linkage mechanisms shown in a cutout configuration and showing the system in a sitting configuration.
Figure 50:
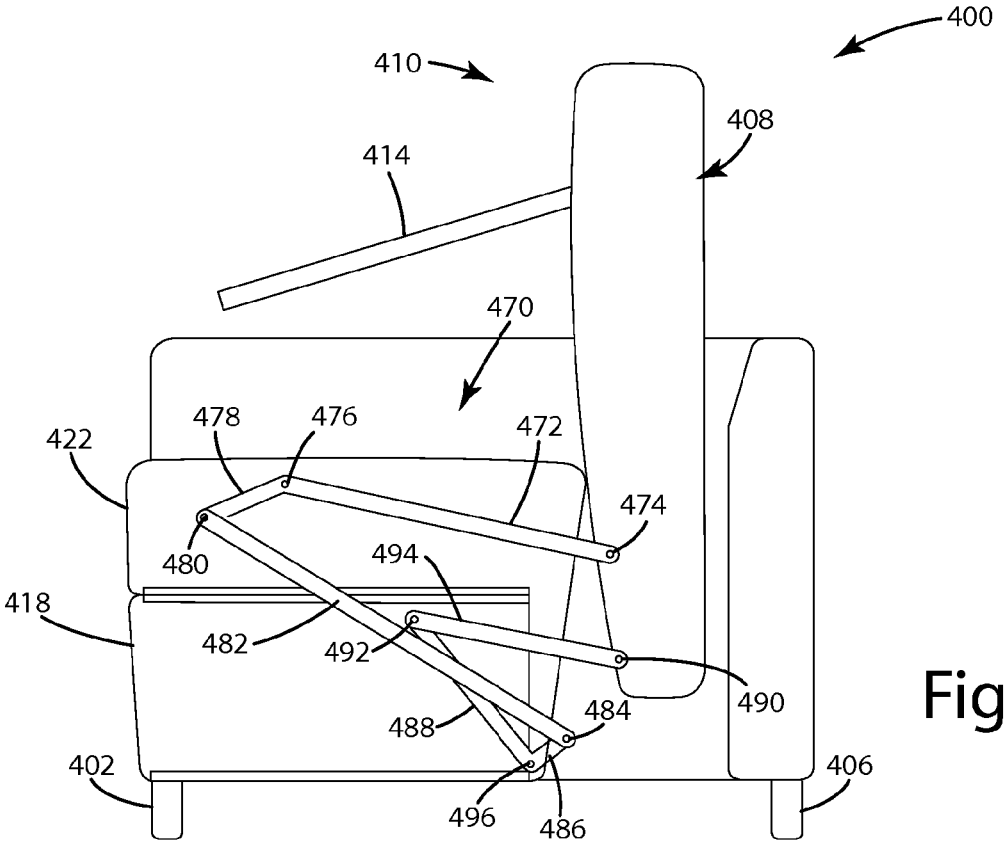
FIG. 50 is a side, elevation view of the furniture system shown in FIG. 49, but showing the system as it initially moves away from the sitting configuration.
Figure 51:
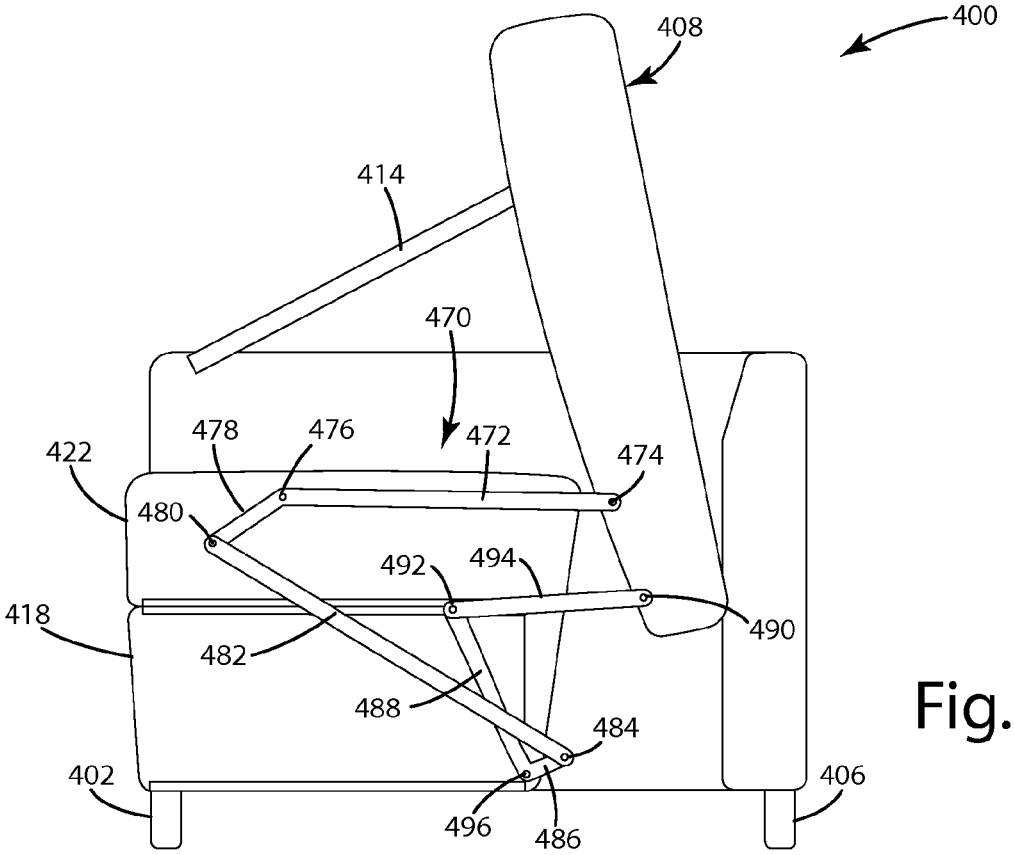
FIG. 51 is a right-side elevation view of the furniture system shown in FIG. 49, and showing still further movement of the system away from the sitting configuration and toward the sleep configuration.
Figure 52:
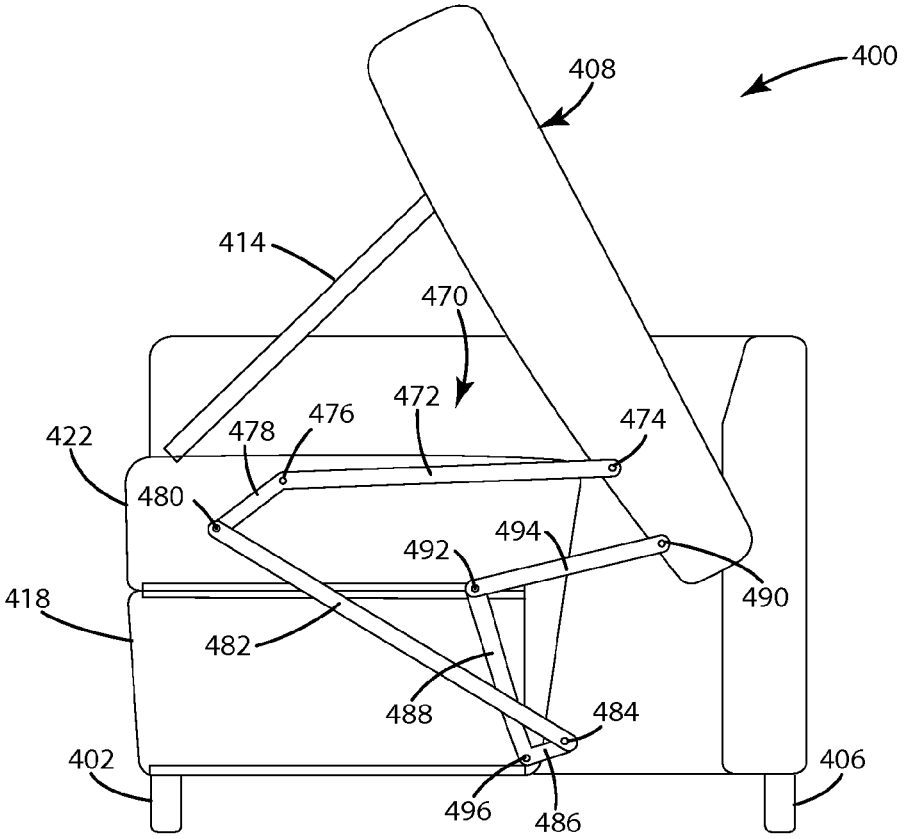
FIG. 52 is a right-side elevation view of the furniture system shown in FIG. 49, but with further movement toward the sleep configuration.
Figure 53:
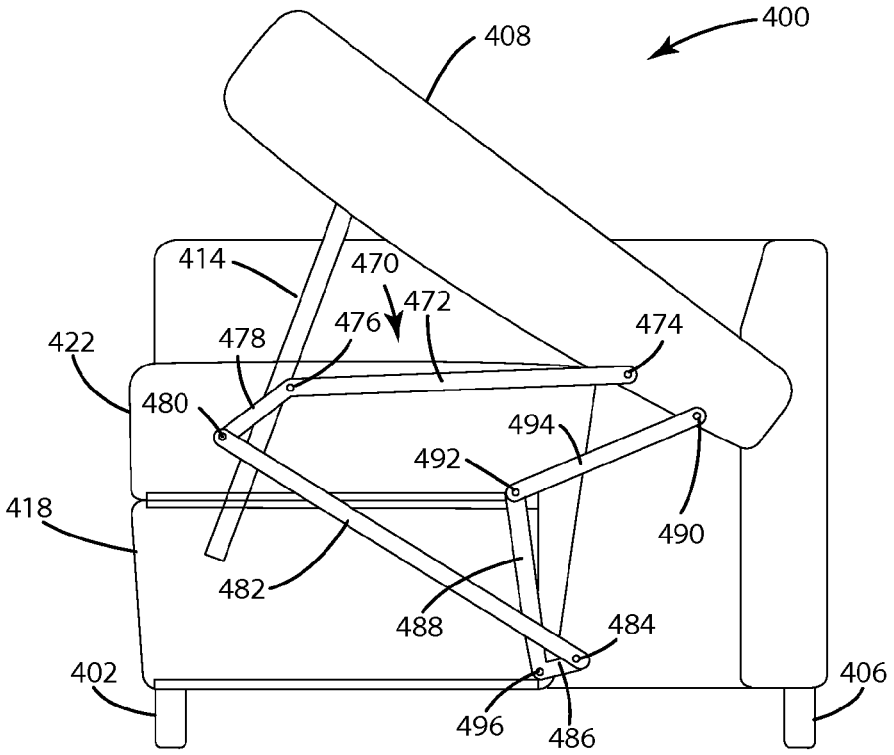
FIG. 53 is another right-side elevation view of the furniture system shown in FIG. 49, as the system nears its position in a sleep configuration.
Figure 54:
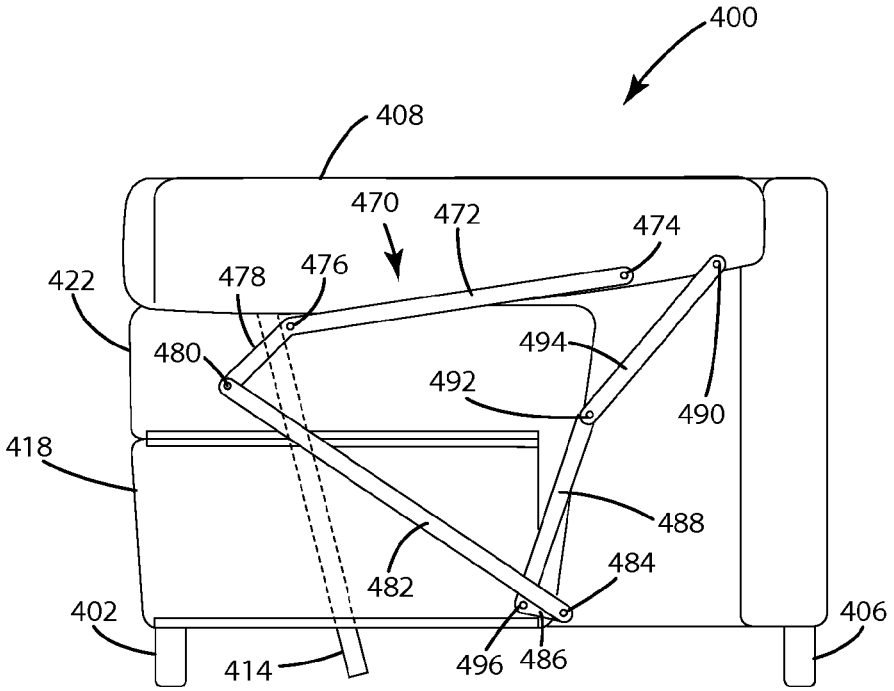
FIG. 54 is a right-side perspective view of the furniture system shown in FIG. 49, with the system in a final sofa, bed or sleep configuration.

It should be noted that although there is a connection of the back 408 to the first link 472 and the further link 494 through connection points 474 and 490, respectively, these connection points 474 and 490 permit the furniture back 408 to rotate relative to the aforedescribed links. In this regard, the configuration of the linkage mechanism 470 when the back 408 is in an upright position and the furniture system 400 is in a full sitting configuration is shown in FIG. 49. FIG. 50 illustrates the orientation of the linkage mechanism 470 as a user would pull forwardly on the back 408, so as to start to move the back 408 away from the sitting configuration. FIG. 51 illustrates a further orientation of linkage mechanism 470 as the back 408 is further pulled forwardly by the user. FIGS. 52 and 53 illustrate further orientations of the linkage mechanism 470 as the back 408 is moved toward the sleep configuration. In this regard, FIG. 54 specifically illustrates the linkage mechanism 470 when the back 408 is fully reclined and the entirety of the furniture system 400 is in the sleep configuration.

Figure 36:
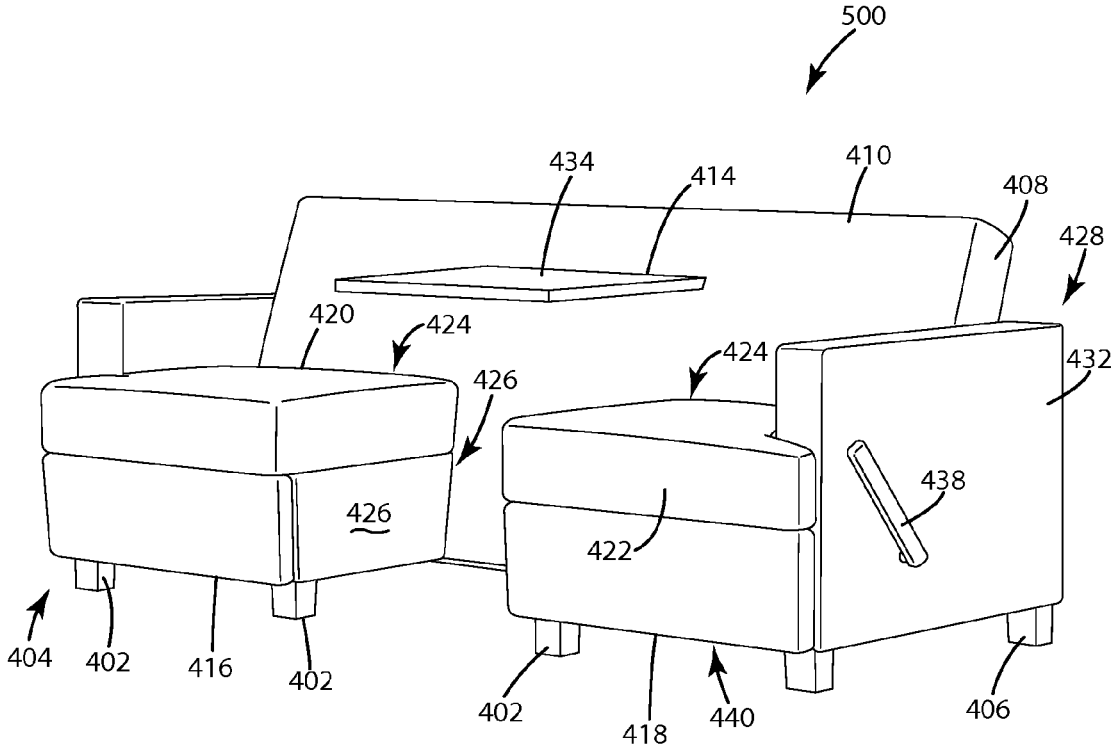
FIG. 36 is a right-side perspective view of a further embodiment of a furniture system in accordance with the invention, with the embodiment showing a lever for purposes of manipulating an integrated footrest or ottoman.
Figure 37:
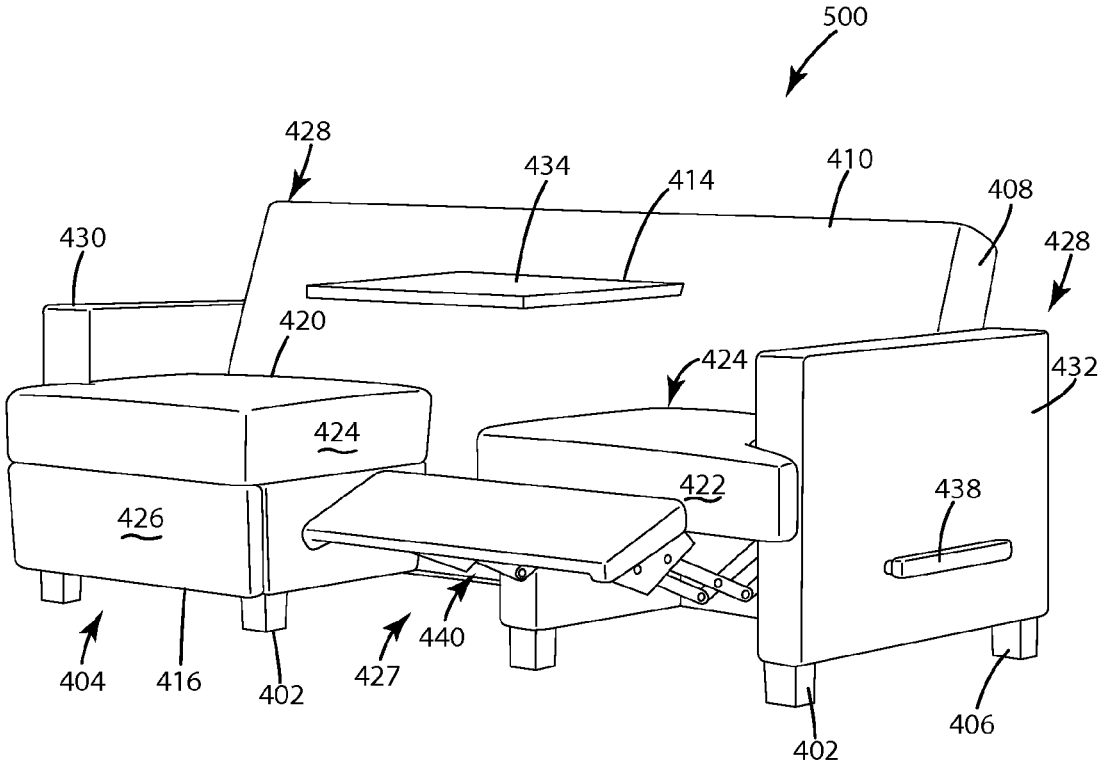
FIG. 37 is a right-side perspective view of the furniture system shown in FIG. 36, but with the system having the ottoman in an extended position.

As previously described, other configurations of furniture systems in accordance with the invention can provide for integrated storage and footrests or ottoman functions. For example, FIGS. 36 and 37 illustrate another embodiment of a furniture system 500 in accordance with the invention. The furniture system 500 includes at least one ottoman or footrest 440 positioned within the right side base 418. The ottoman or footrest 440 cannot actually be seen in FIG. 36, as it is in a retracted position. The ottoman or footrest 440 is operated through the lever arm 438. Details associated with the use of a linkage mechanism for purposes of operating an ottoman through the use of a lever arm at the side of a furniture system were previously shown in FIG. 30 and also previously described herein in the detailed description of FIG. 30. A similar linkage arrangement for operating the ottoman or footrest 440 through the lever arm 438 can be utilized with respect to the furniture system 500. FIG. 36 illustrates the ottoman or footrest 440 in the retracted position, while FIG. 37 illustrates the ottoman or footrest 440 in the extended position.

Figure 38:
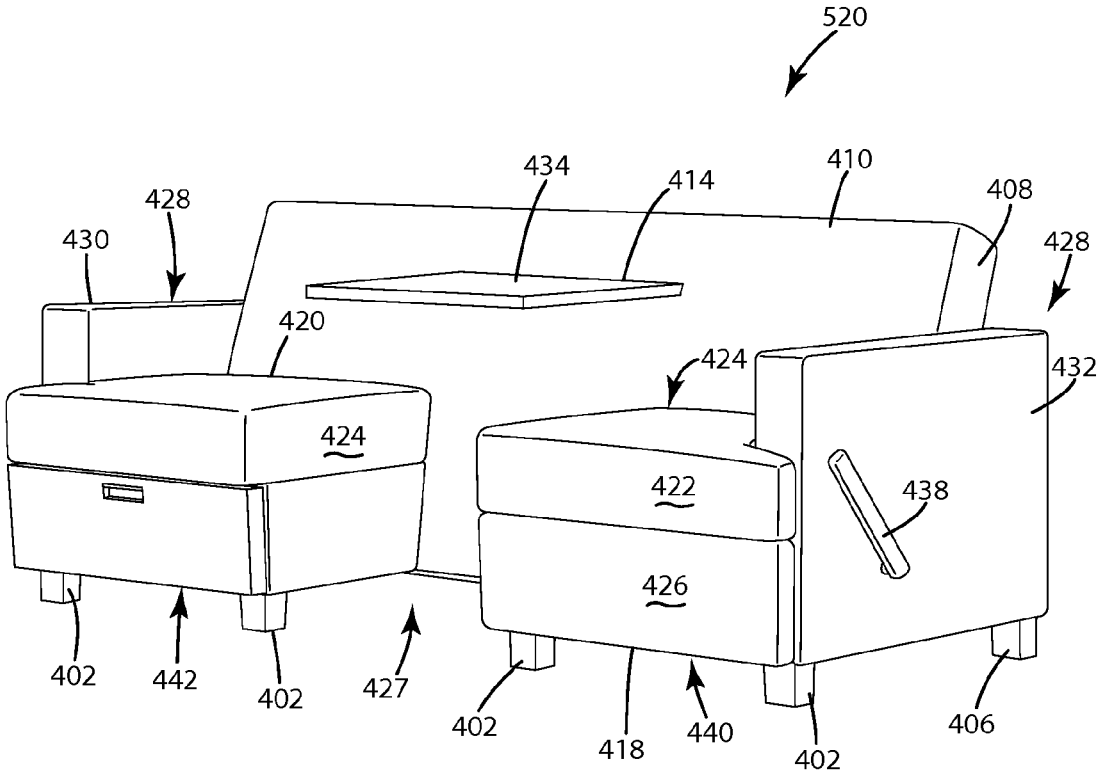
FIG. 38 is a right-side perspective view of a still further embodiment of a furniture system in accordance with the invention, showing a system having an ottoman in a retracted position, and a storage drawer in a closed position.
Figure 39:
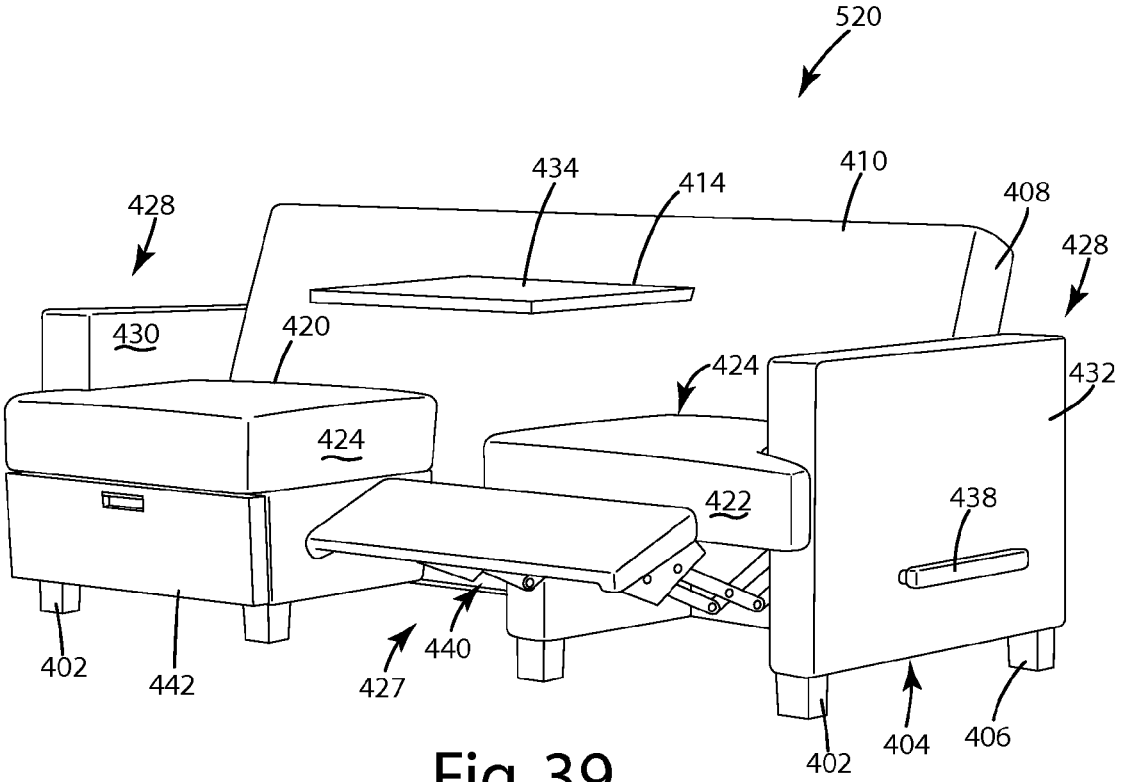
FIG. 39 is a right-side perspective view of the furniture system shown in FIG. 38, but showing the ottoman in an extended position.

FIGS. 38 and 39 illustrate a further embodiment 520 of a furniture system in accordance with the invention. FIG. 38 illustrates an ottoman or footrest 440 in a retracted position, and further illustrates a storage drawer 442 positioned below the seat 420 within the base 416. The storage drawer 442 is shown in the retracted position. FIG. 38 illustrates the ottoman or footrest 440 in the retracted position, while FIG. 39 illustrates the ottoman or footrest 440 in the extended position.

Figure 40:
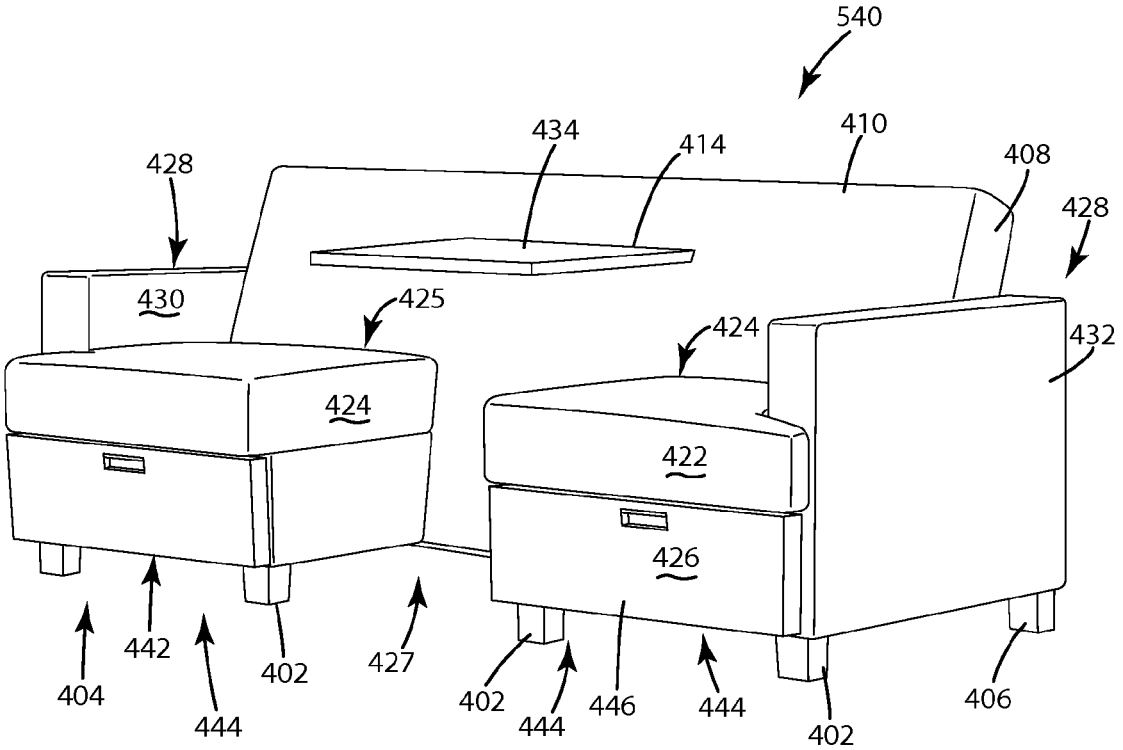
FIG. 40 is a right-side perspective view of a still further embodiment of a furniture system in accordance with the invention, with the system having a pair of storage drawers, shown in retracted positions.
Figure 41:
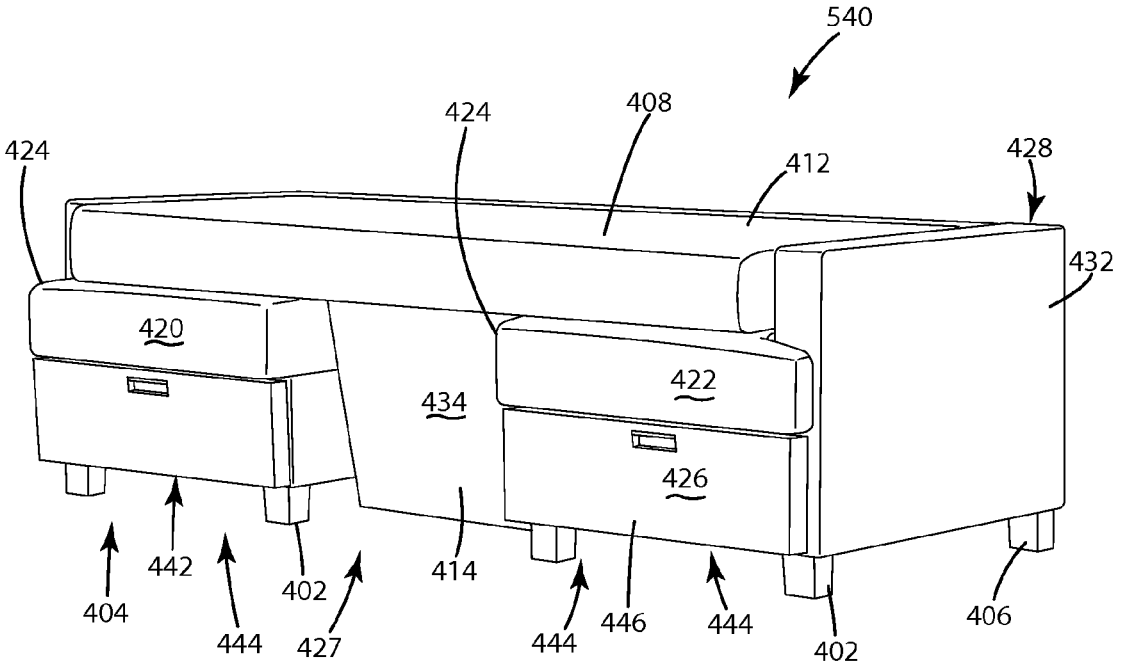
FIG. 41 is a right-side perspective view of the furniture system shown in FIG. 40, but showing the system in a sleep configuration.
Figure 42:
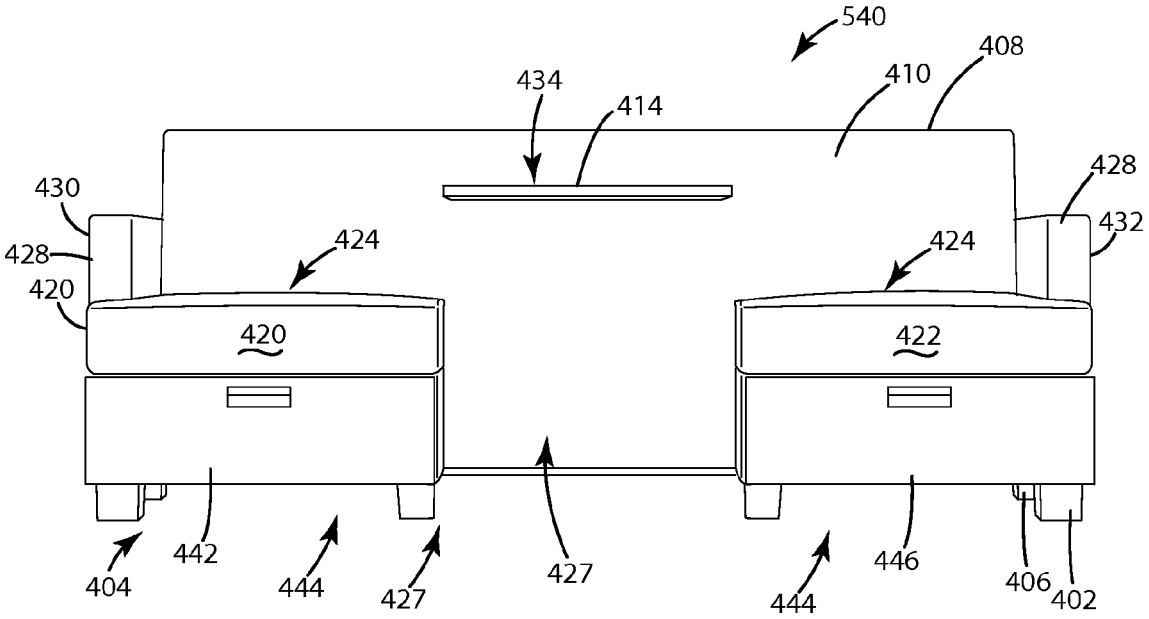
FIG. 42 is a front, elevation view of the sleep system shown in FIG. 40, and showing the system in a sitting configuration.
Figure 43:
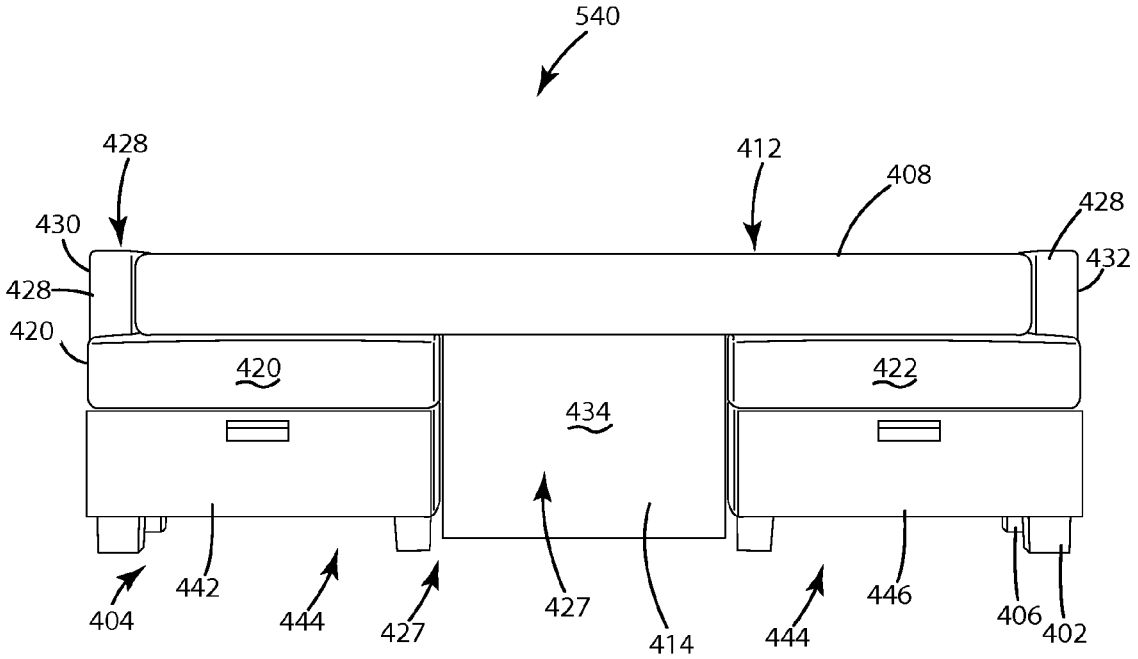
FIG. 43 is a front, elevation view of the furniture system shown in FIG. 40, but showing the system in a sleep configuration as also shown in FIG. 41.
Figure 44:
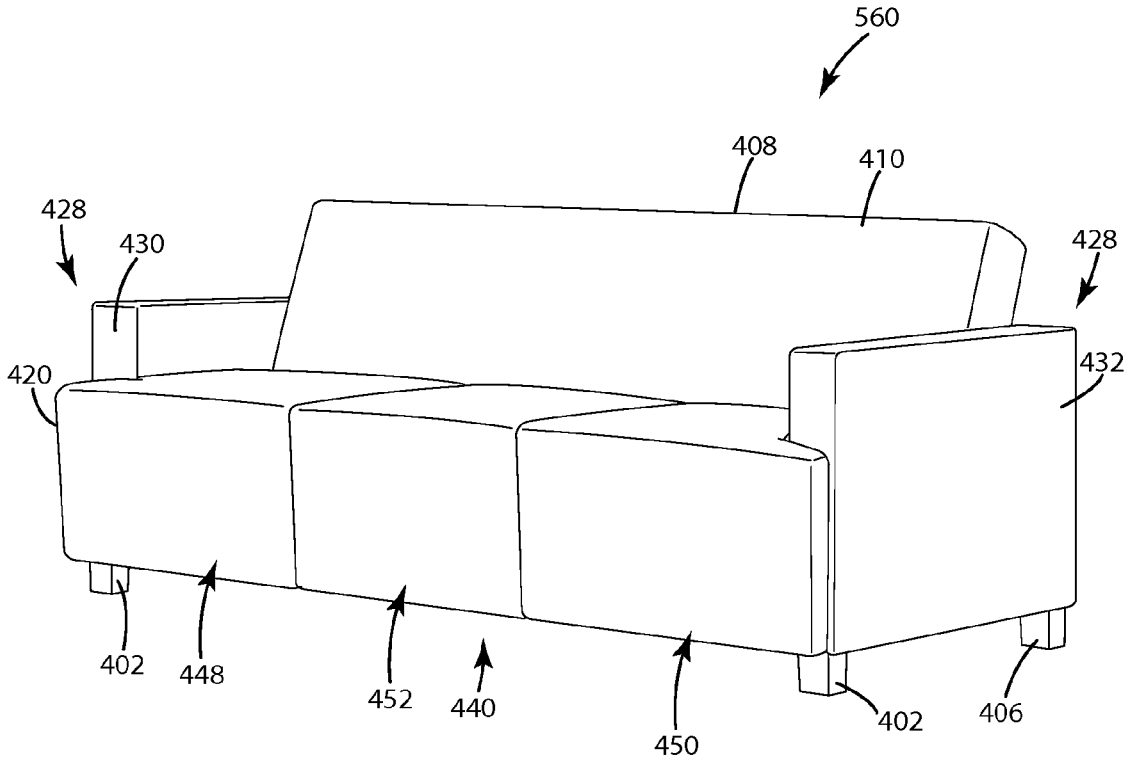
FIG. 44 is a right-side perspective view of yet another embodiment of a furniture system in accordance with the invention, showing the system as having left and right-side bases and seats, along with a center base and seat.

An additional embodiment of the invention is shown as embodiment 540 as illustrated in FIGS. 40-43. The furniture system 540 does not include an ottoman or footrest, but instead includes a pair of storage drawers 444, identified as left-side storage drawer 442 and right-side storage drawer 446. FIGS. 40 and 42 illustrate the furniture system 540 in a sitting configuration, while FIGS. 41 and 43 illustrate the furniture system 540 in a sleep configuration.

Figure 45:
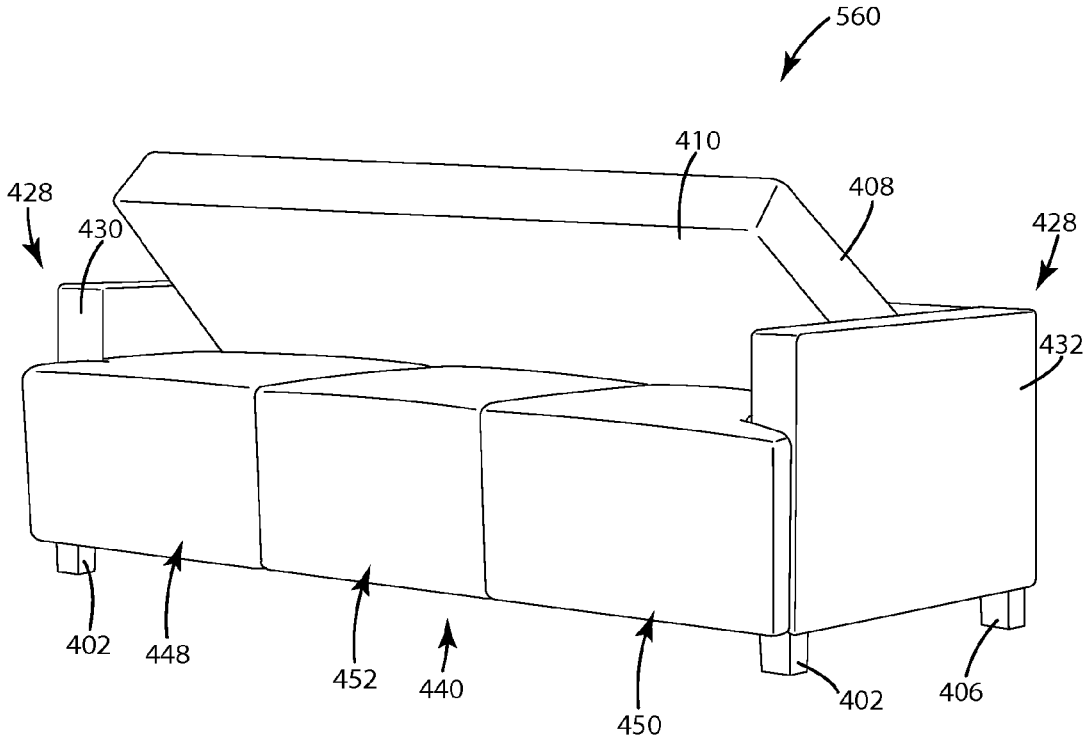
FIG. 45 is a right-side perspective view of the furniture system shown in FIG. 44, but showing the system in an orientation which is substantially half way between a sitting configuration and a sleep configuration.
Figure 46:
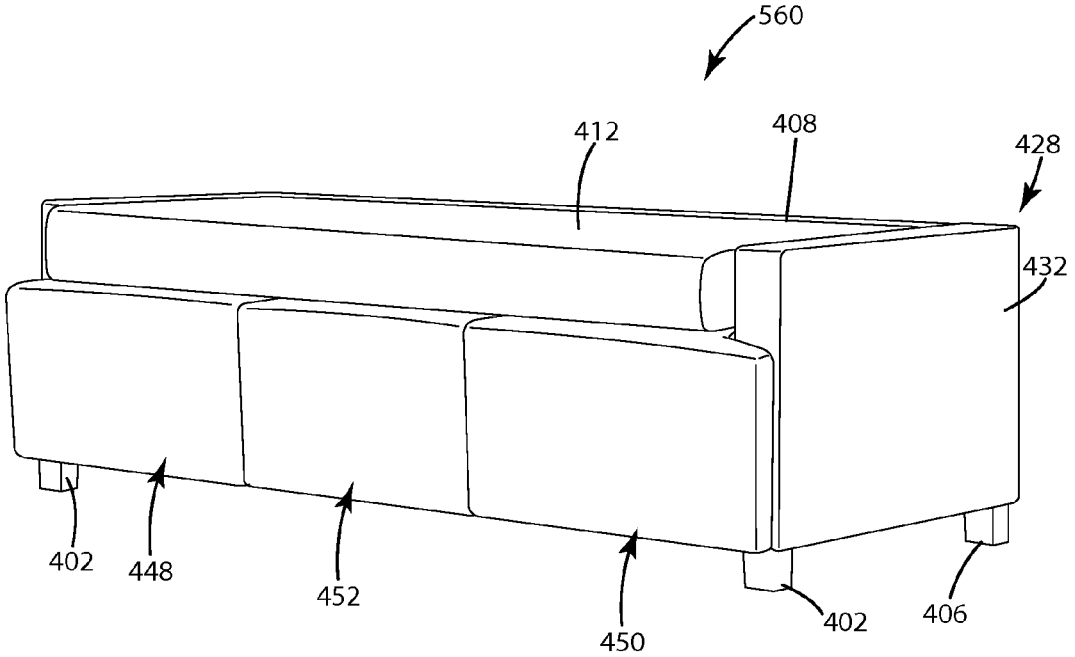
FIG. 46 is a right-side perspective view of the furniture system shown in FIG. 44, but showing the system in a sleep configuration.
Figure 47:
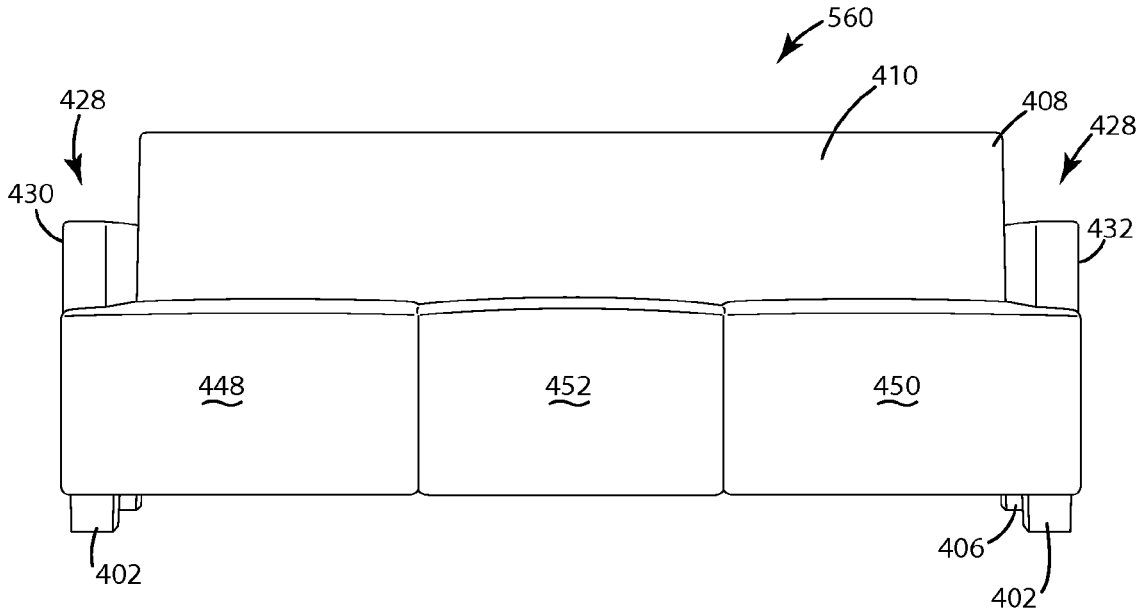
FIG. 47 is a front, elevation view of the furniture system shown in FIG. 44, and showing the system in a sitting configuration.
Figure 48:
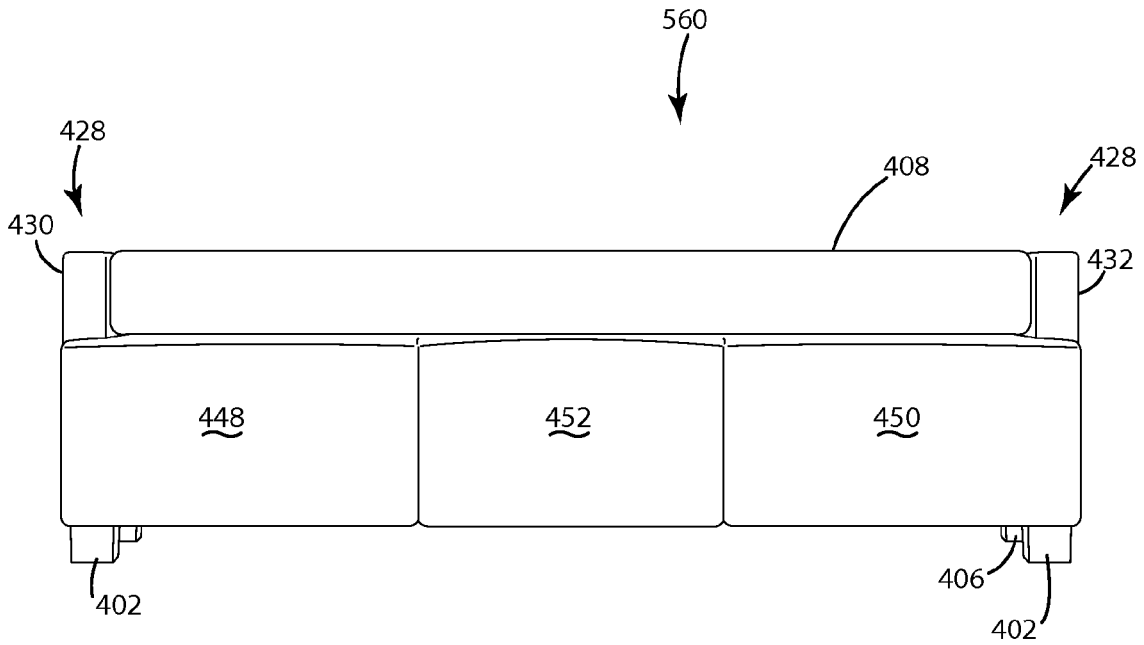
FIG. 48 is a front, elevation view of the furniture system shown in FIG. 44, and showing the system in a sleep configuration.

A still further embodiment of a furniture system in accordance with the invention is illustrated in FIGS. 44-48. The furniture system 560 is illustrated in a sitting configuration in FIGS. 44 and 47. FIGS. 46 and 48 illustrate the furniture system in a sleep configuration. FIG. 45 illustrates the furniture system 560 as it is being moved between a sitting configuration and sleep configuration. The particular embodiment 560 of a furniture system in accordance with the invention does not include any ottoman or footrest, or any storage drawers. However, the furniture system 560 includes a left-side base and seat configuration 448, and a right-side base and seat configuration 450. Still further, and in accordance with the invention, the furniture system 560 includes a center base and seat configuration 452. The center base and seat configuration 452 is positioned in the center of the furniture system 560, intermediate the right and left-side base and seat configurations 446, 448, respectively.

The principles of the present invention will now be described with respect to an embodiment of a furniture system 600 in accordance with the invention. Furniture system 600 is described with respect to FIGS. 55-99. A number of the principal concepts associated with sofa and sleep conversion mechanisms, sleep systems and basic concepts associated with the use of a work surface with a furniture system have been described in prior paragraphs herein. Accordingly, many of these details will not be repeated, although they clearly are associated with furniture system 600 and other embodiments of furniture systems in accordance with the invention.

Figure 55:
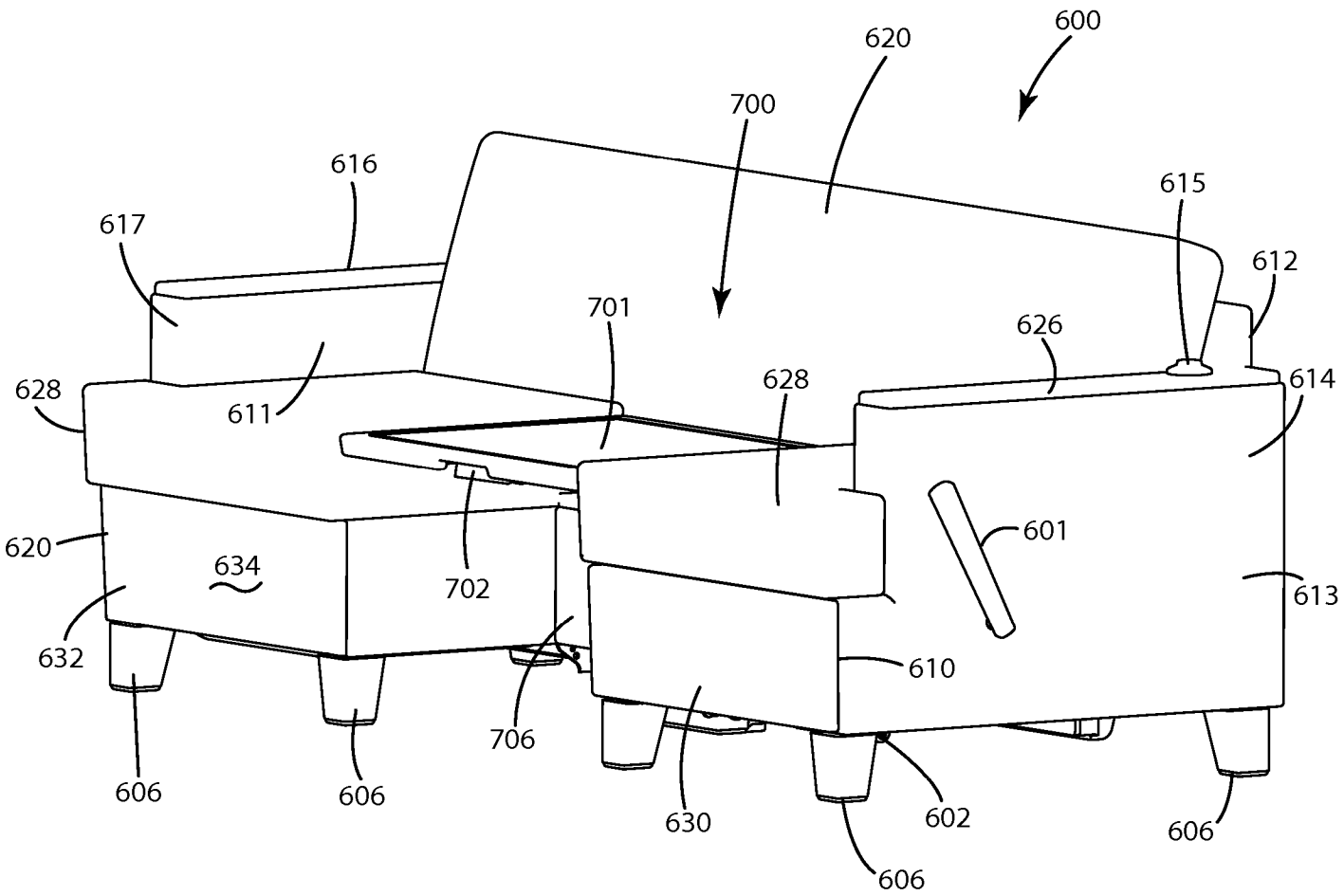
FIG. 55 is a right-side perspective view of a further embodiment of a furniture system in accordance with the invention, and expressly showing an adjustable table or desk assembly in a lowered configuration, with the furniture system having integrated footrests or ottomans levers for manipulating the footrests and push button actuator for initiating motion of the back inner for presentation and conversion to a sleep surface.
Figure 56:
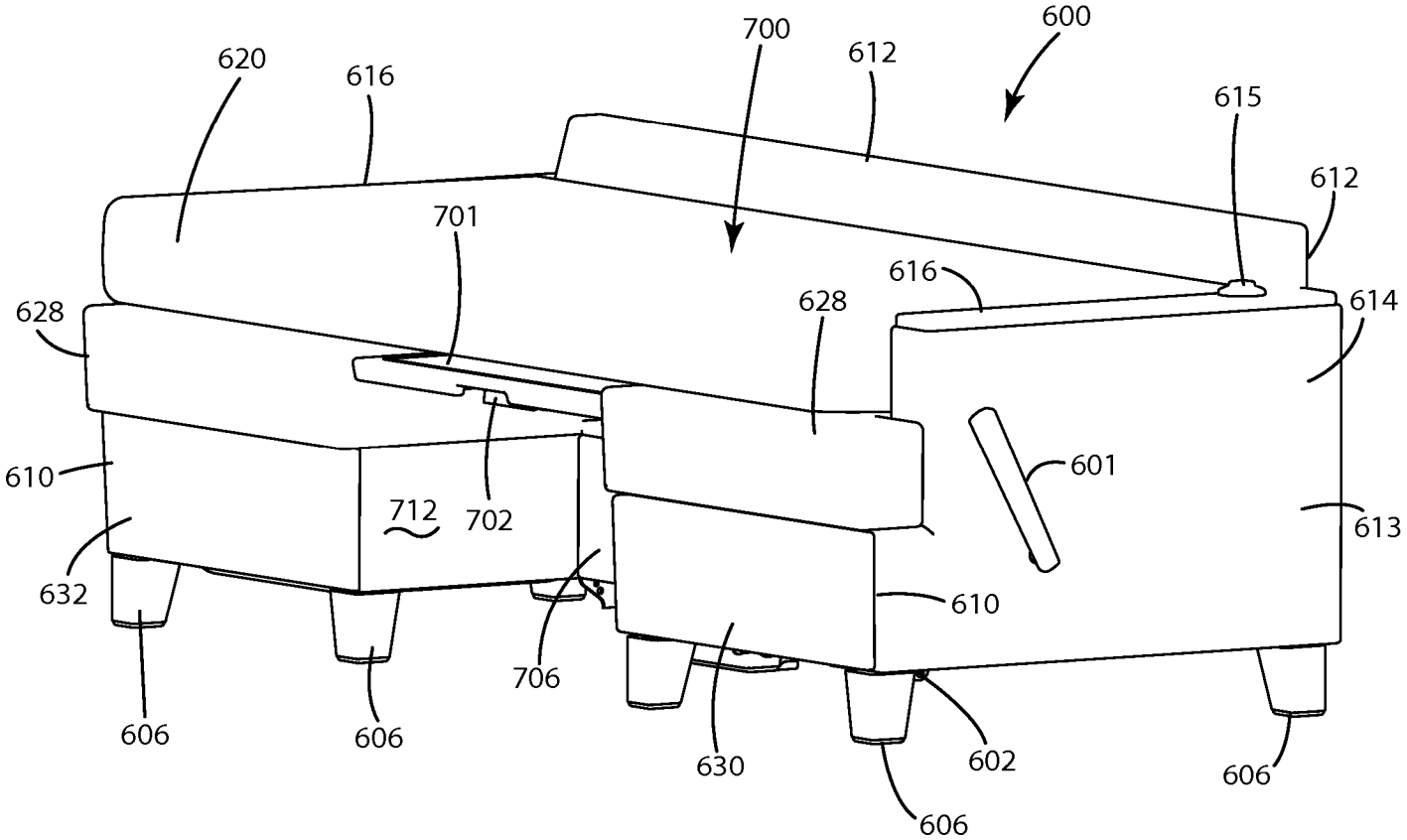
FIG. 56 is a right-side perspective view of the furniture system shown in FIG. 55, with the adjustable table assembly in a lowered position, and the inner back in a lowered sleep surface configuration.

Referring first to FIGS. 55 and 56, the furniture system 600 is illustrated in FIG. 55 in a sofa configuration. FIG. 56 illustrates the system 600 in a sleep configuration. FIGS. 57-61 illustrate side, elevation and partially "cutaway" views of the system 600, for purposes of illustrating the use of linkage mechanisms in converting the furniture system 600 from a sofa to a sleep configuration.

As shown in these illustrations, the furniture system 600 can include a lower base 602 having any of a number of various supporting configurations. The lower base 602 is connected to other structural components through a connecting frame 604. The base 602 and frame 604 can be structured in various embodiments. Integral with or otherwise secured to the lower base 602 are a series of front legs 606 and rear legs 608. Upstanding and adjacent the front legs 606 are a pair of front corners 610. Located at the rear of the furniture system 600 and extending upwardly from the rear legs 608 is a stationary furniture back or outer back 612. The outer back 612 can be characterized as providing a main structural member for the furniture system 600, while also providing support for the movable high back cushion or inner back 620 (described in subsequent paragraphs herein).

Secured to the front of the stationary furniture back 612 adjacent the lateral edges thereof are a pair of sides 614, comprising a left arm 611 and a right arm 613. Like the outer back 612, each of the arms 611 and 613 can be characterized as a main structural member of the furniture system 600. Further, located within each of the arms 611, 613 are mechanisms characterized as "conversion mechanisms". Specifically, the conversion mechanism positioned within the arm 611 is characterized as left-side conversion mechanism 801. Correspondingly, the linkage mechanism associated with the right arm 613 (corresponding to the linkage mechanism primarily shown within the several views of the drawings) is characterized as right-side conversion mechanism 800. The mechanisms 800 and 801 are substantially similar in structure but may function with certain differences which will be made apparent from subsequent description herein (see, for example, the push button actuator 615 which is connected into the right-side mechanism 800). Collectively, the mechanisms 800, 801 are characterized as a "linkage mechanism" 880. It should be noted that each of the mechanisms 800, 801 is configured and packaged so as to exist within the interiors of the sides 614. Positioning the mechanisms 800, 801 in these "hidden" interiors essentially eliminates a safety hazard which exists with respect to other linkage mechanisms which may have physically accessible "pinch points" and other structures of potential harm.

As described in subsequent paragraphs herein, the linkage mechanisms 800, 801 operate so as to mechanically provide the conversion of the furniture system 600 between sleep and sofa configurations. The sides 614 extend forwardly and can include corresponding armrests 616 positioned on the top of the sides 614. As further shown in FIGS. 55 and 56, the system 600 also includes a movable high back cushion or inner back 620. The movable back cushion 620, with the system 600 in a sofa configuration (as shown in FIGS. 55 and 56), is supported on the stationary outer back 612. The high back cushion or inner back 620 provides a back cushion when the furniture system 600 is in the sofa configuration, and further provides a sleep surface (with the rear surface of the inner back 620 providing the upward facing sleep surface) when the furniture system 600 is in the sleep configuration.

As previously described with respect to other furniture systems set forth herein, it is advantageous to provide means for facilitating the initiation of movement of the furniture system 600 from the sofa configuration to a sleep configuration. In part, the means for facilitating initial movement helps to overcome the inertial forces which exist for the furniture system 600 and inner back 620 when the system 600 is stationary and in the sofa configuration. With respect to the furniture system 100 previously described herein and illustrated in FIGS. 1 and 2, a removable high back cushion 120 included a handle 122 accessible to the user. The user could be positioned in the front of the furniture system 100, and pull forwardly on the handle 122 to initiate movement of the system 100 from a sofa configuration to a sleep or bed configuration.

In accordance with further concepts of the invention, and to also facilitate the capability of the user to initiate furniture system movement, the furniture system 600 includes what is characterized as a push button actuator 615 mounted on the arm rest 616 associated with the right arm 613, although the actuator 615 can be positioned in any of a number of desired positions. The push button actuator 615 is directly associated with the mechanism 800 (as described in subsequent paragraphs herein) and is adapted for use by an end user for purposes of engaging a conversion mechanism latch (described in subsequent paragraphs herein). Engaging the conversion mechanism latch will cause the inner back 620 to initiate forward motion and present itself for conversion to a sleep surface. If desired, the use of the push button actuator 615 can take the place of a handle or similar device associated with the inner back 620 which the user may physically engage and pull forward so as to initiate the conversion process. For persons of small stature or those with certain disabilities, the push button actuator 615 can be particularly advantageous.

The furniture system 600 can also include a pair of opposing seat cushions 628. The seat cushions 628 can remain stationary during conversion movement of the furniture system 600 between the sofa configuration and the bed or sleep surface configuration. The seat cushions 628 provide both a seating surface when the system 600 is in the sofa configuration, and a sleep surface "support" when the system 600 is in the sleep configuration.

In addition to the foregoing components of the system 600, the system can include one or a pair of extendable and retractable integrated ottoman foot rests 630. An ottoman foot rest 630 is shown in a retracted configuration in FIG. 55, and is positioned below the seat cushion 628 on the right side of the system 600 as looking toward the back of the same. Accordingly, in both FIGS. 55 and 56, the ottoman foot rest 630 is substantially hidden from view. Details associated with the foot rest 630 are set forth in subsequent paragraphs herein, with respect to a description of the illustrations of FIGS. 93 and 94. Still further, the furniture system 600 can include an ottoman actuator lever 601, illustrated in a number of the drawings, including FIGS. 55 and 56. The actuator lever 601 can be manually operated by the user for purposes of extending and retracting the ottoman foot rest 630. In addition to the ottoman foot rest 630, the system 600 can include an extendable and retractable drawer assembly 632. The drawer assembly 632, like the ottoman foot rest 630, is also located below one of the seat cushions 628 and is shown in a retracted position in FIGS. 55 and 56. A drawer front panel 634 is specifically shown in FIGS. 55 and 56, while details relating to the drawer assembly 632 which may be utilized in accordance with the invention are described in subsequent paragraphs herein, and illustrated in FIGS. 96 and 97.

FIGS. 55 and 56 also partially illustrate an adjustable table assembly 700, having a tabletop 701. As will be made apparent from subsequent description herein, concepts associated with the adjustable table assembly 700 form a number of the principal concepts of the invention. In particular, it should be noted that in accordance with certain aspects of the invention, not only is an adjustable table assembly 700 provided, but the table assembly 700 is provided within a furniture system which provides for a number of different functional configurations. The advantages of the adjustable table assembly 700 in accordance with the invention will be described in subsequent paragraphs herein with respect to operation of the adjustable table assembly 700. Also illustrated in FIGS. 55 and 56, as part of the adjustable table assembly 700, is a table 60 mechanism brake release handle 702 and table skirt 706. The brake release handle 702 is an input device employed by the end user to disengage the table mechanism brake by way of a table mechanism brake link described and illustrated in subsequent paragraphs herein. The release of the table mechanism brake allows the table mechanism to be moved into one of three positions. Greater details regarding the table assembly 700 and the adjustable positioning of a table mechanism 710 will be described in subsequent paragraphs herein with respect to additional illustrations.

As earlier stated, the furniture system 600 employs a conversion mechanism 880 comprising linkage mechanisms 800, 801 which are associated with the furniture arms 612, 613, respectively.

Figure 88:
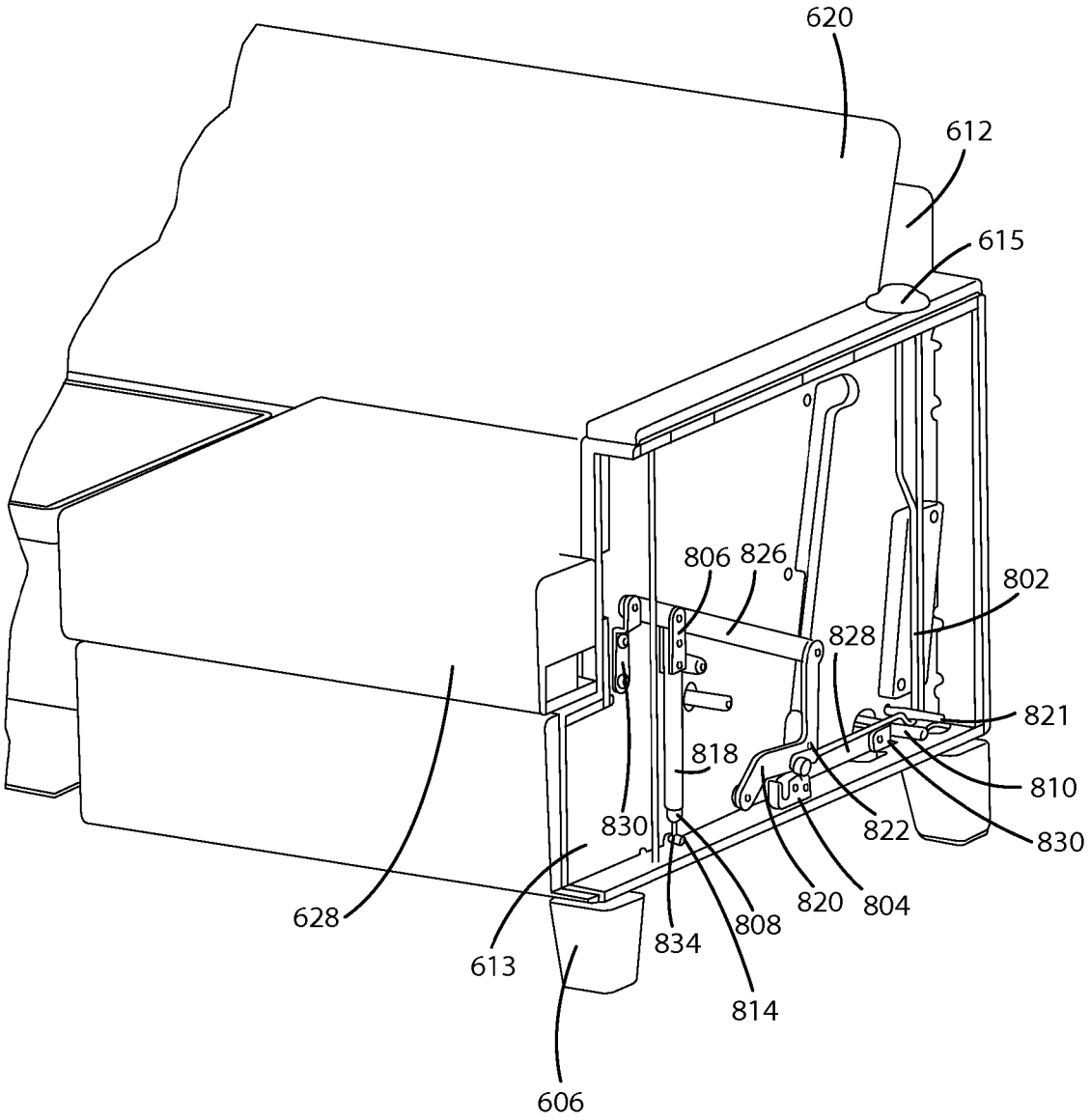
FIG. 88 is a right-side, front and perspective view of a cutaway portion of the conversion mechanism associated with one of the furniture system arms.
Figure 89:
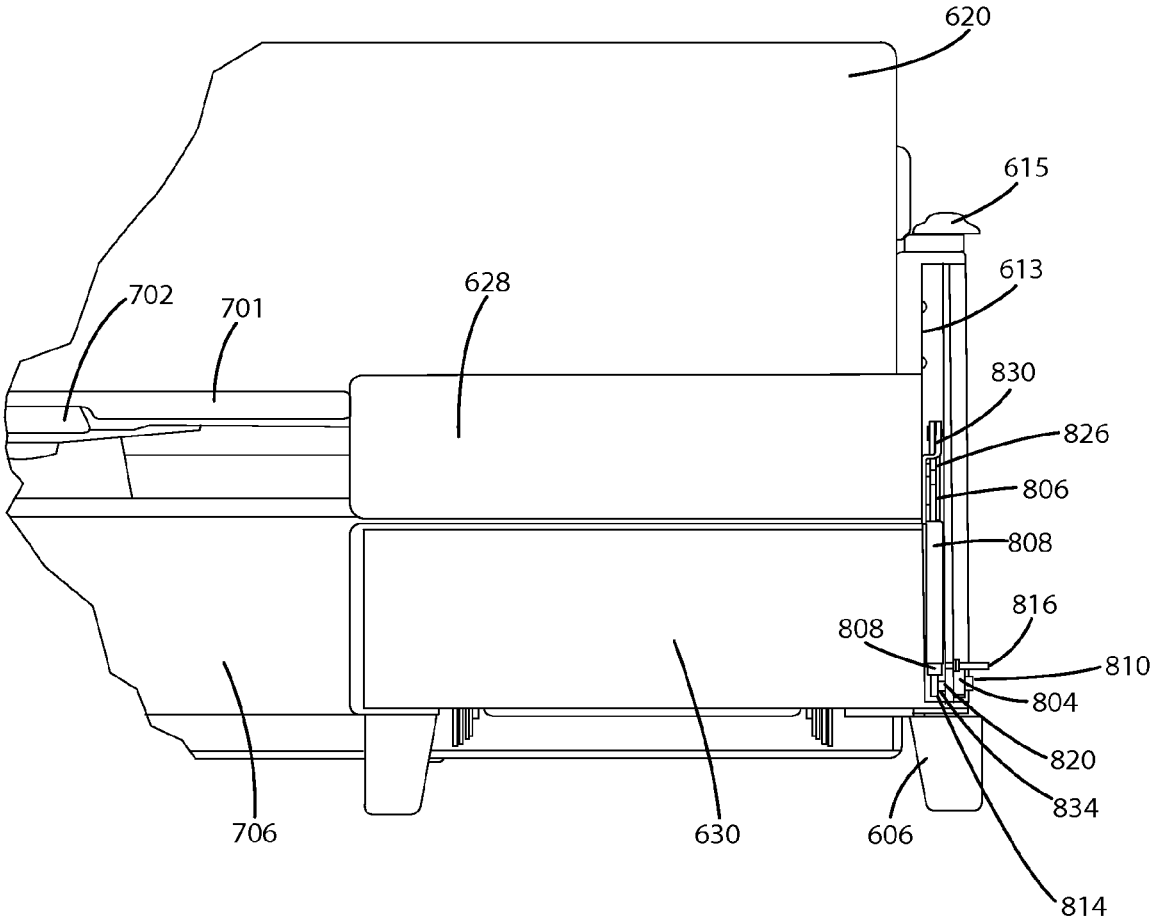
FIG. 89 is a front, elevation view of the portion of the furniture system showing FIG. 88.
Figure 90:
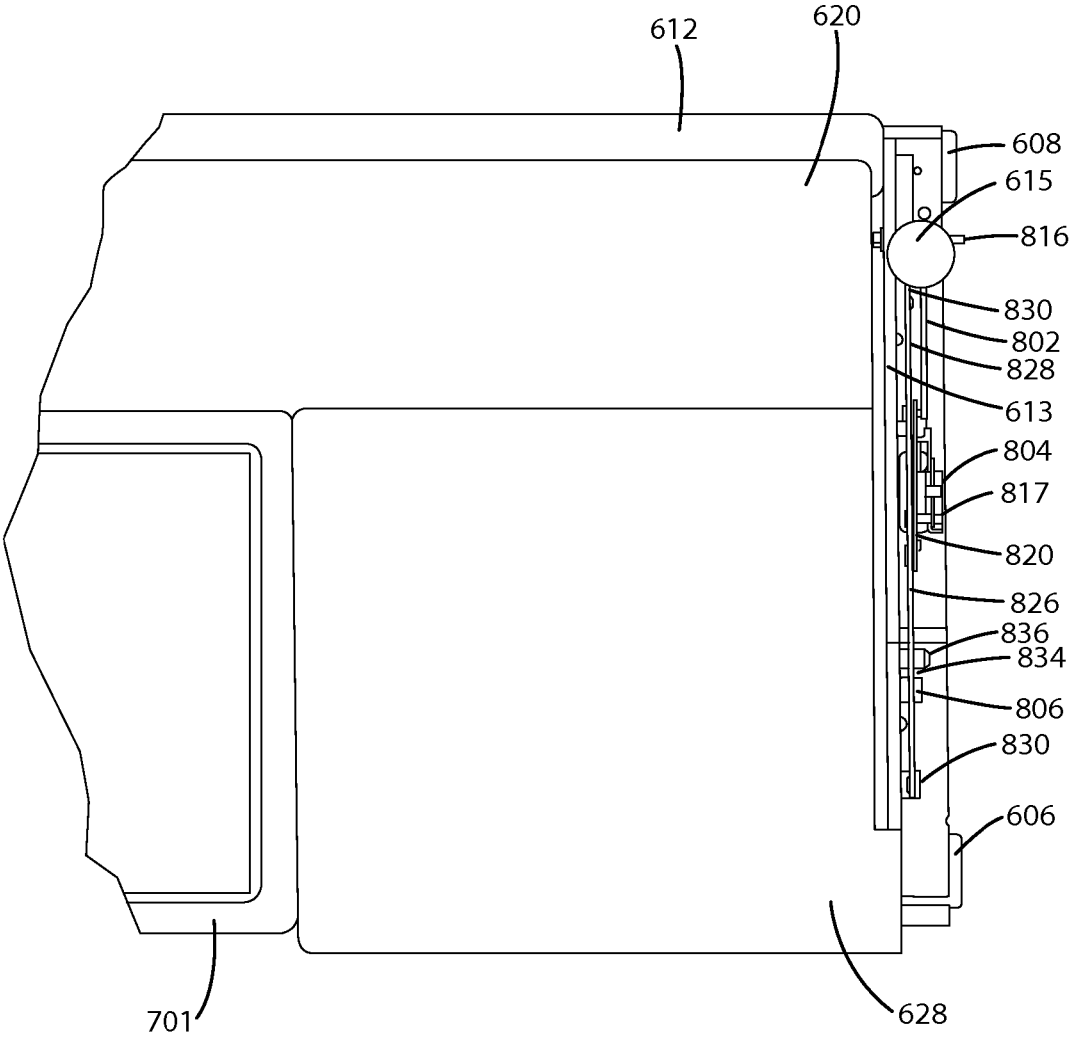
FIG. 90 is a plan view of the furniture system shown in FIG. 88.
Figure 91:
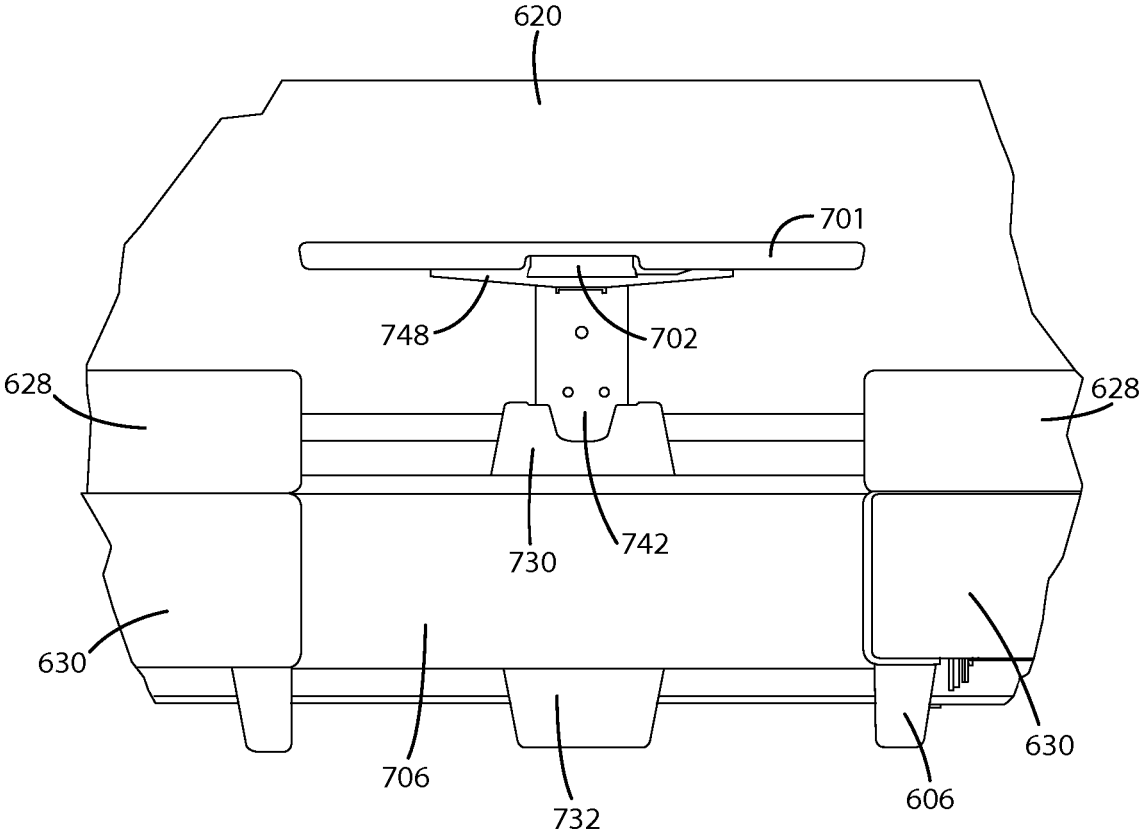
FIG. 91 is a front, elevation view of the table and adjustable table mechanism, showing the table in a mid level position.
Figure 92:
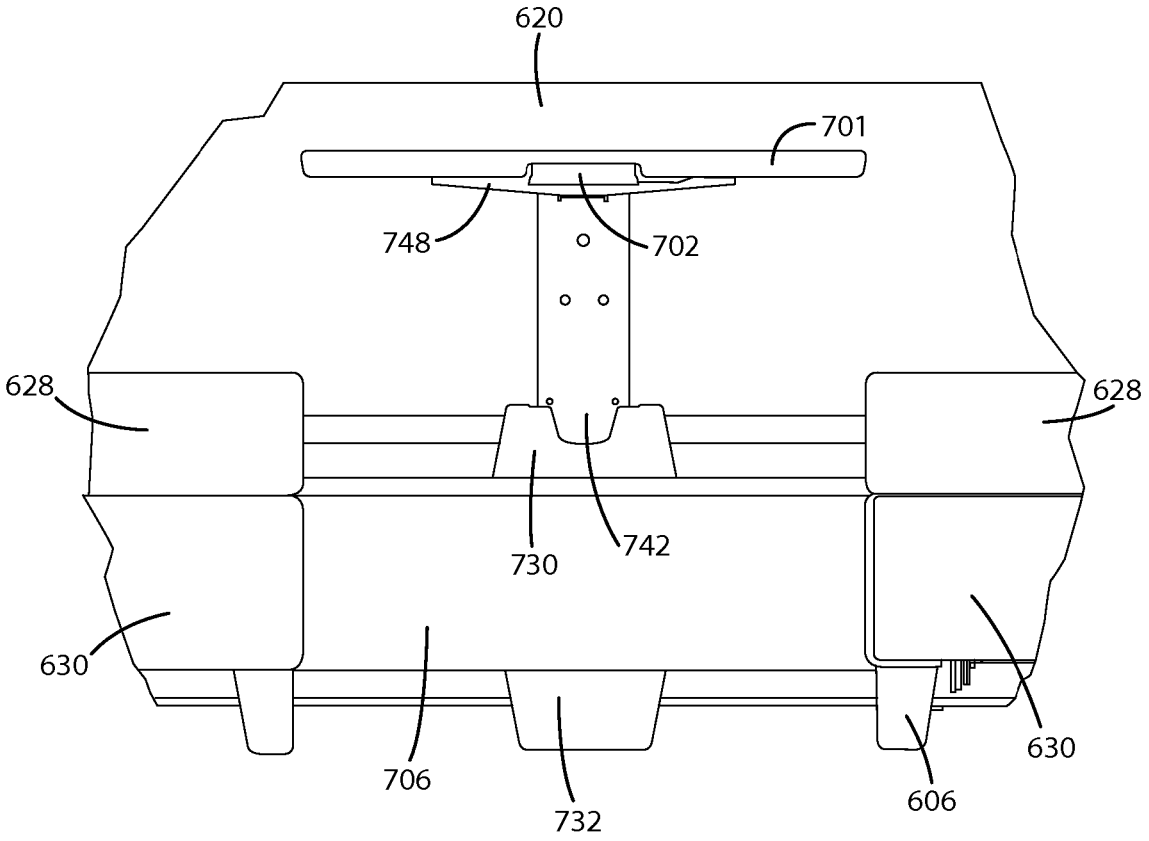
FIG. 92 is a front, elevation view of the adjustable table mechanism shown in FIG. 91, but showing the table in an uppermost or "top" position.
Figure 93:
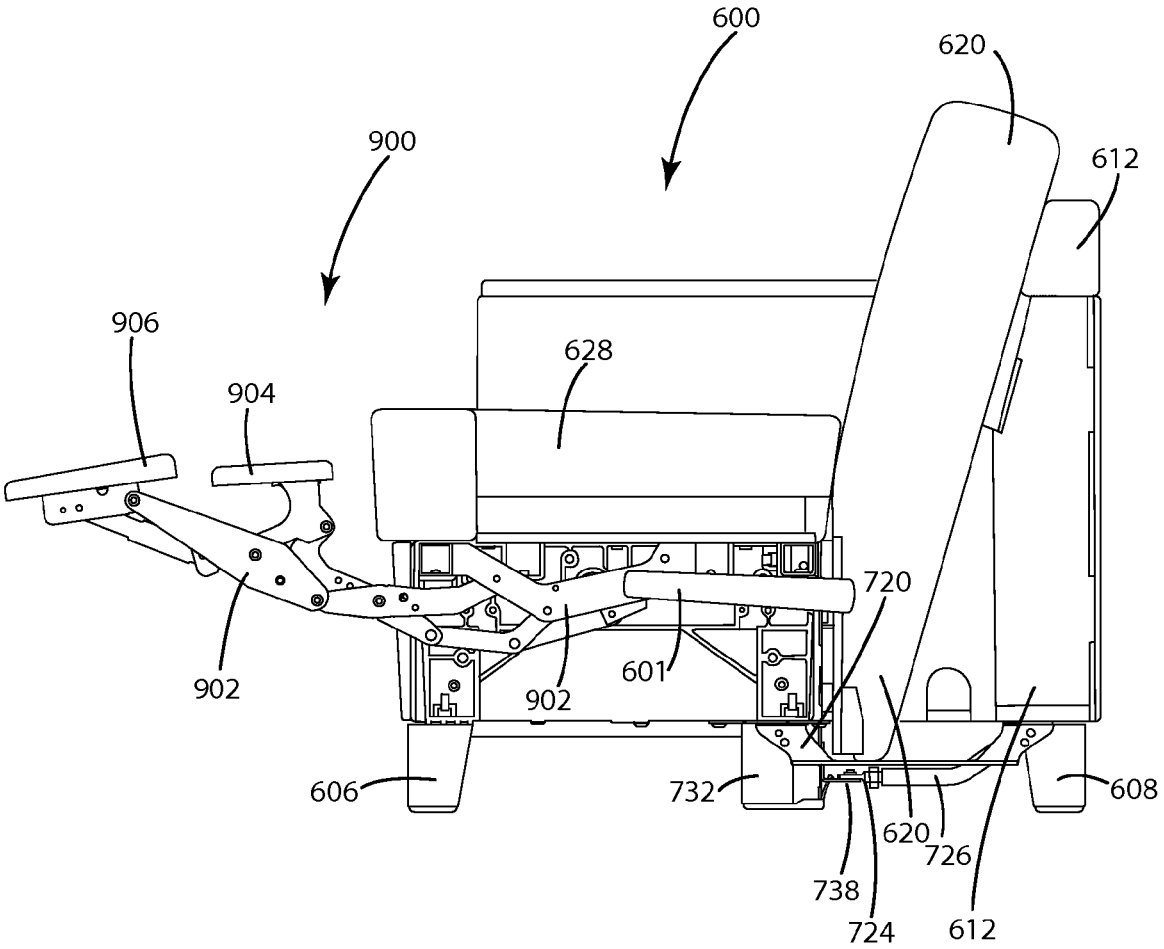
FIG. 93 is a right, elevation view of a footrest and mechanism for adjustable of the footrest.

Operation of the conversion mechanism 800 will now be described primarily with respect to FIGS. 57-61. However, additional drawings and written descriptions thereof as set forth in subsequent paragraphs herein are directed to a further understanding of the conversion mechanism 880. For example, FIGS. 62-66 are enlarged views of the linkage mechanism 800 as positioned and operable within the arms 611, 613. Correspondingly, FIGS. 67-73 are various views of components of the linkage mechanism 800, but shown in a standalone format independent of other elements of the furniture system 600. Still further, FIG. 88 illustrates a front, perspective view of the right arm 613 and linkage mechanism 800 when the furniture system is in the sofa configuration. In addition, FIG. 89 is a front, elevation view of one half of the furniture system 600, showing the linkage mechanism 800 within the right arm 613 in an exposed configuration, and with the system in a full sofa configuration. Correspondingly, FIG. 90 is a plan view of the linkage mechanism 800 shown in an exposed position, and further showing the right half of the furniture system 600.

Turning to the specific operation of the furniture system 600 and the linkage mechanism 880, the mechanism 800 (which is associated with the side 614 comprising the right arm 613) will be described in detail with regard to furniture system operation. However, as earlier stated, it should be understood that the linkage mechanism 801 (which is associated with the side 614 comprising the left arm 611) will essentially operate in tandem and is substantially structurally and functionally equivalent to the mechanism 800. Further, it shall be assumed that the furniture system 600 is first in the sleep configuration as illustrated in FIG. 55. With reference in particular to FIGS. 57-73, the user will activate the push button actuator 615, exerting downwardly directed forces on the same. The actuator 615, being characterized as an "end user input device", operates so as to disengage a conversion mechanism latch 804 (described in subsequent paragraphs herein). This disengagement will initiate movement of the inner back 620 into motion, for presenting itself for conversion to a sleep surface.

More specifically, when the push button actuator 615 is activated, the actuator 615 will cause downwardly directed forces to be exerted on an elongated push button link 802. The push button link 802 can be in a form of a formed steel rod that translates vertical input motion into a horizontal motion which releases the conversion mechanism latch 804. As the push button link 802 moves in a horizontal direction (as shown in the sequences from FIGS. 57-73, a push button link guide 810 is positioned near the bottom portion of the push button link 802, and provides a bearing surface for the push button link 802 to convert from vertical motion to horizontal motion. Operating in conjunction with the push button link guide 810 is a push button security bolt 816 which can be used to facilitate prevention of intentional or accidental misuse of the entirety of the linkage mechanism 880. It may be noted that at various locations within the right arm 613 links are positioned which can be characterized as mechanism mount links 830. One such mount link 830 is shown adjacent the push button link guide 810 located at the bottom portion of the push button link 802. Each mechanism mount link 830 associated with the right arm 613 provides for a connection within the linkage mechanism 880 which mounts the linkage mechanism 800 to the inside portion of the right arm 611. As the push button link 802 moves horizontally along the push button link guide 810, it will act to operate the mechanism latch 804 located near the bottom central portion of the right arm 613. This feature is shown in detail in the enlarged illustration of FIG. 62 which corresponds to FIG. 57 with respect to the inner back 620 beginning to overcome inertial forces and move forwardly. It should be noted that a function of the mechanism latch 804 is to lock the back cushion or inner back 620 in the stationary position corresponding to the sofa configuration. That is, the mechanism latch 804 acts so as to lock the conversion mechanism 880 in the upright or "normal" seating position with respect to the inner back 620. By releasing the mechanism latch 804, a mechanism assist link 806 is activated. The mechanism assist link 806 provides a mechanical interface between an assist cylinder housing 818 and the conversion mechanism 800 associated with the right arm 613. As illustrated in a number of the drawings, include FIGS. 57-67, the mechanism assist link 806 is connected at its lower end to the assist cylinder housing 818. The assist cylinder housing 818 houses an assist cylinder 808 and directs forces from the assist cylinder 808 directly to a specific point on a mechanism front link 826 through a mechanism assist link 806. The mechanism assist link 806 essentially provides the interface between the assist cylinder housing 818 and the mechanical linkages of the conversion mechanism 800 through the mechanism front link 826. The lower portion of the mechanism assist link 806 is directly connected to the assist cylinder housing 818 and the upward portion of the assist cylinder 808 housed therein. Correspondently, the upward portion of the mechanism assist link 806 is pivotably connected to the elongated mechanism front link 826. The mechanism front link 826 can be characterized as a link in the conversion mechanism 800 to which the assist cylinder 808 applies forces through the mechanism assist link 806.

In summary, a push button interface 615 is operated by the user, so as to activate vertical and horizontal motion of a push button link 802. The push button link guide 810 provides a bearing surface for the push button link 802 to convert the vertical motion provided by the push button actuator 615 into a horizontal motion. The horizontal motion of the push button link 802 releases the mechanism latch 804. The push button link 802 also operates in combination with the assist cylinder 812. The assist cylinder 812 applies forces to the conversion mechanism 800 through the mechanism assist link 806 and the mechanism front link 826. With the assist cylinder 808 applying forces to the conversion mechanism 800, the mechanism 800 causes the inner back to be lifted to a predefined position. This occurs as a result of opening the mechanism latch 804 so as to operationally release the assist cylinder 808. This activity is primarily shown in FIGS. 57, 58 and 62, 63.

Reference will now be made to other components of the linkage mechanism 800 as illustrated in FIGS. 57-73, as such components function to provide movement of the furniture system 600 between its sofa configuration and its sleep configuration. Specifically, and as earlier described in part, the assist cylinder 808 applies forces to the conversion mechanism 800. These forces will cause the inner back 620 to move from its "sofa" position shown in FIG. 57 to a raised and predefined position shown in FIG. 58. The assist cylinder 808 is allowed to operate after the push button link 802, through its horizontal motion, releases the mechanism latch 804.

As the assist cylinder 808 moves vertically upwardly, the pivot connection of the mechanism assist link 806 causes angularly upward movement of the mechanism front link 826 through the pivotable connection thereof. The mechanism front link 826 is characterized as the link in the conversion mechanism 800 to which the assist cylinder 808 applies forces. The mechanism front link 826 has one end pivotably connected to a mechanism mount link 830. As earlier described, the mechanism mount links 830 provide links in the conversion mechanism 800 which mount the same to the inside portion of the arm panel. An opposing end of the mechanism front link 826 is pivotably connected to one end of a mechanism back link 820. The pivot connection between the mechanism front link 826 and the mechanism back link 820 provides for control of the motion of the mechanism back link 820.

The mechanism back link 820 can be characterized as providing the link in the conversion mechanism 800 which transfers motion through the mechanism back link rod 822 and mechanism back attachment plate 832. The mechanism back link rod 822 is illustrated from an "end on" position in FIGS. 56-67. The longitudinal extension of the rod 822 is illustrated, for example, in FIGS. 68-70 and 72, 73. The mechanism back attachment plate 832 is primarily shown in FIGS. 68, 72 and 73. The mechanism back link rod 822, in conjunction with the mechanism back link 820 and the mechanism back attachment plate 832, aids in the transfer of motion to the inner back 620. Correspondingly, the mechanism back attachment plate 832 provides for an interface between the conversion mechanism 800 and the inner back 620, while aiding in the transfer of motion to the inner back 620. Connections between the mechanism back link rod 822 and the mechanism back attachment plate 832 are primarily shown in FIGS. 68-73. Other elements associated with the conversion mechanism 800 include an assist pivot clip 834. The pivot clip places and secures the assist pivot 814 in the proper location on the right arm assembly. Also, the mechanism 800 includes an assist cylinder guide 836. The assist cylinder guide 836 can be utilized to hold the assist cylinder housing 818 in position during cylinder installation.

Figure 57:
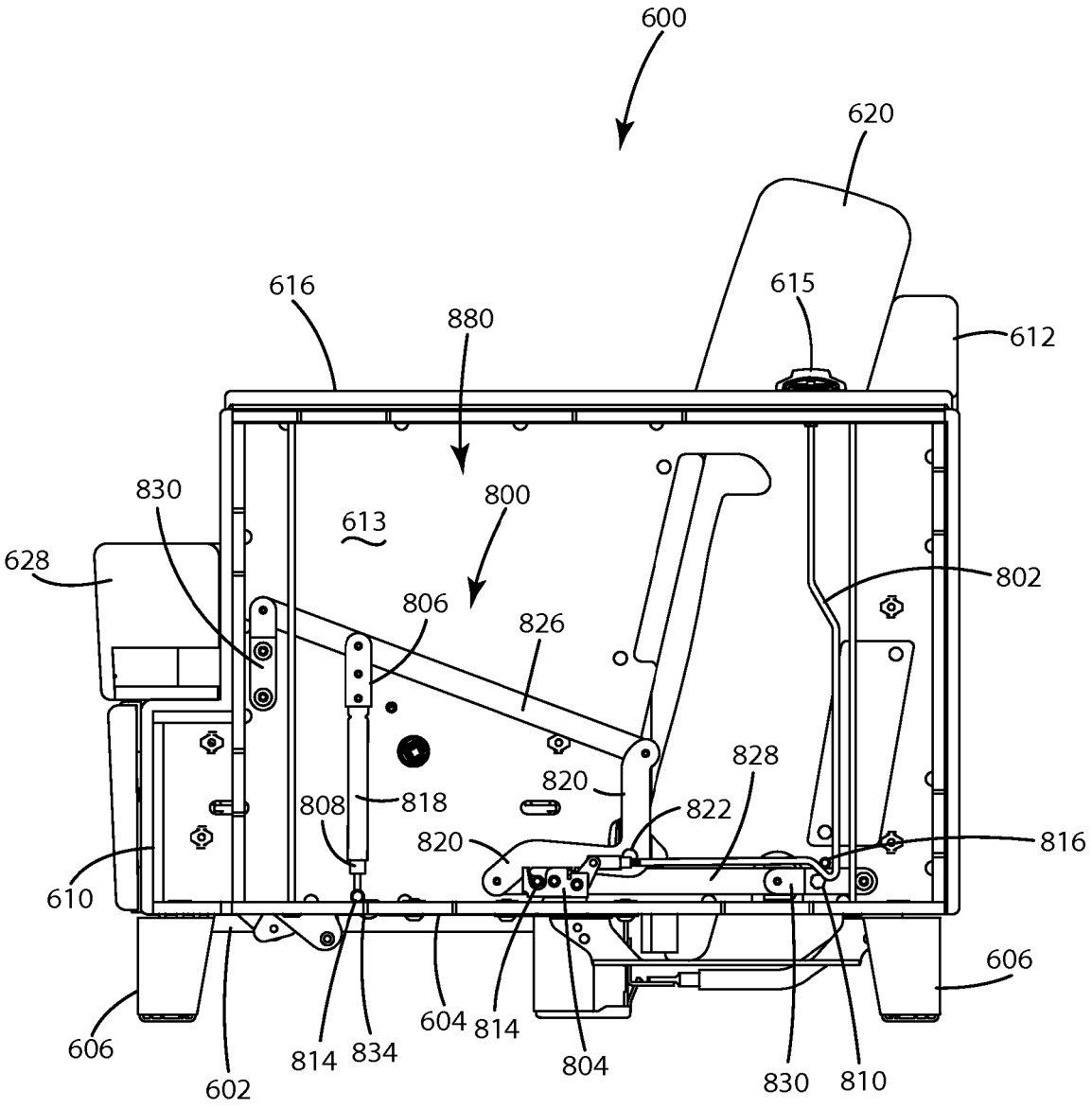
FIG. 57 is a right-side elevation view of the embodiment of the furniture system shown in FIG. 55, and showing a portion of the right side of the furniture system cut away so as to illustrate one of the sleep system linkage mechanisms used with the furniture system, with the sofa configuration in a normal seating position, the conversion mechanism latch and the inner back in an upright configuration.
Figure 58:
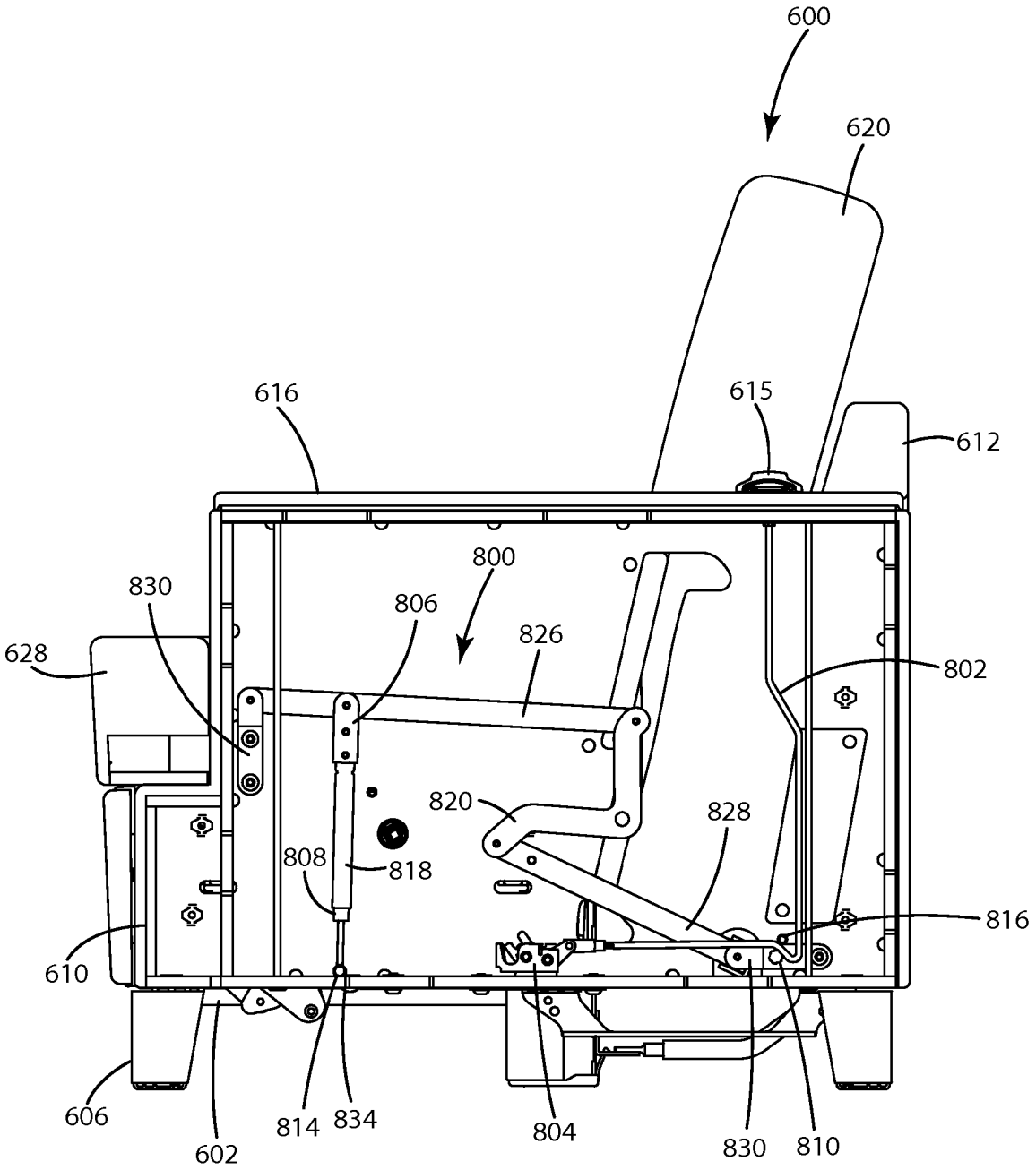
FIG. 58 is a side, elevation view of the furniture system shown in FIG. 57, and showing the sofa configuration in an initiating position for conversion to sleep status, where actuation of the push button actuator will open a latch and release a mechanism latch pin, while the assist cylinder will initiate motion of the inner back.
Figure 59:
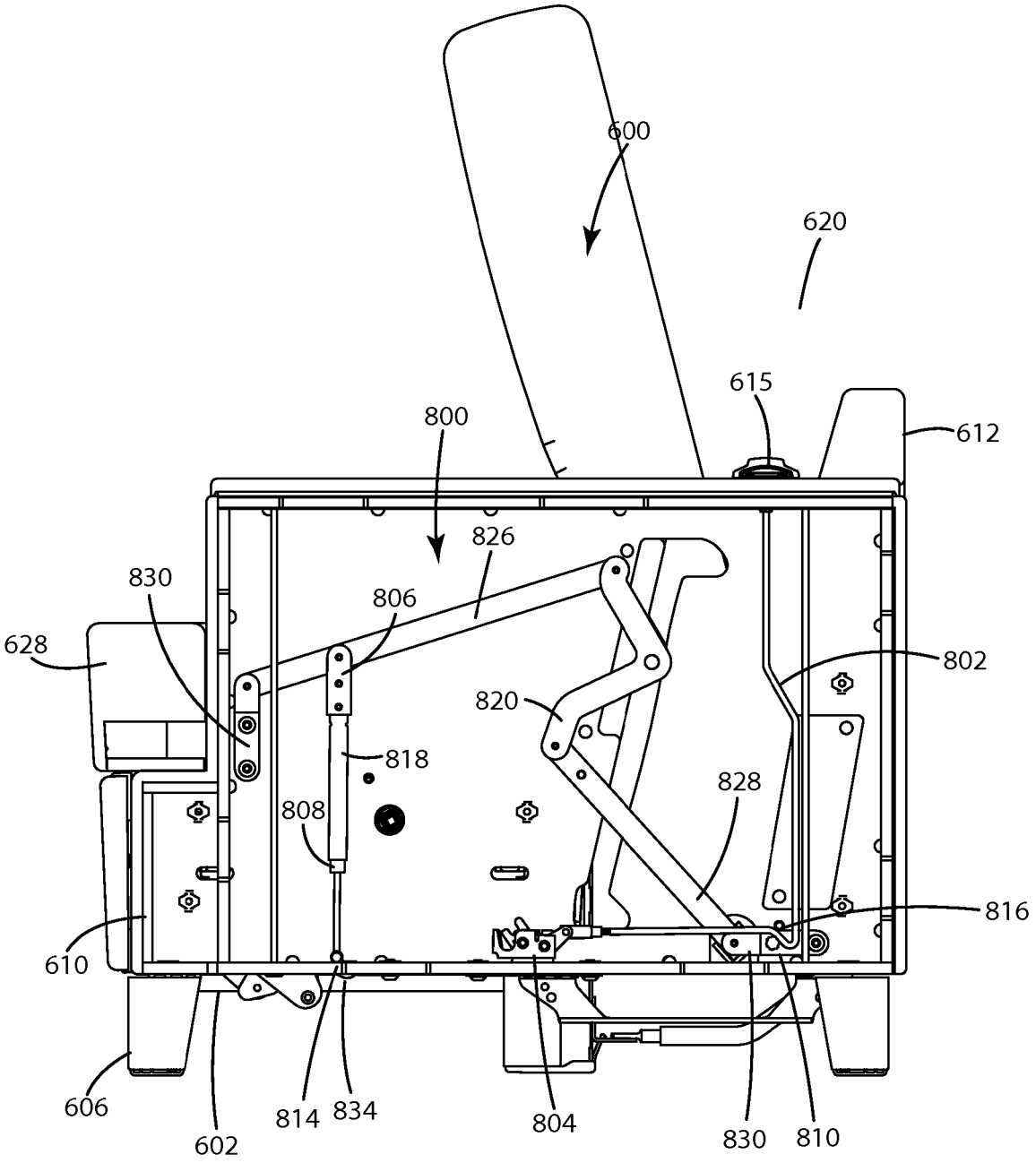
FIG. 59 is a right-side elevation view of the furniture system shown in FIG. 58, with the inner back in an intermediate position between the upright sofa configuration and a sleep configuration.
Figure 60:
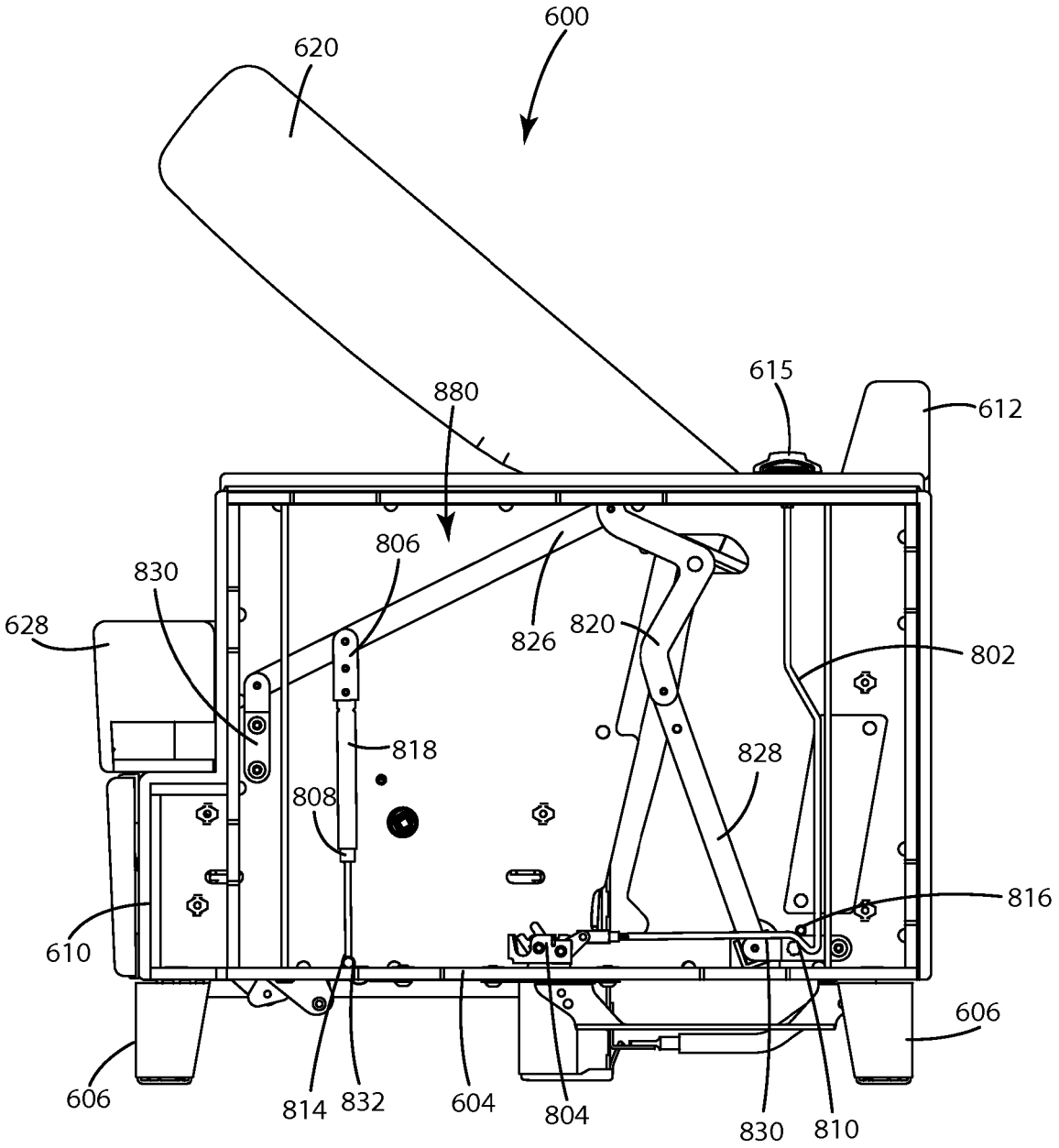
FIG. 60 is a right-side elevation view of the furniture system shown in FIG. 59, and further showing the inner back in a further movement toward a sleep configuration, and also showing the approximate position at which an end user can continue conversion of the furniture system by exerting forces forwardly on the inner back.
Figure 61:
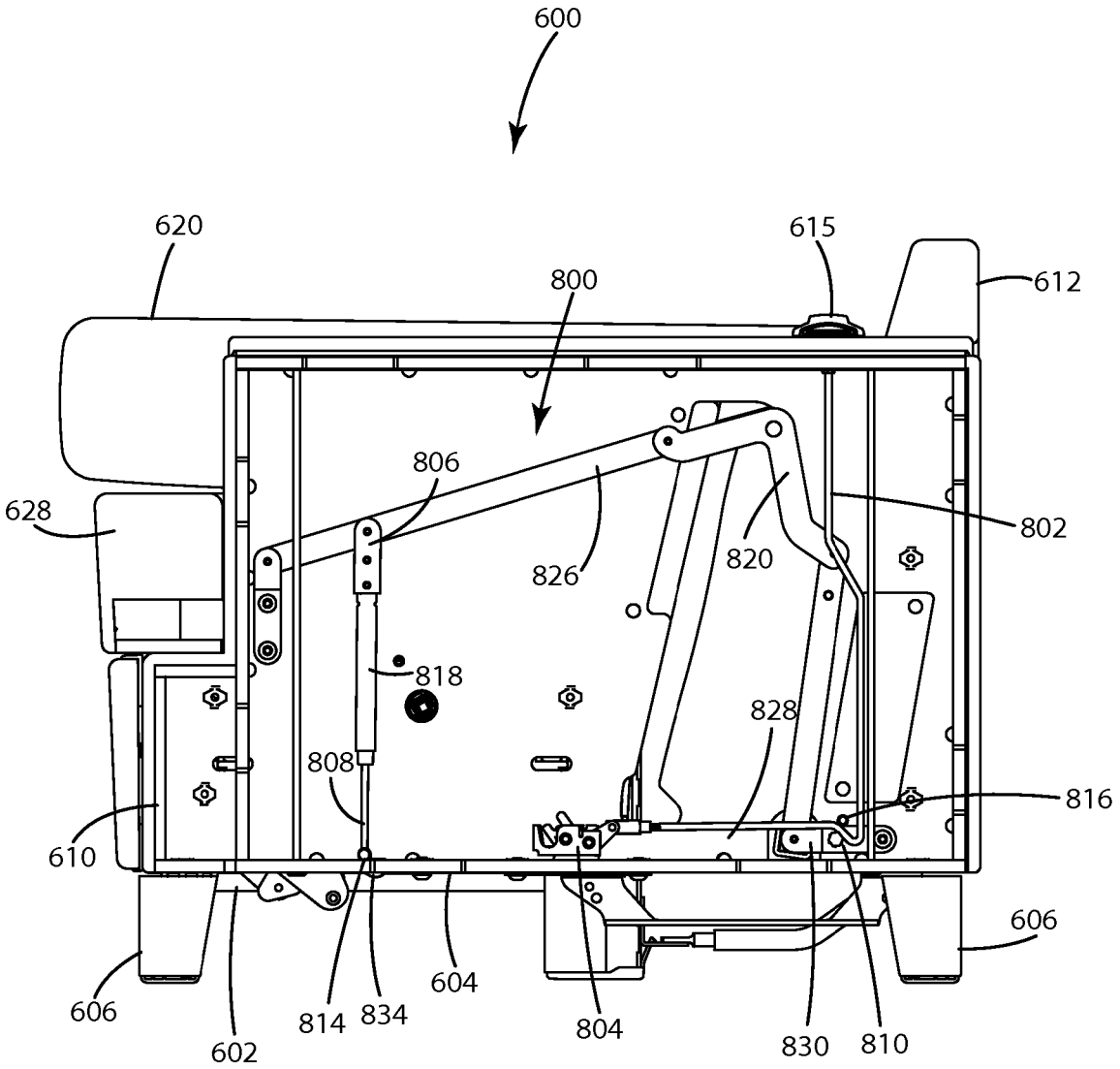
FIG. 61 is a right-side elevation view of the furniture system shown in FIG. 60, and further showing the sofa configuration and the conversion mechanism in a fully positioned sleep configuration, with the entirety of the sleep surface presented in a horizontal configuration when the inner back is resting on the seat cushions.

In accordance with the foregoing, and as illustrated in FIGS. 57 and 58, the furniture system 600 is moved from a normal seating position or sofa position to one where the inner back 620 is put into motion by the assist cylinder 812. FIG. 59 illustrates the assist cylinder 812 at what could be characterized as "maximum stroke." In this position, the assist cylinder 812 can essentially be characterized as presenting and holding the inner back 620 for additional end user input. FIG. 60 illustrates further activity directed toward movement of the furniture system 600 from the sofa configuration to the sleep configuration. This occurs through the end user physically grasping the inner back 620 and pulling forward thereon. As the end user exerts pulling forces on the inner back 620, the inner back 620 will be caused to rotate to a position where the inner back 620 will rest on the seat cushions 628 as illustrated in FIG. 61.

In accordance with certain principal concepts of the invention, furniture systems in accordance therewith can include a desk, table or similar type of work surface incorporated within the furniture system. For example, and as previously described herein with respect to FIGS. 31-35, the furniture system 400 includes a desk 414. In furniture system 400, the desk 414 extends forwardly from an upper central portion of the back front surface 410, again as illustrated in FIGS. 31-35. As further described with respect to these drawings, the desk 414 includes an upper work surface 434. Advantageously, and in accordance with one concept of the invention, the desk 414 can be constructed so as to not extend forwardly beyond the frontal vertical plane of the furniture system 400. The desk 414 is further stationary relative to the back front surface 410. The desk 414 is also shown and described in various drawings with respect to furniture systems 500, 520, 540 and 560. Each of these furniture systems has been previously described herein, particularly with respect to certain features of the desk 414.

The furniture system 600 also includes a table which is adapted for use with the features of the system 100 which provide for the conversion mechanism 800 and the capabilities of converting the system 600 from a sofa configuration to a sleep configuration. However, distinguishable from the previously described desk 414 associated with furniture systems 400 et al, the table associated with the furniture system 600 is positionally adjustable independent of the inner back 620. In accordance with certain aspects of the invention, the adjustable table and associated table assembly are positionable at fixed and predetermined heights. These heights can be, for example, an uppermost or "table" height, a middle level or "arm" height, and a lowermost or "seat" height. These various positions are shown in specific illustrations and features associated with each will be described in subsequent paragraphs herein.

Turning to the basics of the features associated with the adjustable table, FIG. 55 illustrates a table assembly 700 having a horizontally disposed tabletop 701. The tabletop 701 is adjustably mounted to an adjustable table mechanism or table mechanism 710. The table mechanism 710 is substantially hidden from view in FIG. 55, but is shown in greater clarity in FIGS. 62, 63 and other illustrations thereafter. Returning to FIG. 55, the drawing further illustrates the tabletop 701 in what is characterized as a lowermost or "seat" position. The assembly 700 further includes a table mechanism brake release handle 702. This handle device 702 is operated by an end user for applying input so as to disengage a table mechanism brake (not shown in FIG. 55 and described subsequently herein) by way of a table mechanism brake link (also not shown in FIG. 55, but described and illustrated in subsequent paragraphs herein). Disengagement of the table mechanism brake will permit the table mechanism 710 to move into one of three desired positions, in combination with the movement of the tabletop 701.

Also partially shown in FIG. 55 is a table skirt 706. The table skirt 706 essentially comprises a housing which is mostly cosmetic in nature and is used to cover the table mechanism 710 and surrounding frame elements.

FIG. 56 is a perspective view of the furniture system 600 similar to FIG. 55, but showing the furniture system in a sleep configuration. In this sleep configuration, the inner back 620 rests on the top of the sofa cushions 628. Also, for purposes of this configuration, the tabletop assembly 700 must be configured so that the tabletop 701 and table mechanism 710 are in the lowermost or "seat" position. As apparent from FIG. 56, and other illustrations herein, the tabletop 701 must be positioned so that the upper portion thereof is below a horizontal plane formed by the upper horizontal surfaces of the sofa cushions 628. Further, the width of the tabletop 701 is preferably narrower than the spatial width between opposing sides of the sofa cushions 628. Correspondingly, if it is desired to maintain a "minimum" footprint for the entirety of the furniture system 600 with the tabletop assembly 700, the depth of the tabletop 701 should preferably be less than the depth of the system 600 as measured from the front of the sofa cushions 628 to the rear of the sofa cushion 628.

Figure 62:
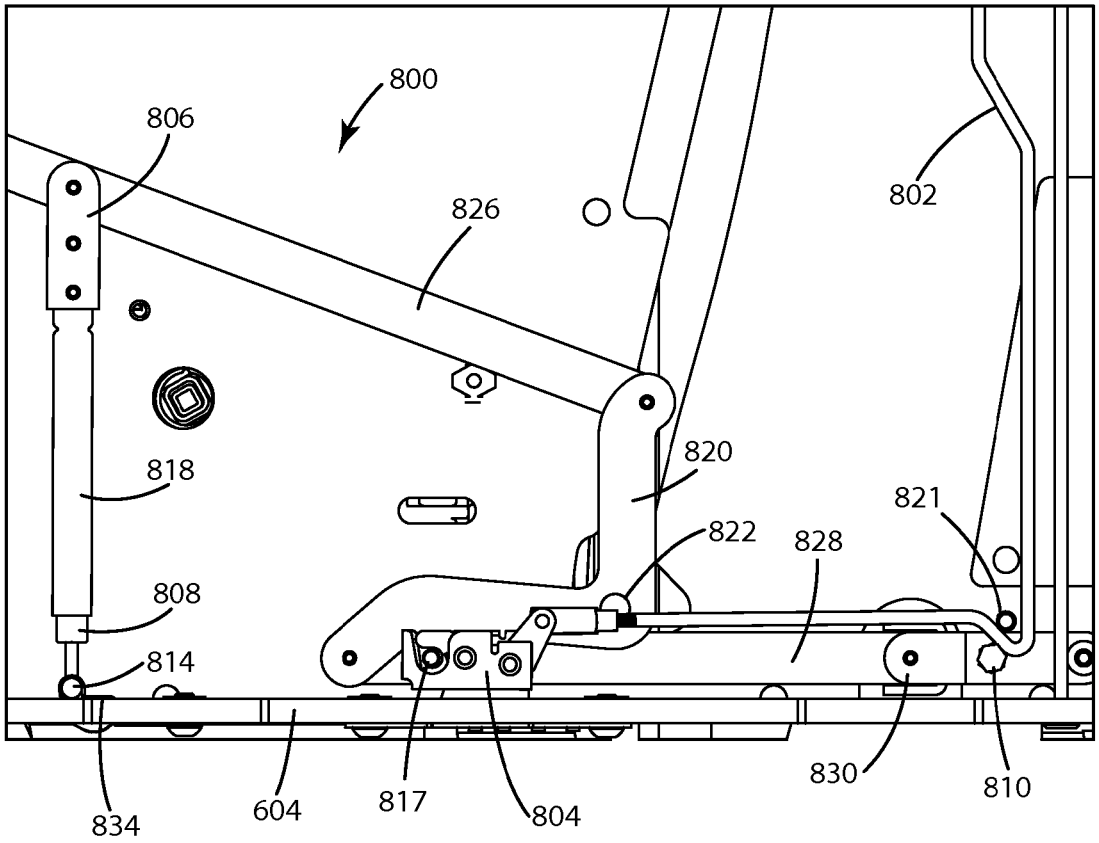
FIG. 62 is a right-side elevation view of a close up of a cutaway of one portion of the arm assembly, showing elements such as the assist cylinder housing, mechanism assist link, mechanism back link and similar structures.
Figure 63:
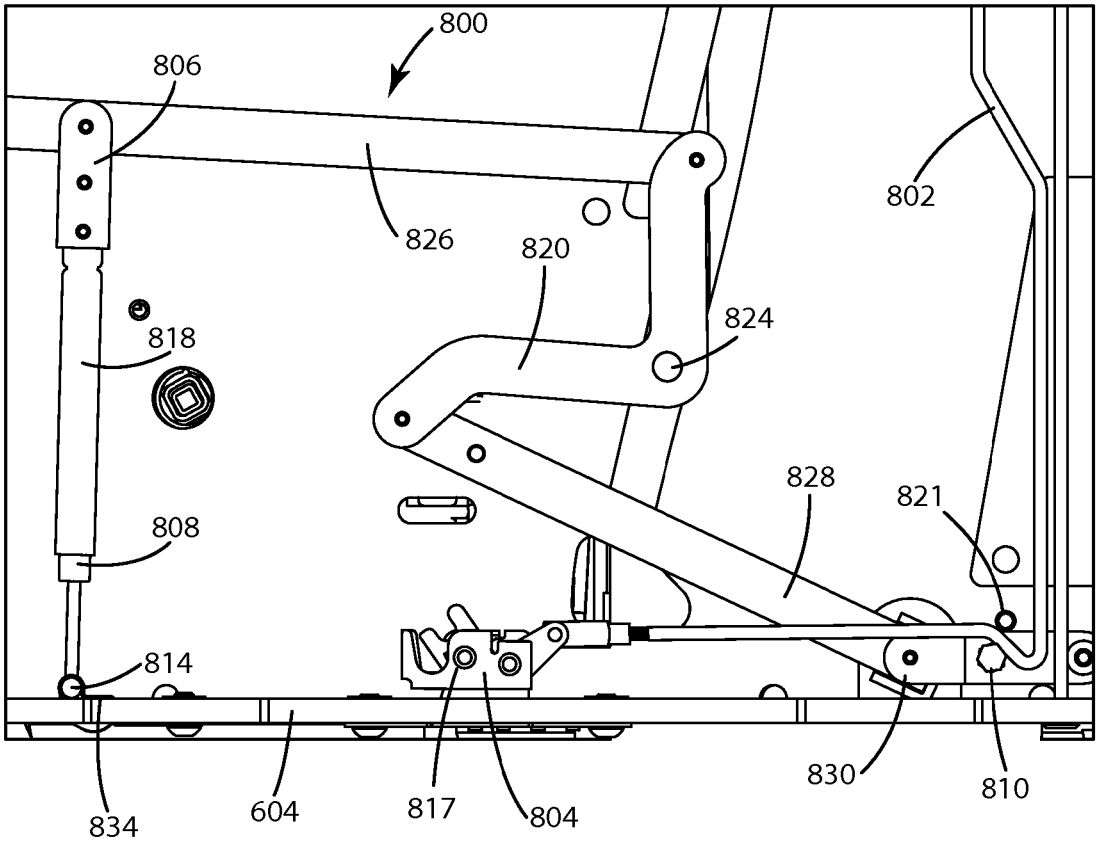
FIG. 63 is a right-side elevation view of a close up of a cutaway portion of the arm assembly, showing various elements of the back conversion mechanism in various stages of deployment, with FIG. 63 showing the positioning of the arm assembly when the inner back is in an intermediate position.
Figure 64:
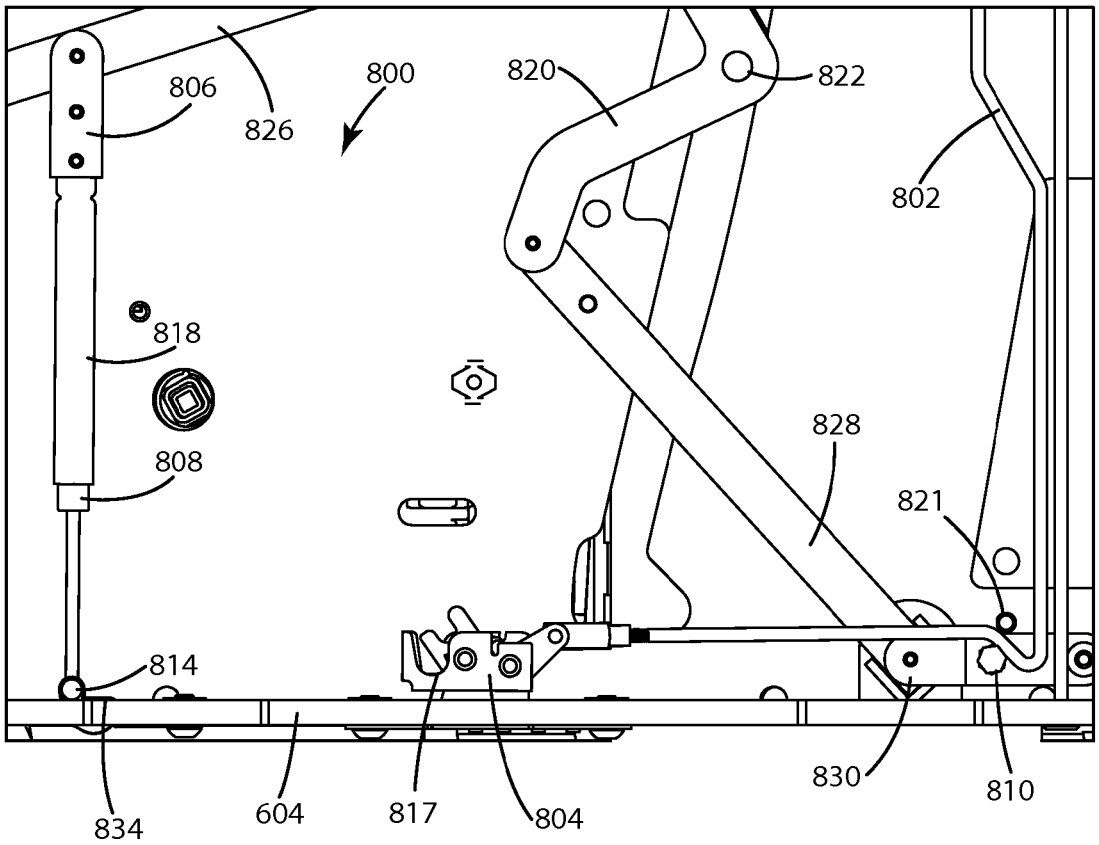
FIG. 64 is a right-side close up of an elevation view of a cutaway portion of the arm assembly, showing the back conversion mechanism closer to the sleep configuration.
Figure 65:
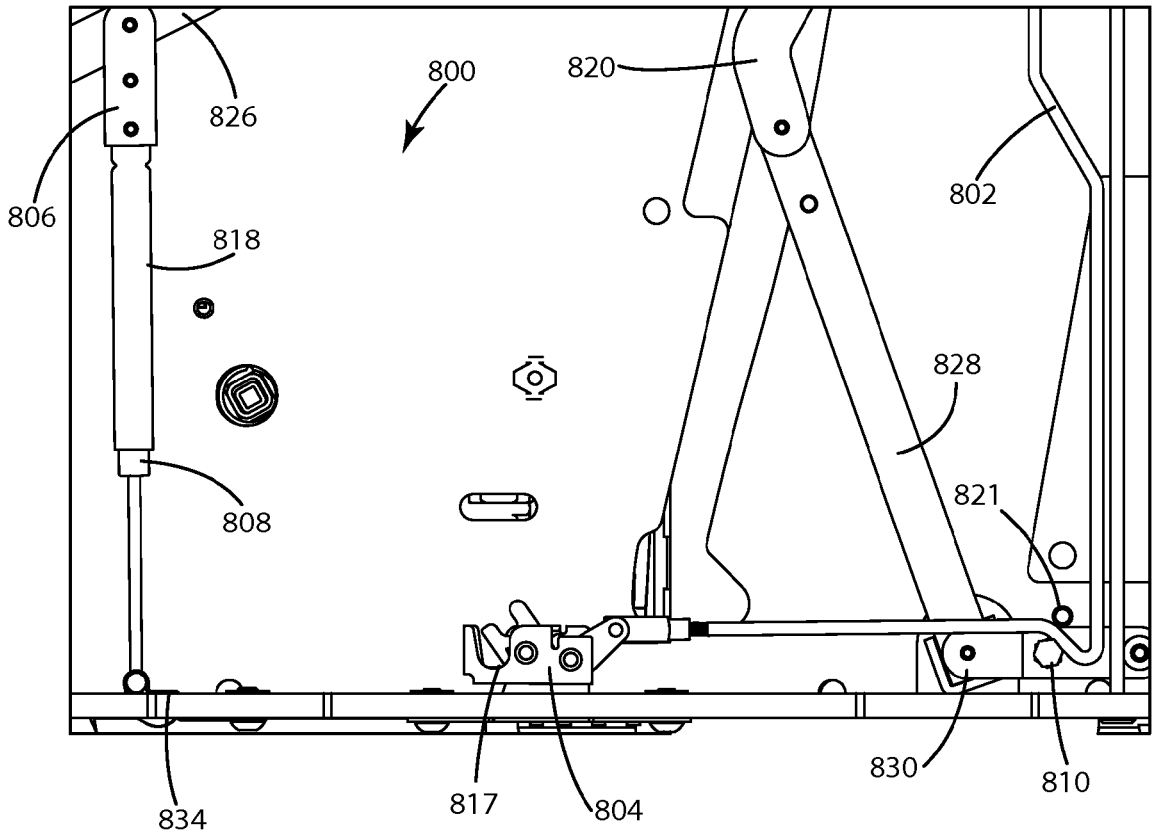
FIG. 65 is a right-side elevation view of a close up of the arm assembly in a cutaway configuration, showing the back conversion mechanism after further movement of the inner back.
Figure 66:
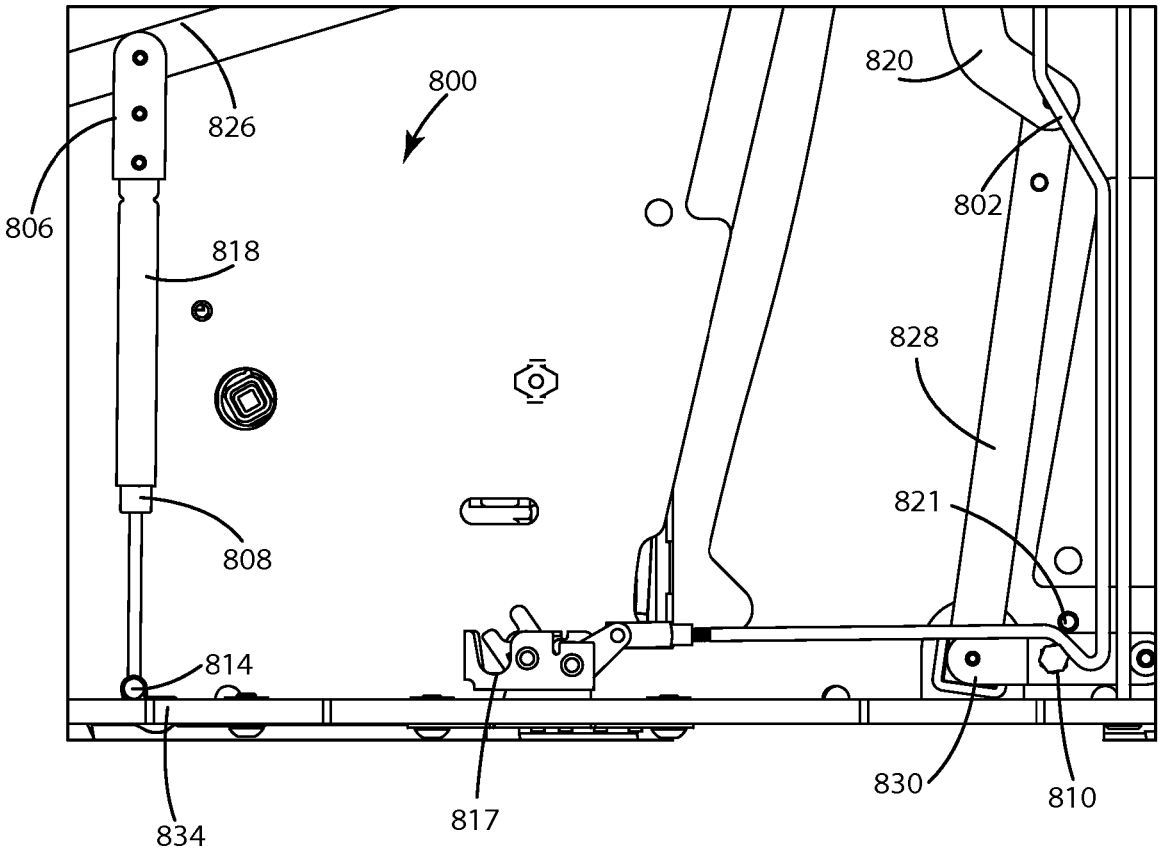
FIG. 66 is a right-side elevation view of a close up of a cutaway portion of the arm assembly, showing full movement of the back conversion mechanism.
Figure 67:
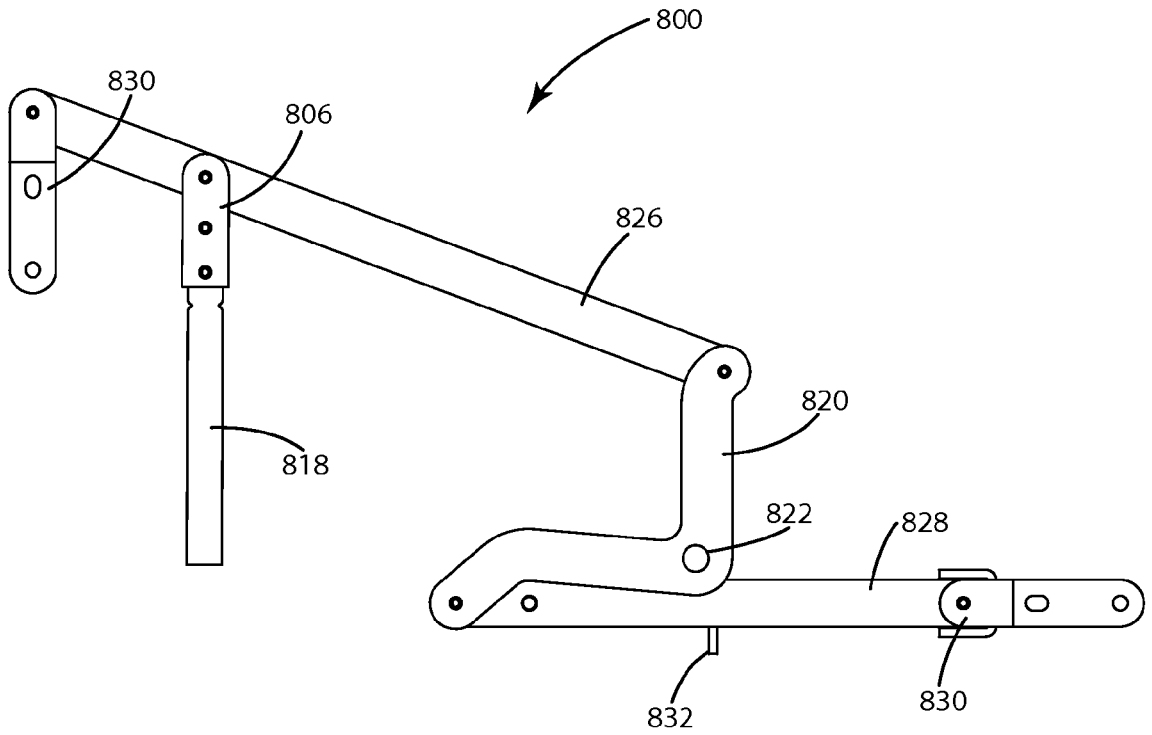
FIG. 67 is a side, elevation view of a portion of the back mechanism in a standalone format, showing the mechanism front link and interconnected links.
Figure 68:
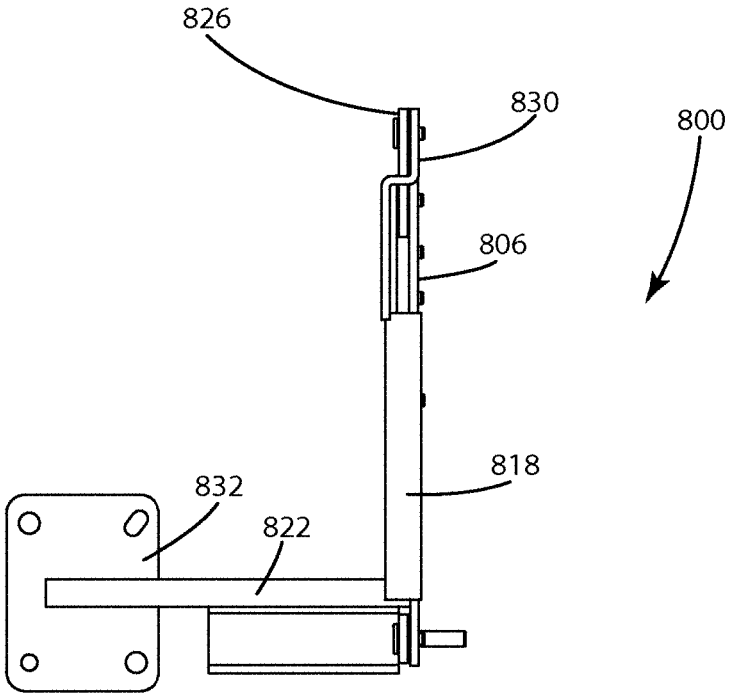
FIG. 68 is a front, elevation view of interconnected elements of the back mechanism shown in a standalone format.
Figure 69:
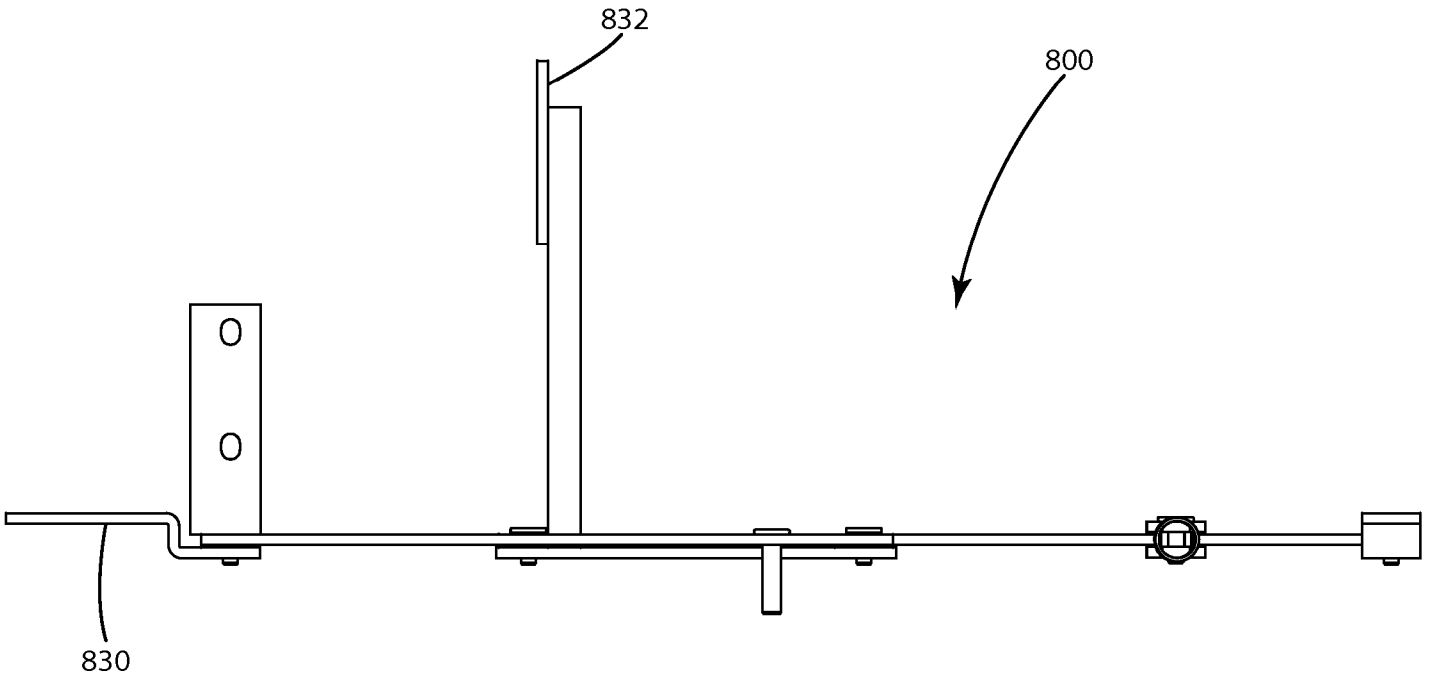
FIG. 69 is a plan view of the elements of the back mechanism shown in FIG. 70.
Figure 70:
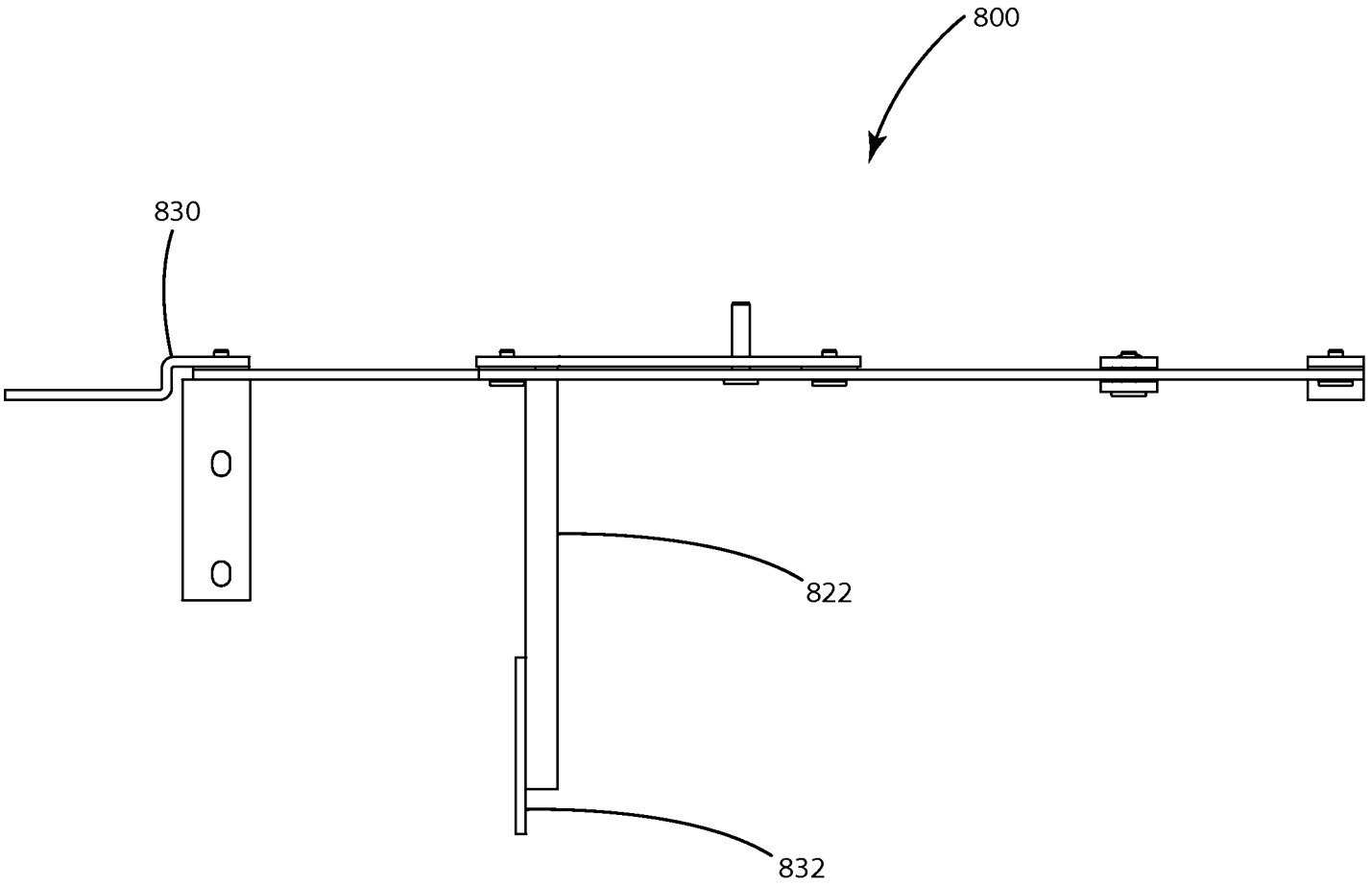
FIG. 70 is a side, elevation view of the back linkage mechanism shown in FIG. 71, but shown in an opposing image.
Figure 71:
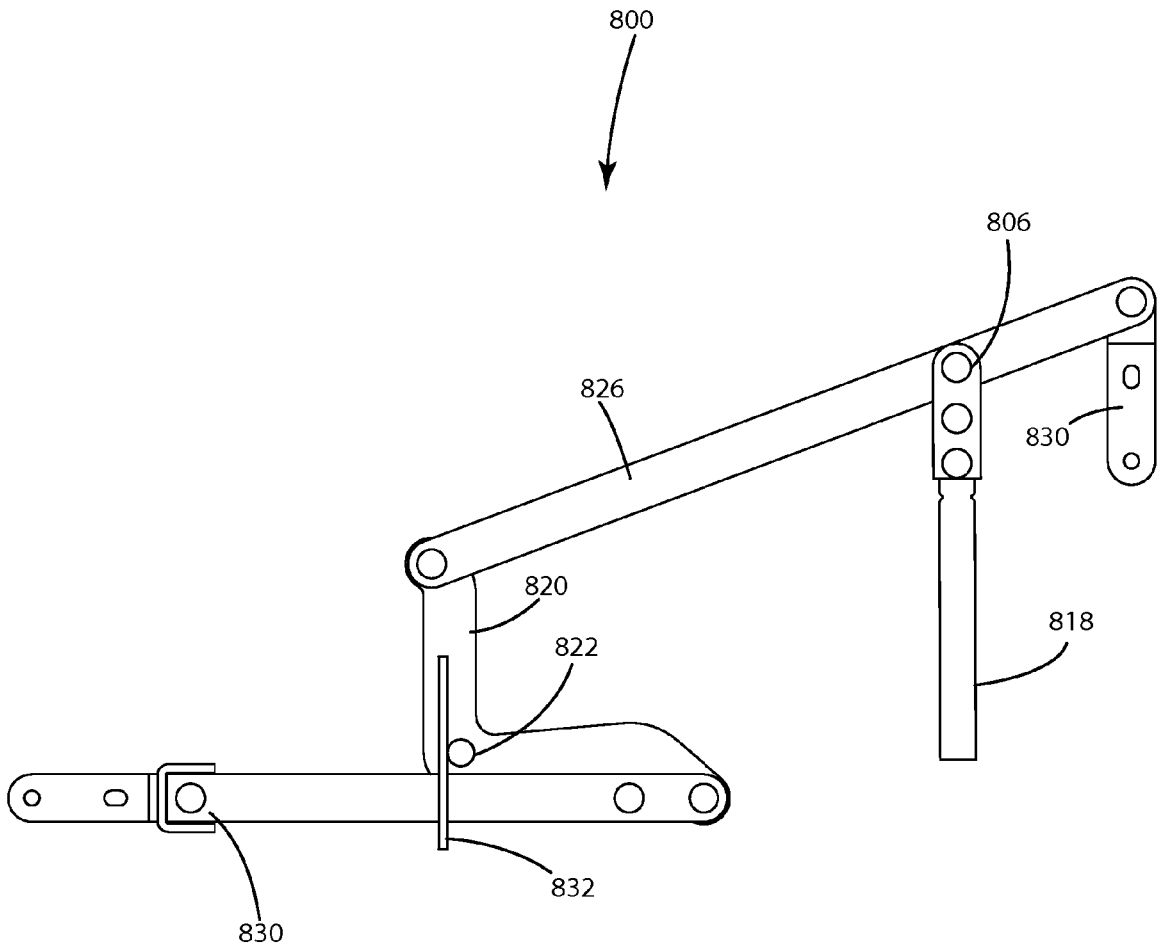
FIG. 71 is a further side, elevation view of the linkage mechanism shown in FIG. 69, with the back mechanism shown in a standalone configuration.
Figure 72:
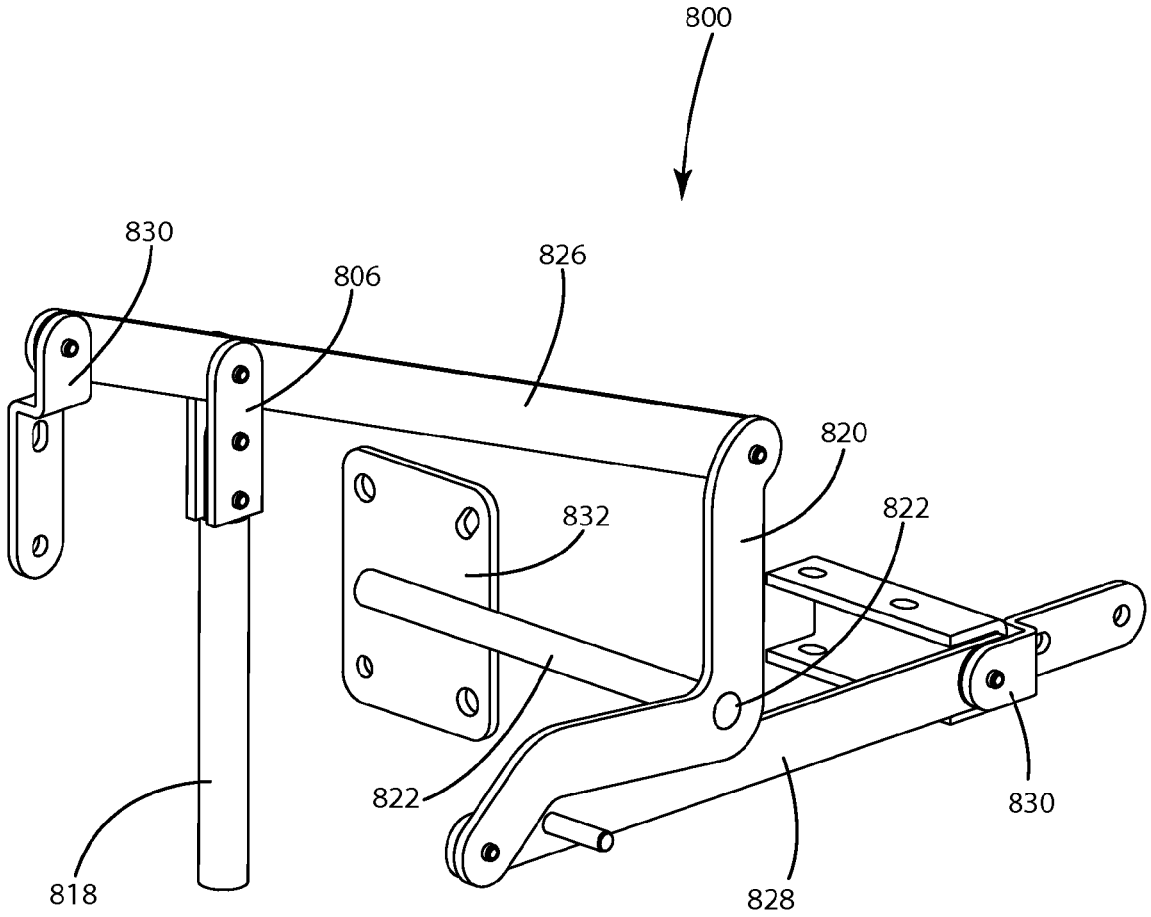
FIG. 72 is a right-side front perspective view of the linkage mechanism shown in FIGS. 69 and 72.
Figure 73:
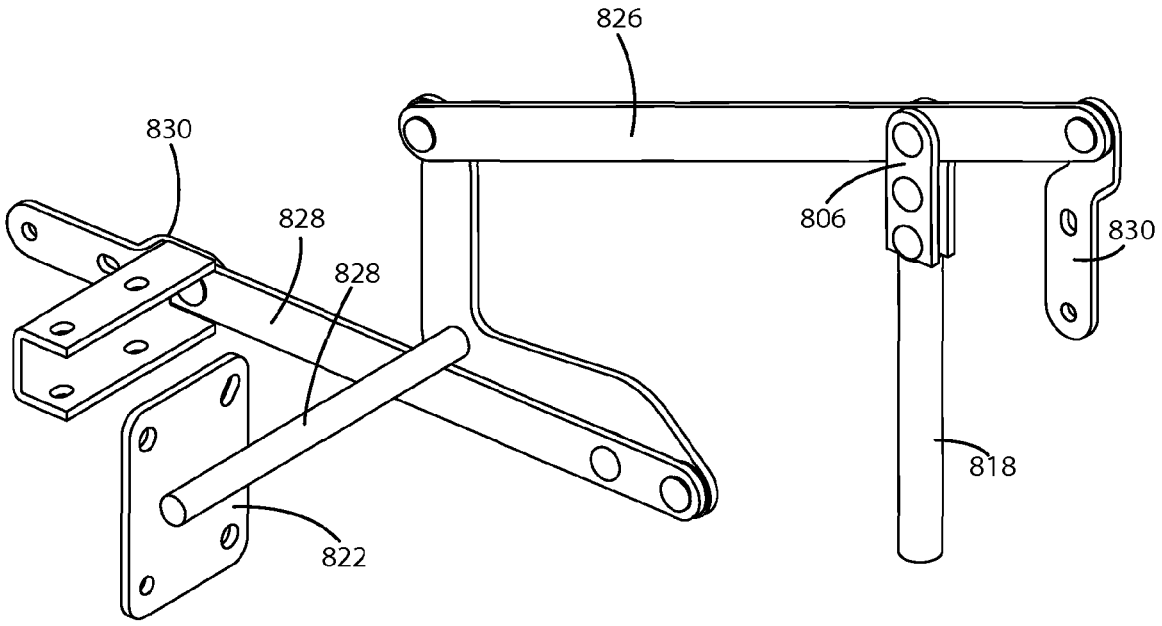
FIG. 73 is a left-side front perspective view of the linkage mechanism shown in FIG. 73.
Figure 74:
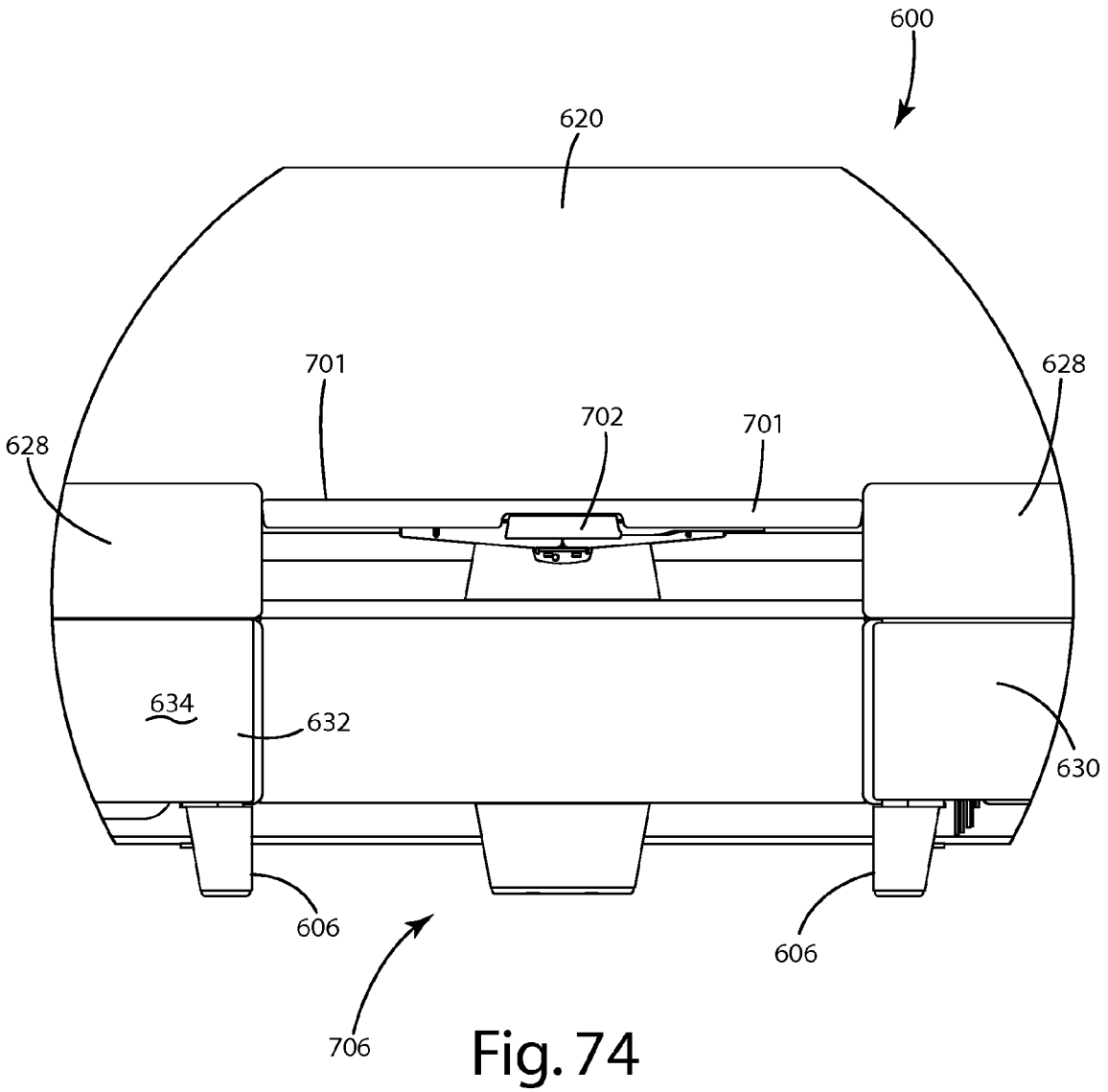
FIG. 74 is a partial, front elevation view of the adjustable table assembly in a lowermost, down or "seat" position.
Figure 75:
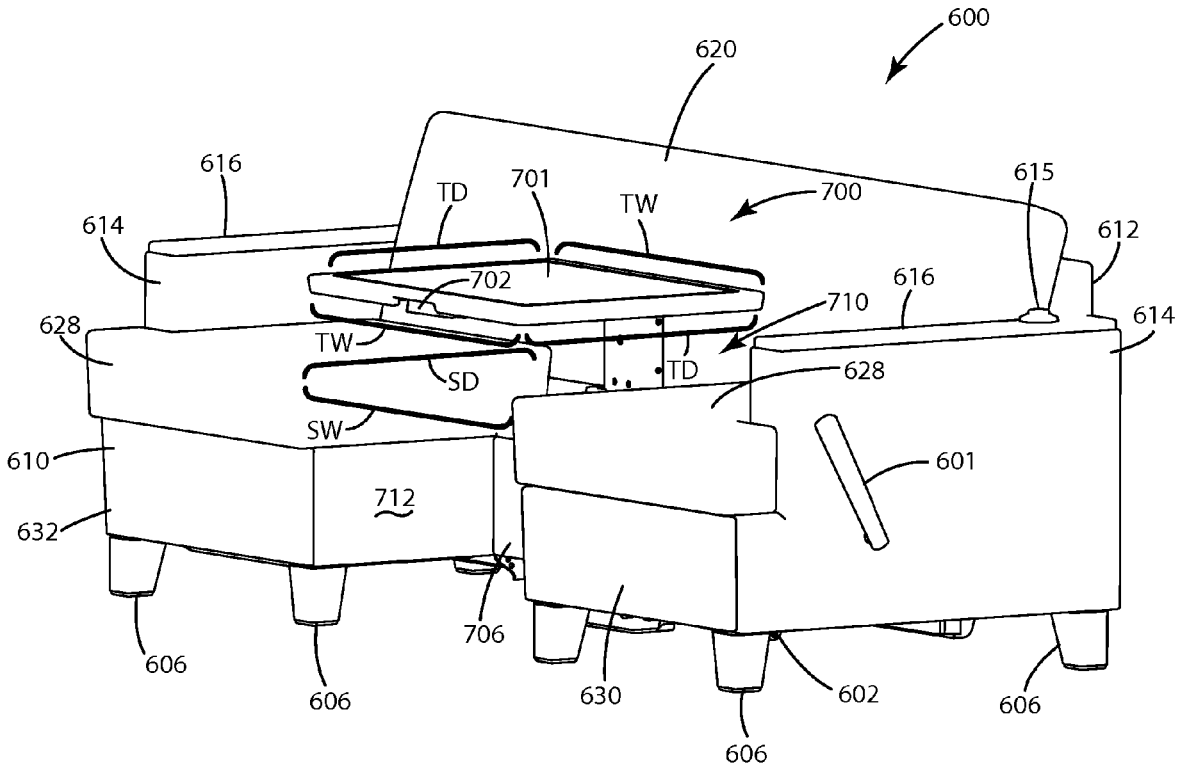
FIG. 75 is a right-side front perspective view of the furniture system shown in FIG. 55, but showing the adjustable table in a middle or "arm" position.
Figure 76:
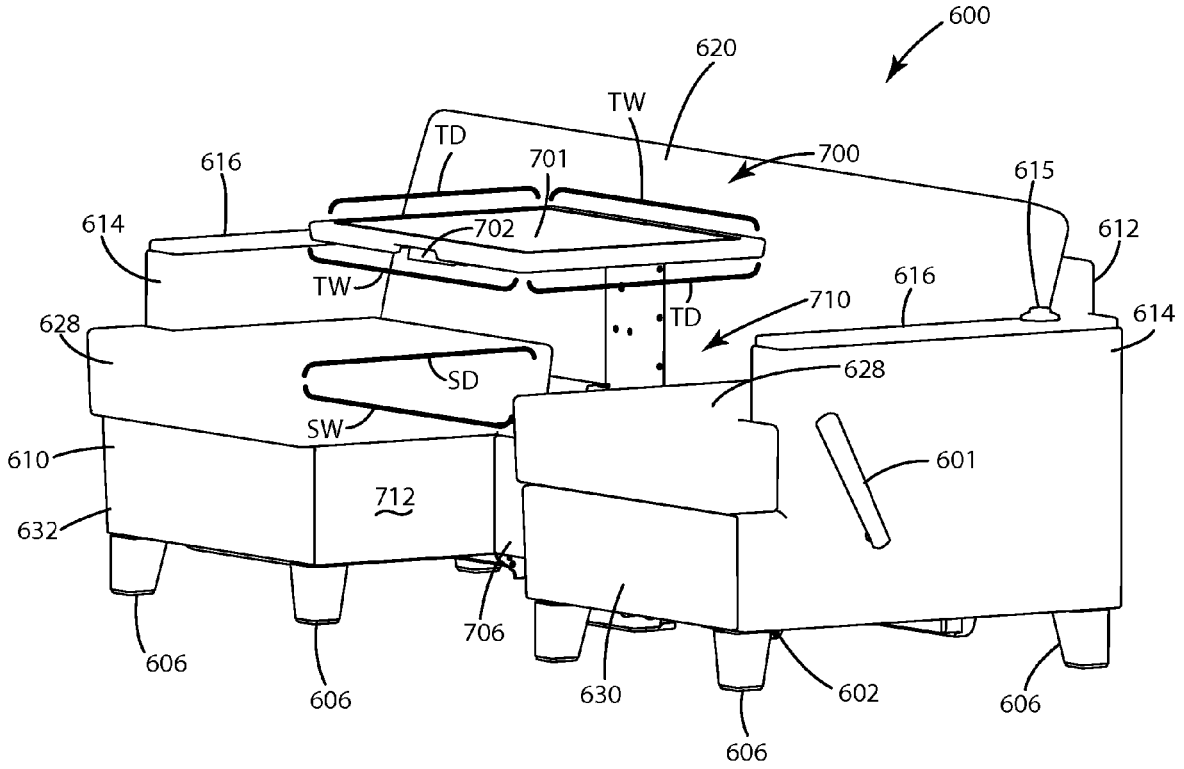
FIG. 76 is a right-side front perspective view of the furniture system shown in FIG. 76, but showing the adjustable table mechanism in an uppermost or "table" or "top" position.

Limitations on dimensions are better shown with respect to the views of FIGS. 62 and 63. FIG. 62 is a perspective view showing the tabletop assembly 700 in a position where the tabletop 701 is at the midlevel or "arm" position. It is at this position that the tabletop 701 is at an appropriate height to act as an armrest (either sideways or frontways) for users seated on one or both of the side cushions 628.

FIG. 63 is a perspective view similar to FIG. 62, but shows the tabletop assembly 700 in a position where the tabletop 701 is in the uppermost or "table" height. It is at this height that the tabletop 701 can best be employed as a table or similar work surface for users seated on the seat cushions 628 or directly in front of the tabletop 701 (on a chair or other seating arrangements independent of the furniture system 600 itself). For purposes of description, an assumption is being made that the tabletop 701 is rectangular in structure. However, it should be emphasized that the top 701 can take on various shapes and configurations, without departing from the scope of the novel concepts of the invention. The tabletop width is shown in FIGS. 62 and 63 as width TW. Correspondingly, the width of the open space between the side cushions 628 is shown in the drawings as width SW. For purposes of allowing the tabletop 701 to be positioned below the inner back 620 and the top of the seat cushions 628 when the furniture system 600 is in the sleep configuration, the tabletop 701 must fit within what is characterized within the drawings as middle spatial area 712. The middle spatial area 712 can be characterized as the area formed between the opposing inner ends of the seat cushions 628 and the distance from the top of the seat cushions 628 downwardly to the floor. Correspondingly, for the tabletop 701 to fit within this middle spatial area 712, the table width TW must be less than the spatial width SW.

In addition, and as previously discussed herein, one advantageous concept of the invention (although not necessarily required with respect to the basic concepts of the invention) relates to the furniture system 600 maintaining a constant, minimum footprint. To do so, the front portion of the tabletop 701, identified as front portion 714 in FIGS. 62 and 63, should be maintained at all times during adjustment in a position which does not extend forward of a horizontal plane formed by the front horizontal portions of the seat cushions 628. To ensure this feature, the table depth TD as shown in FIGS. 62 and 63 should be less than the seat depth SD. Further, the middle spatial area 712 should be of a sufficient size so that users sitting on the seat cushions 628 on opposing sides of the tabletop assembly 700 can comfortably position their legs and feet below the tabletop 701, when the tabletop 701 is in the arm position or the table position.

Figure 77:
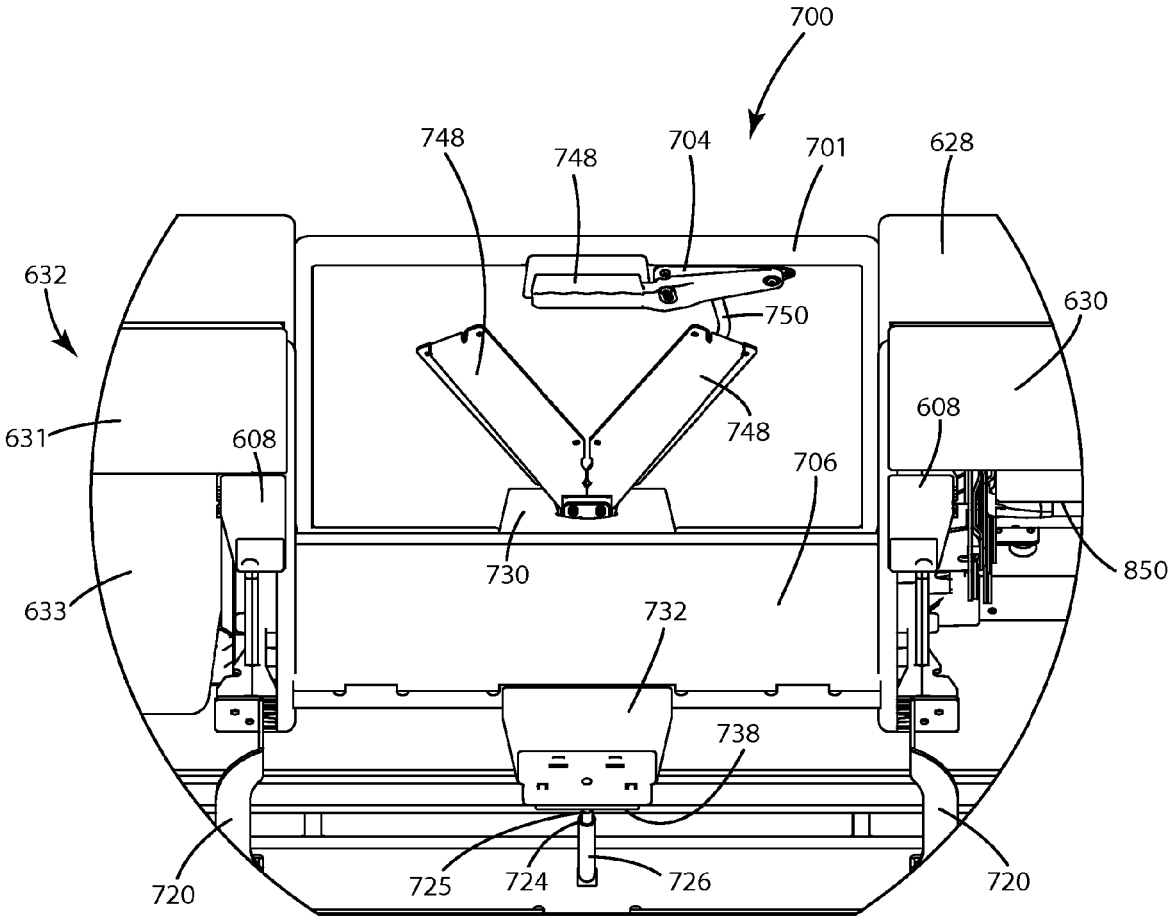
FIG. 77 is a partial underside view in isolated format of the adjustable table in a down position.
Figure 78:
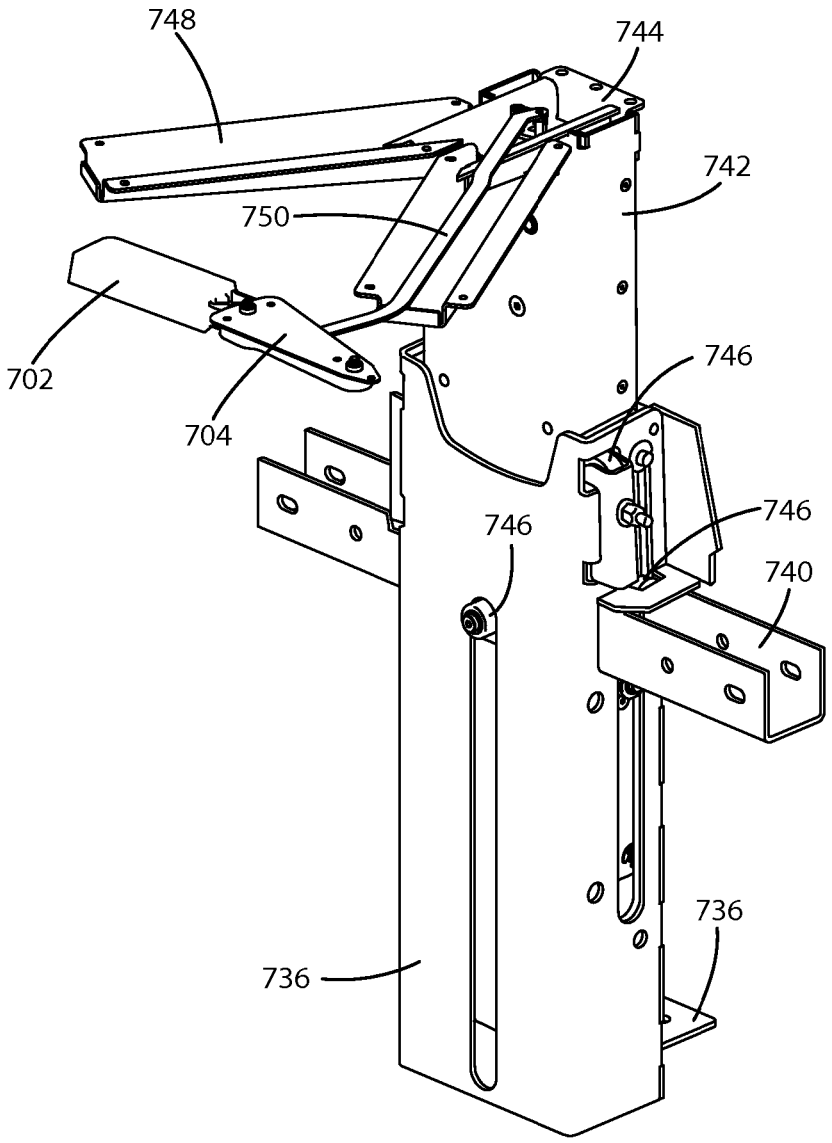
FIG. 78 is a right-side perspective view of the adjustable table mechanism, with the mechanism being in a position for the table to be at an uppermost or top height.
Figure 79:
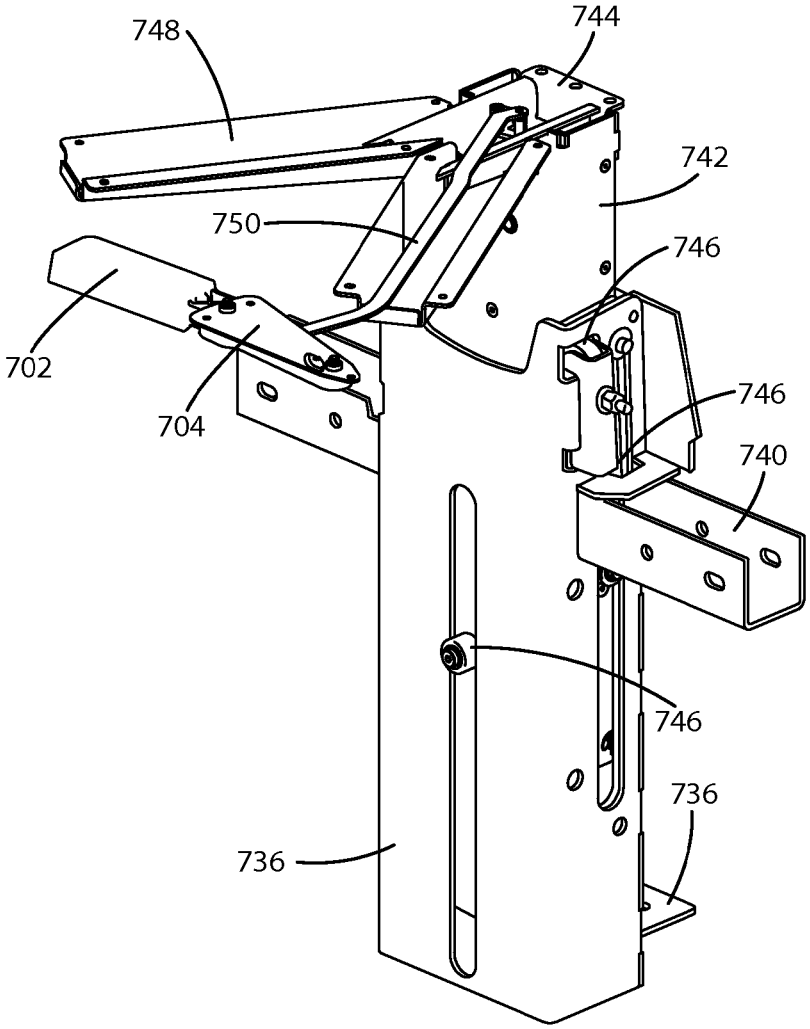
FIG. 79 is a right, front perspective view of the adjustable table mechanism shown in FIG. 78, but shown with the mechanism in a position which provides for a middle level or "arm" height for the table.
Figure 80:
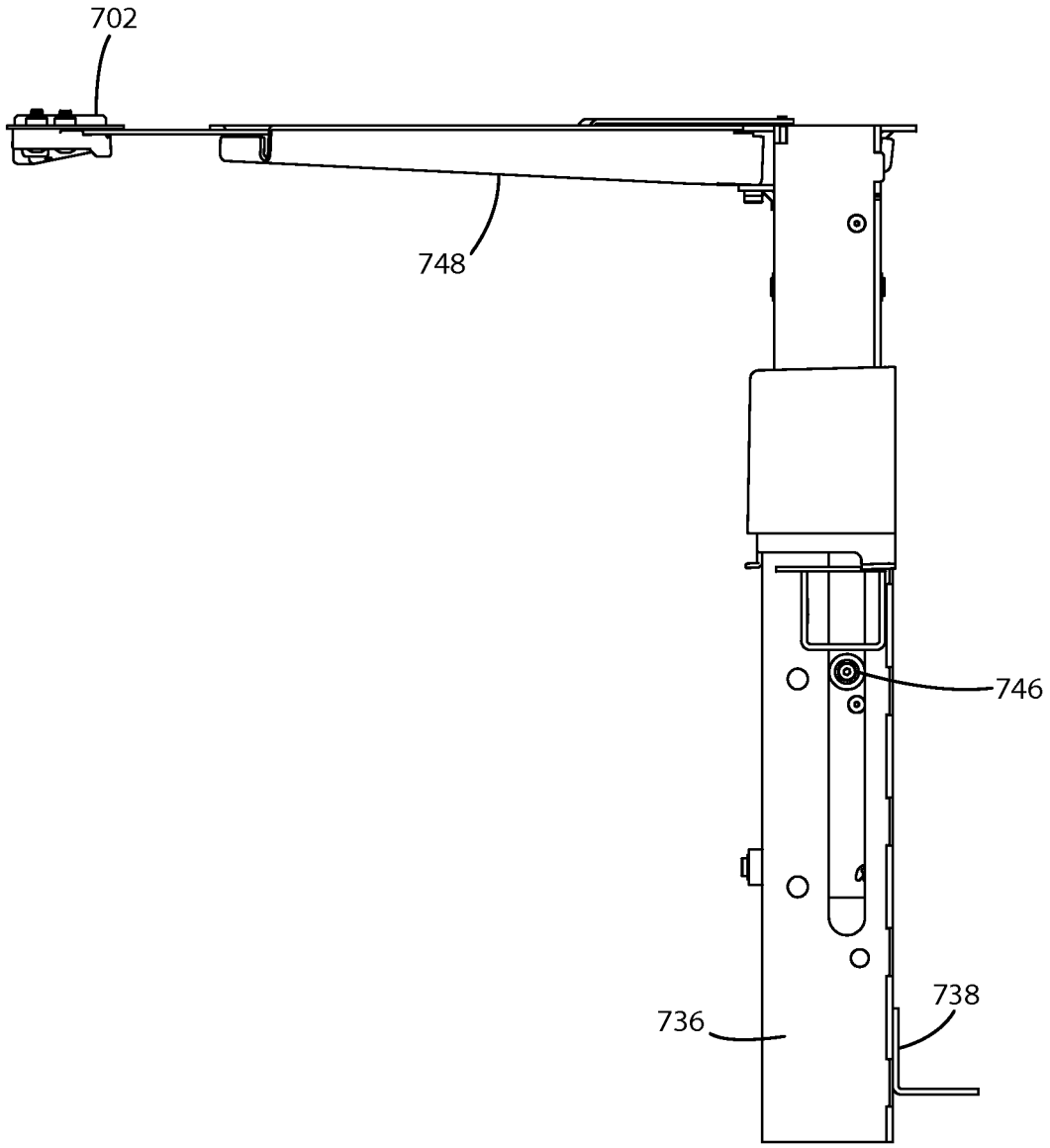
FIG. 80 is a right-side elevation view of the adjustable table mechanism shown in FIGS. 78 and 79, and further showing the position of the mechanism for the table to be at a "seat" height, or lowermost position.
Figure 81:
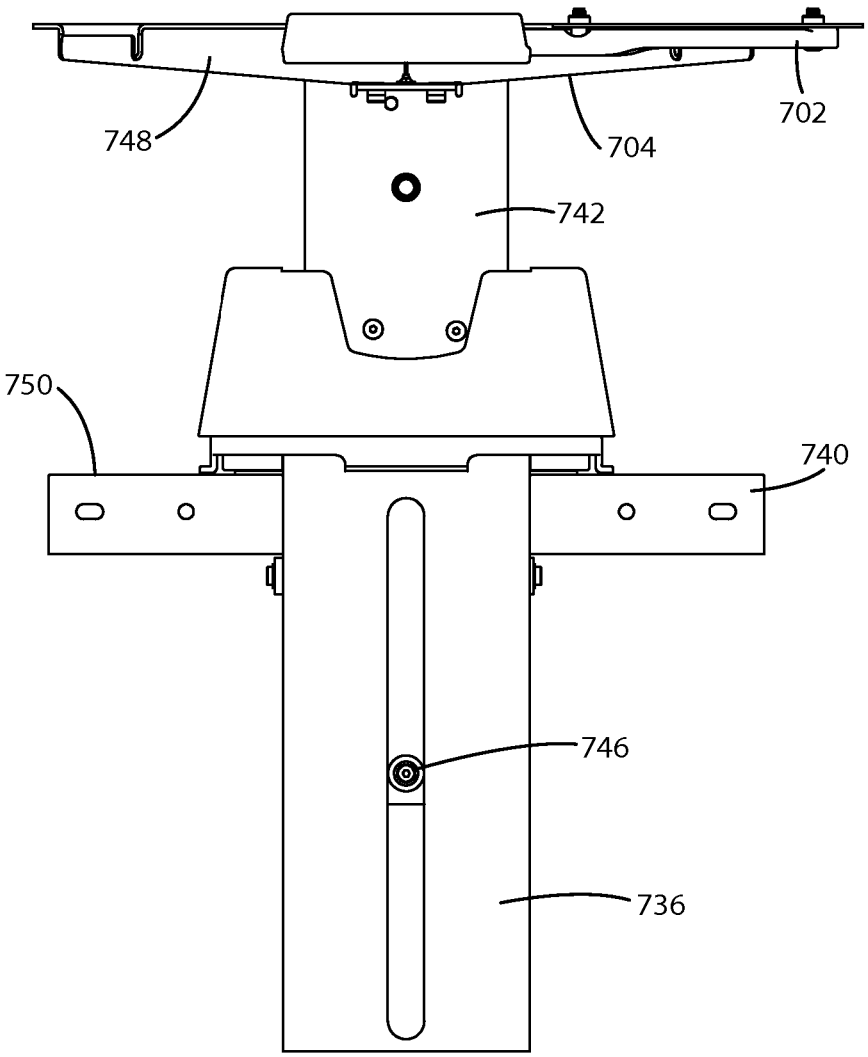
FIG. 81 is a front, elevation view of the adjustable table mechanism shown in FIG. 80, and further showing the mechanism at a position to provide for a middle level or arm height for the table.
Figure 82:
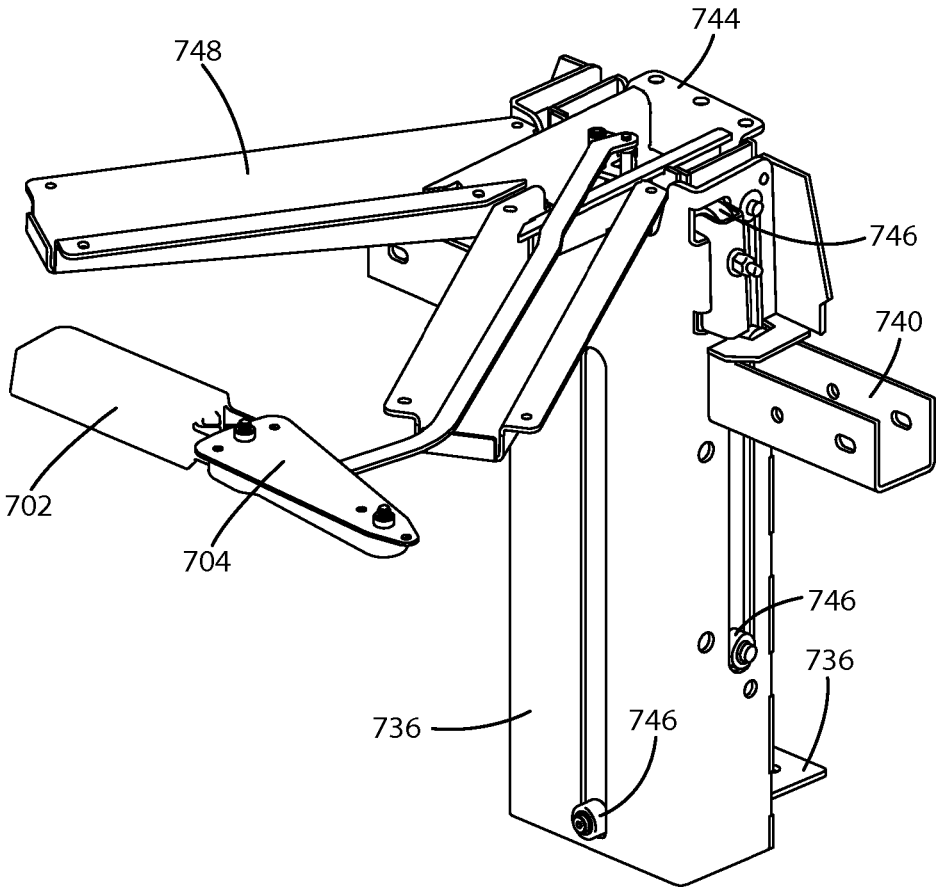
FIG. 82 is a right-side, front perspective view of the adjustable table mechanism shown in FIG. 81, and showing the table mechanism in a position for the table to be at a "seat" height, or lowermost position.
Figure 83:
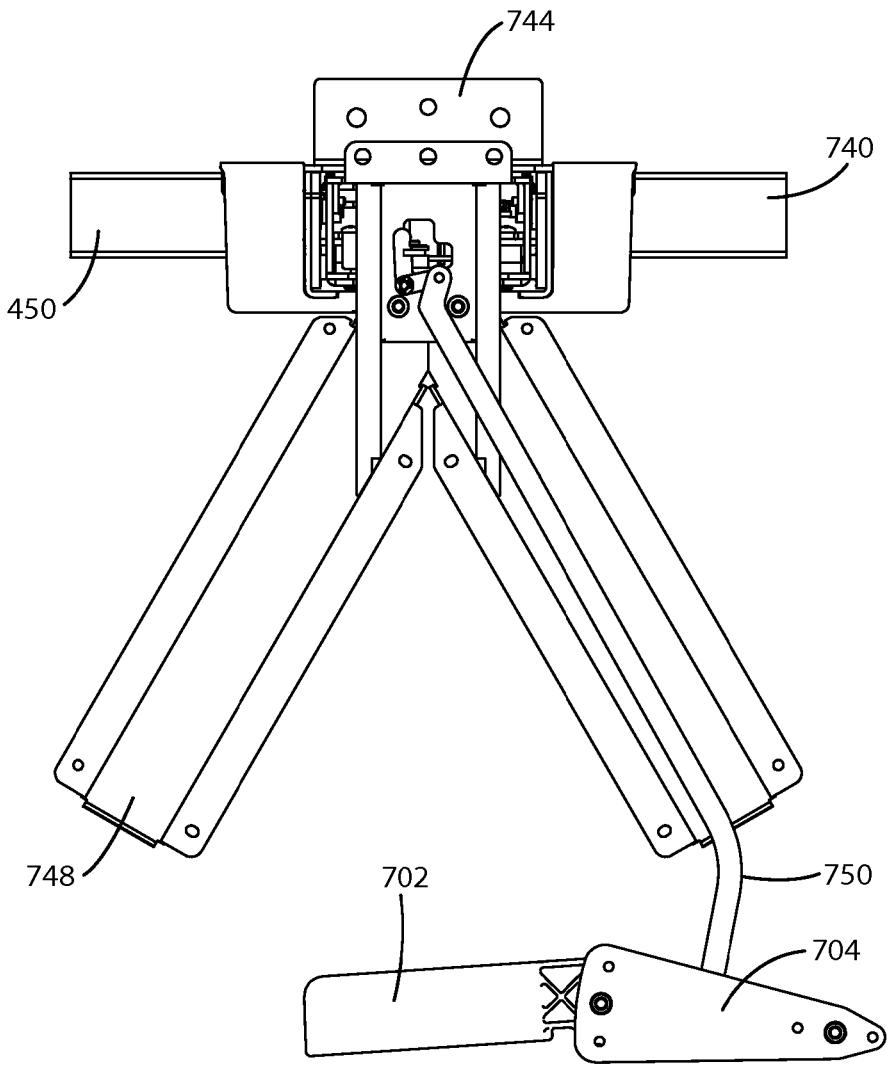
FIG. 83 is a plan view of the adjustable table mechanism shown in FIG. 82, and further showing the mechanism at a position which presents an uppermost or full up height for the table.
Figure 84:
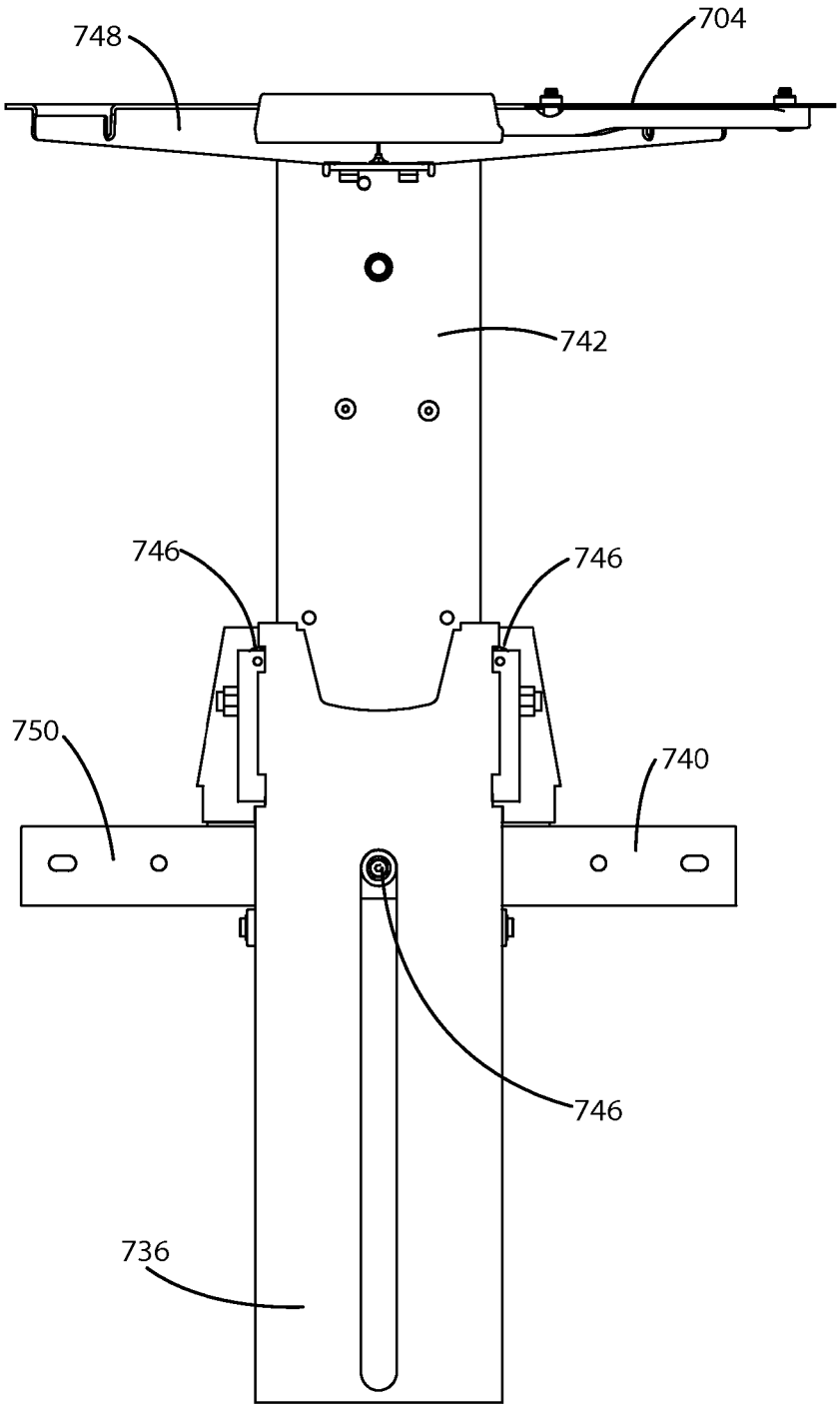
FIG. 84 is a front, elevation view of the adjustable table mechanism shown in FIG. 83, and further showing the mechanism for presenting the table height at an uppermost or full up position.
Figure 85:
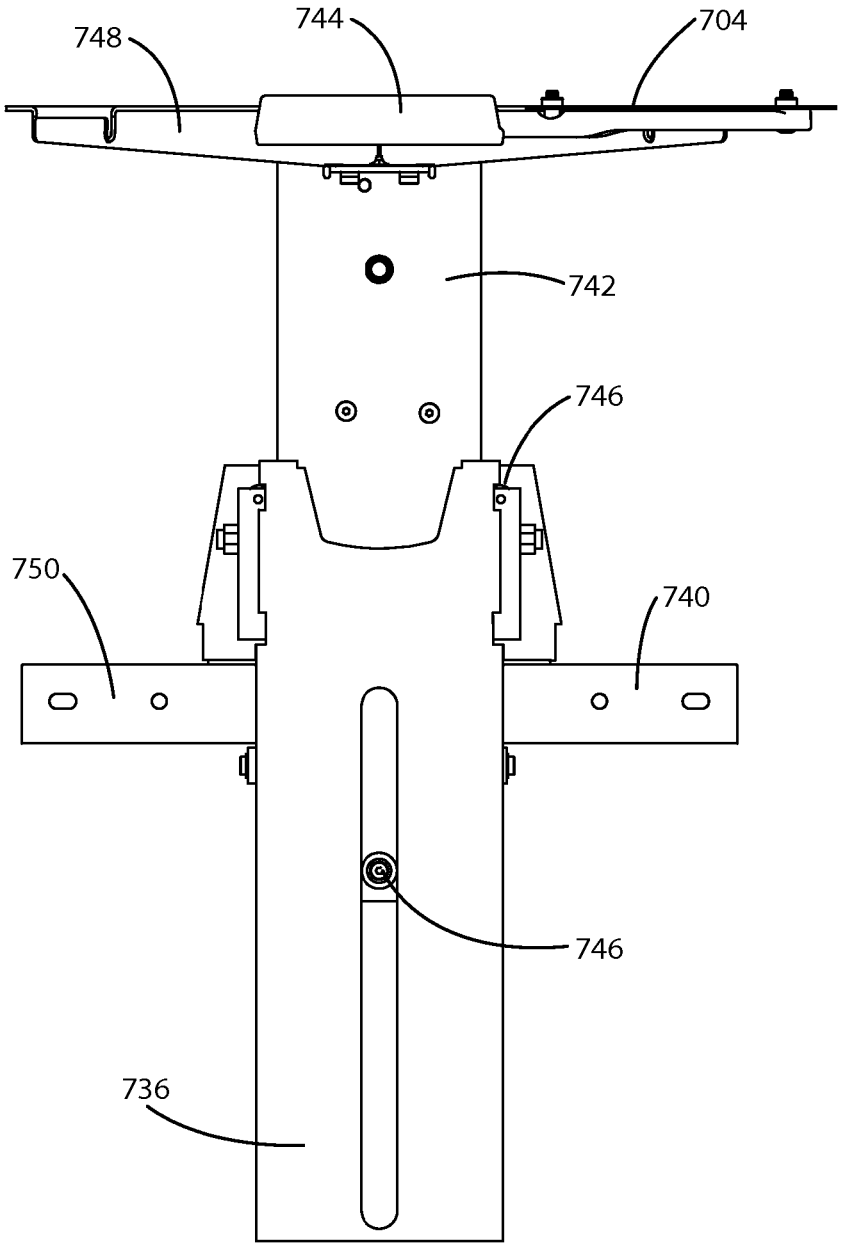
FIG. 85 is a front, elevation view of the adjustable table mechanism shown in FIG. 84, and further showing the mechanism in a position that presents the table at a middle level or "arm" height.
Figure 86:
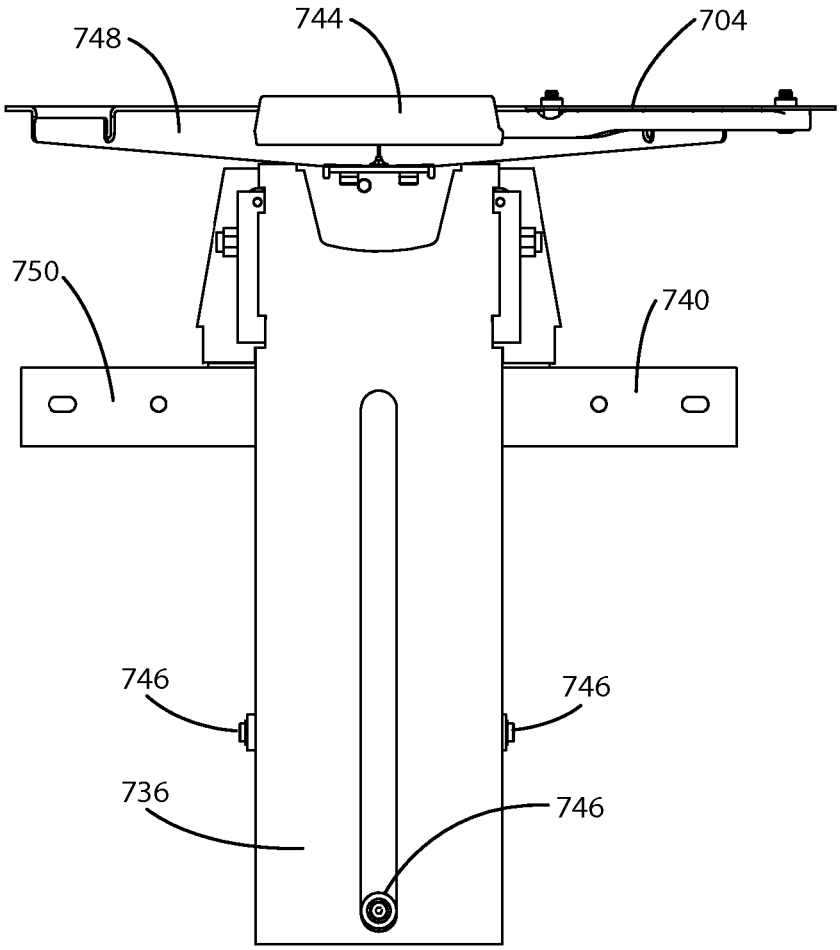
FIG. 86 is a front, elevation view of the adjustable table mechanism shown in FIG. 85, and in a position to present the seat at a lowermost or "full down" position.
Figure 87:
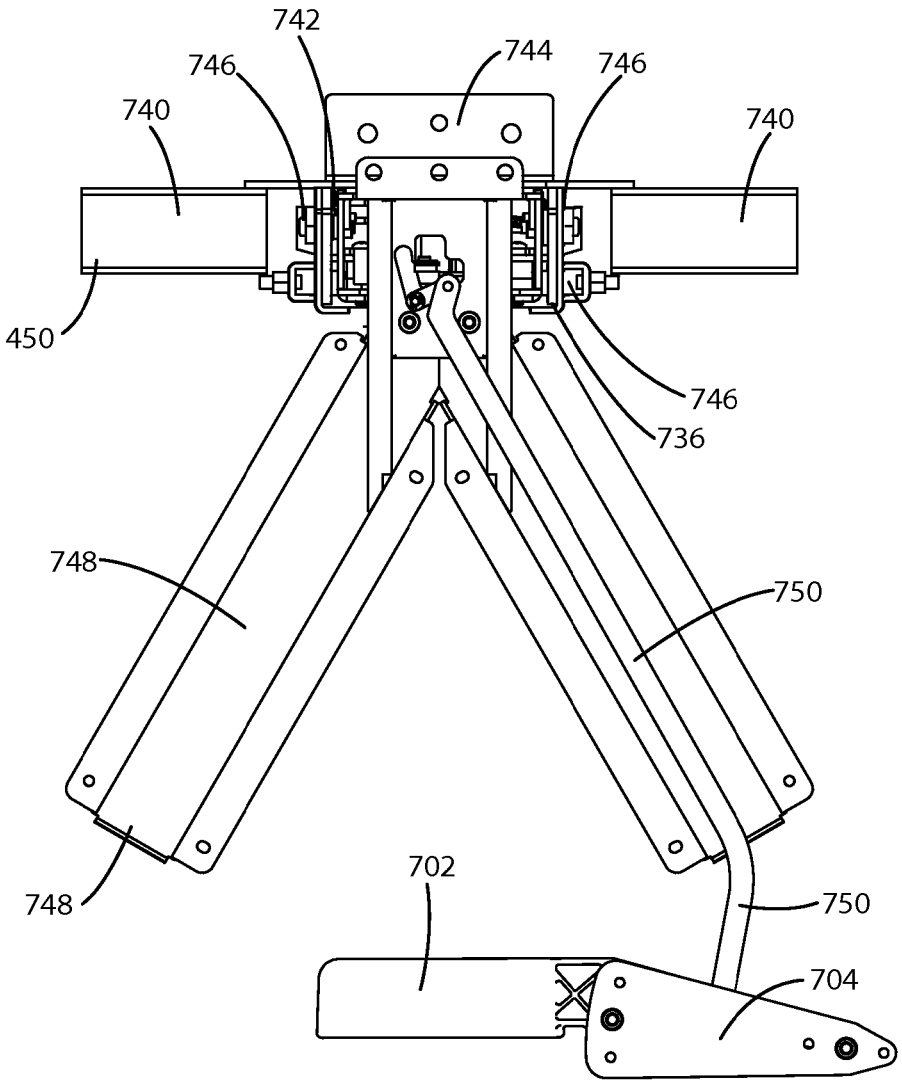
FIG. 87 is a plan view of the adjustable table mechanism shown in FIG. 86, and showing the positioning of the tabletop support assemblies.

The structural elements associated with the table assembly 700 and their functional interaction will now be described primarily with respect to FIGS. 77-87. In this regard, FIG. 77 essentially provides an underside view of the table assembly 700 and its relationship to various other components of the furniture system 600. FIGS. 78-87 are primarily directed to various views of the adjustable table mechanism or table assembly 700 as it appears for various states of the table assembly 700. With reference primarily to FIGS. 77 and 78, the table assembly 700 includes a horizontally disposed table top 701 having a table mechanism brake release handle 702 associated therewith. The brake release handle 702 can be characterized as an end user input device for disengaging the table mechanism brake through the use of the table mechanism brake link 750. The brake link forms a part of the table top support assembly 748 and essentially transfers motion of the table mechanism brake release handle 702 to the internal brake components of the table mechanism inner column assembly 742. The table mechanism brake release handle 702 is attached to the bottom of the table top 701 through the brake release handle attachment plate 704. In accordance with the foregoing, the table mechanism brake link 750 transfers the motion of the brake release handle 702 to the internal brake components of the table mechanism inner column assembly 742.

Attached to the top of the table mechanism inner column assembly 742 is the table top support assembly 748. The support assembly 748 is in the form of a cantilever support structure, with the table top 701 being attached thereto. The table mechanism inner column assembly 742 correspondingly forms the telescopic portion of the table mechanism itself. This assembly can include counter balance components, for assisting in overcoming the weight of the table top 701. The table top 701 and the table top support assembly 167 are also attached to this inner column assembly 742.

As expressly shown in FIG. 77, the table assembly 700 also includes a table mechanism cover 730. The table mechanism cover 730 essentially comprises a cosmetic piece, used to cover the top portion of the table mechanism outer column assembly 736. The table mechanism outer column assembly 736 can be characterized as the stationary portion of the table assembly 700 that interfaces with the frame work of the furniture assembly 600.

Positioned at the lower portion of the table assembly 700 are a pair of frame support brackets 720. The frame support brackets 720 operate so as to tie the outer back 612 and the universal frame mount together so as to significantly reduce torsonal forces when under load. This concept will be explained in greater detail herein.

The lower portion of the table assembly 700 also includes a table mechanism foot 732. The foot 732 provides for a floor support to the table assembly 700. Also located at the lower portion of the table assembly 700 is a table mechanism lower attachment bracket 738. The bracket 738 operates in association with a table mechanism leveling bolt housing 726. The bolt housing 726 is used in conjunction with the table mechanism leveling bolt 724 and table mechanism leveling nuts 725 for adjusting the level of the table top 701.

A number of the structural elements described in the foregoing paragraphs were shown in FIG. 77. FIGS. 78-87, showing the table adjustment mechanism in a standalone format show other elements of the table assembly 700. For example, FIG. 78 illustrates the structure and location of the table mechanism upper attachment bracket 740. This bracket (or series of brackets) are located in the table mechanism outer column assembly 736 and attached to the table assembly 700 to the frame work of the furniture system 600. Correspondingly, FIG. 78 illustrates the table mechanism lower attachment bracket 738. Still further, FIG. 78 illustrates a set of table mechanism guide bearings 746. These guide bearings 746 are located within the table mechanism outer column assembly 736 and guide the table mechanism inner column assembly 742 through its motion.

The operation of the table assembly 700 will now be briefly summarized. Specifically, the release handle attachment plate 704 is attached securely to the bottom side of the table top 701. Correspondingly, the table mechanism brake release handle 702 is mounted to and pivots on the release handle attachment plate 704. The table mechanism brake link 750 is attached to the table mechanism brake release handle 702. The table mechanism brake link 750 connects to a conventional brake locking mechanism which is located within the cable mechanism inner column assembly 742. Correspondingly, the inner column assembly 742 engages the table mechanism outer column assembly 736. This mechanism therefore locks the table mechanism inner column assembly 742 and table mechanism outer column assembly 736 together at the three specific heights, namely seat height, arm height and table height. To adjust the height of the table, the table mechanism brake release handle 702 can be pulled forward, thereby disengaging the brake mechanism. This disengagement allows the table top 701 to be moved up or down to one of the three desired positions.

Another feature associated with the table assembly 700 in accordance with certain concepts of the invention relates to leveling features. Specifically, for purposes of leveling, a table mechanism leveling bolt housing 726 is used with the leveling bolt 724 and leveling nuts 725. The leveling bolt housing 726 is attached to the outer back 12. The leveling nuts 725 are threaded onto the leveling bolt 724. The nut and bolt assembly is then slid into the table mechanism leveling bolt housing 726. The free end of the table mechanism leveling bolt 724 is attached to the table mechanism lower attachment bracket 738. Due to appropriate weight and leverages, the entire table assembly 700 essentially creates a state of constant pressure between the table mechanism leveling bolt 724, table mechanism leveling nuts 725 and the table mechanism leveling bolt housing 726. The leveling function is performed by manually turning the two table mechanism leveling nuts 725. This action, dependent on the direction of turn, will increase or decrease the distance between the outer back 612 and the table mechanism lower attachment bracket 738. This increase or decrease in distance will proportionally translate to the angle of the table top 701.

Other features in accordance with the invention include structure which will tend to reduce the effect of splaying of the seat cushions 628 when weight is applied to the table top 701. Specifically, this feature is accomplished in part through the use of frame support bracket 720. As earlier described, the frame support bracket 720 ties together the outer back 612 and what can be characterized as the universal frame mount, which is the entirety of the interface between the arms, frame components and optional components (such as drawers, ottomans, blank panels and the like). When weight is applied to the table top 701, it translates into a torsional force which tends to splay the seat cushions 628. Also, not only are the seat cushions 628 splayed outward, but also splayed outwardly is the frame work to which they are attached. That is, the distance between the outer back 620 and the universal frame increases when a given force is applied to the table top 701. The frame support bracket 720 reduces this splaying effect by transferring these torsional forces to the rigid frame of the outer back 612.

Figure 94:
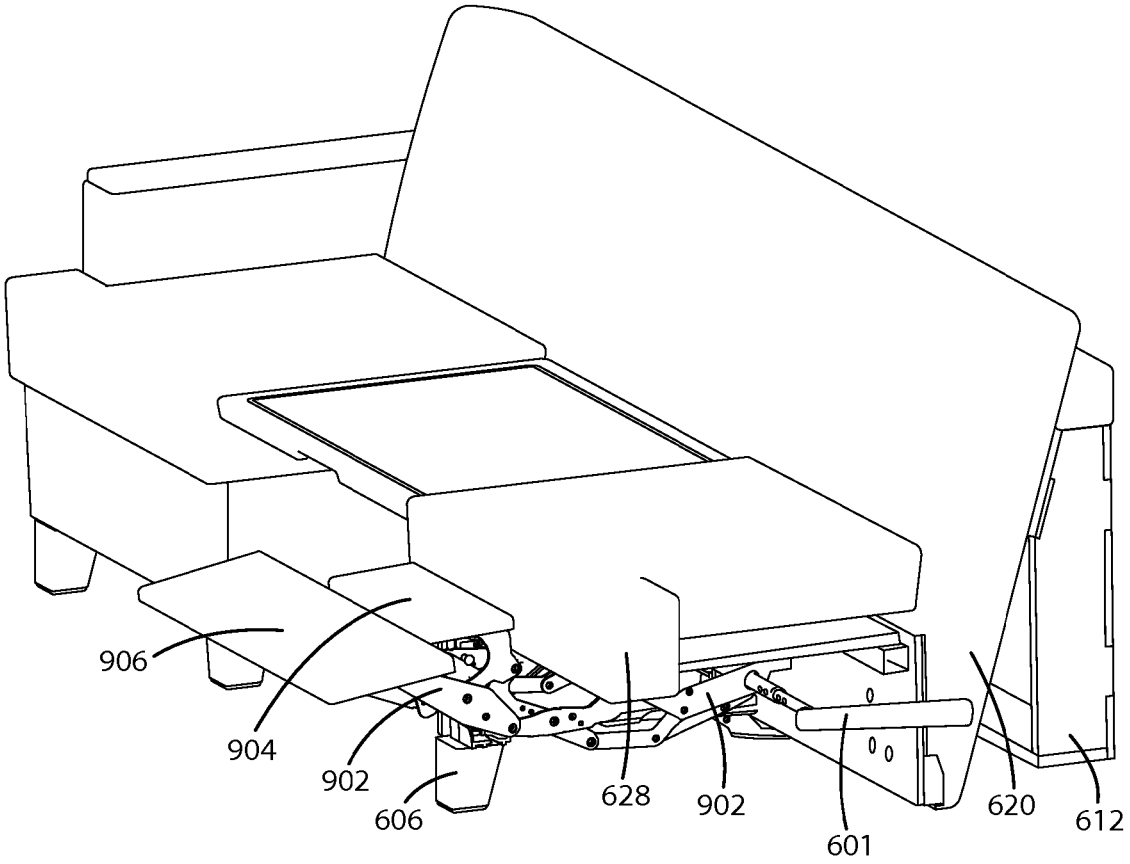
FIG. 94 is a right, front perspective view of the foot assembly shown in FIG. 93.
Figure 95:
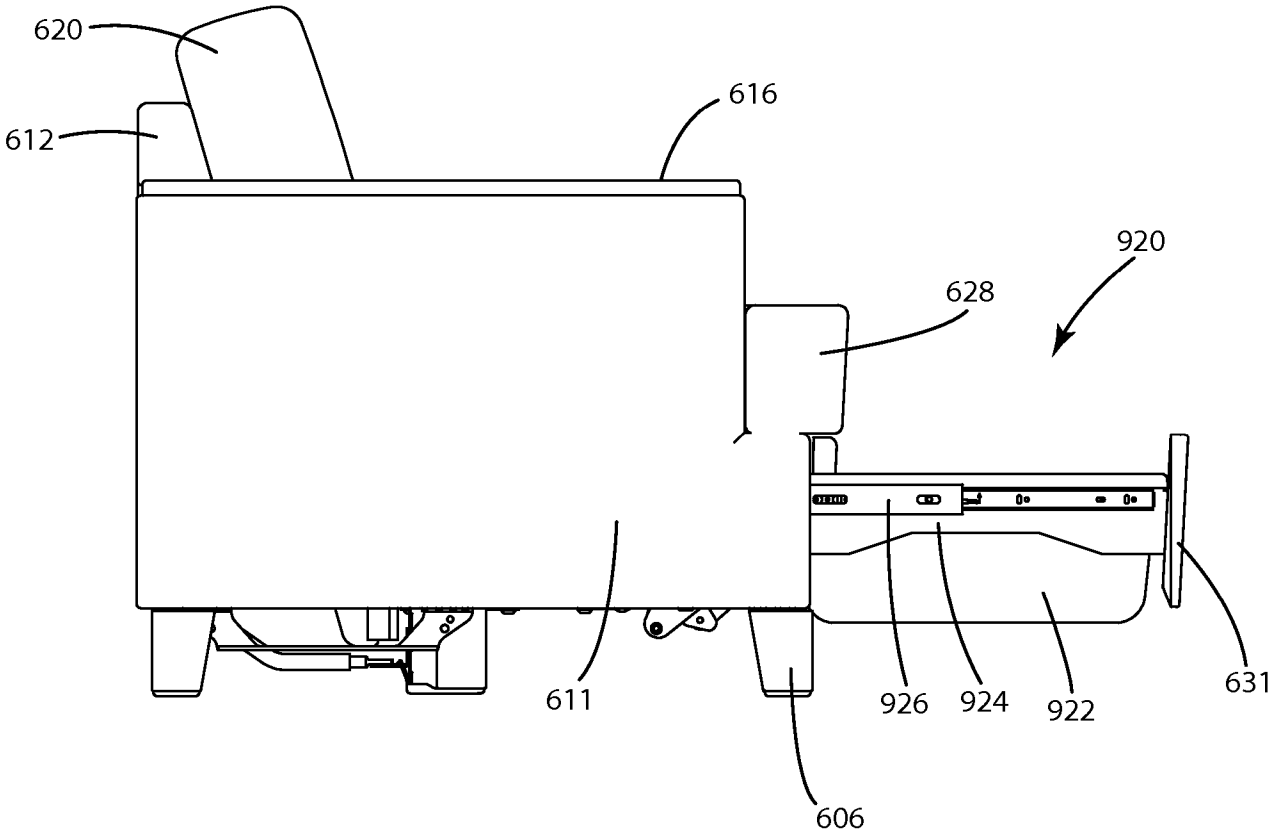
FIG. 95 is a left-side elevation view of the furniture system shown in FIG. 94, when the drawer assembly is extended.

As earlier described, one of the features of furniture systems in accordance with the invention relates to the capability of providing for what can be characterized as "peripheral" accessories. For example, and as earlier described, the furniture system 600 may include an ottoman assembly. Such an assembly is shown in FIGS. 94 and 95. With reference thereto, an ottoman assembly 900 is shown as being incorporated within the furniture system 600. The ottoman assembly 900 itself can be conventional in nature and include well known and commercially available ottoman mechanism assemblies 902. Other elements of FIGS. 93 and 94 referenced by numerals have been previously described herein, except for the various ottoman mechanism assemblies 902, the calf rest 904 and foot rest 906. The ottoman assembly 900 can be made so as to be hidden from view under one of the seat cushions 628, and then extended as desired through the use of the ottoman lever 601. Of course, furniture systems in accordance with the invention can include one or more ottomans, or none whatsoever.

Figure 96:
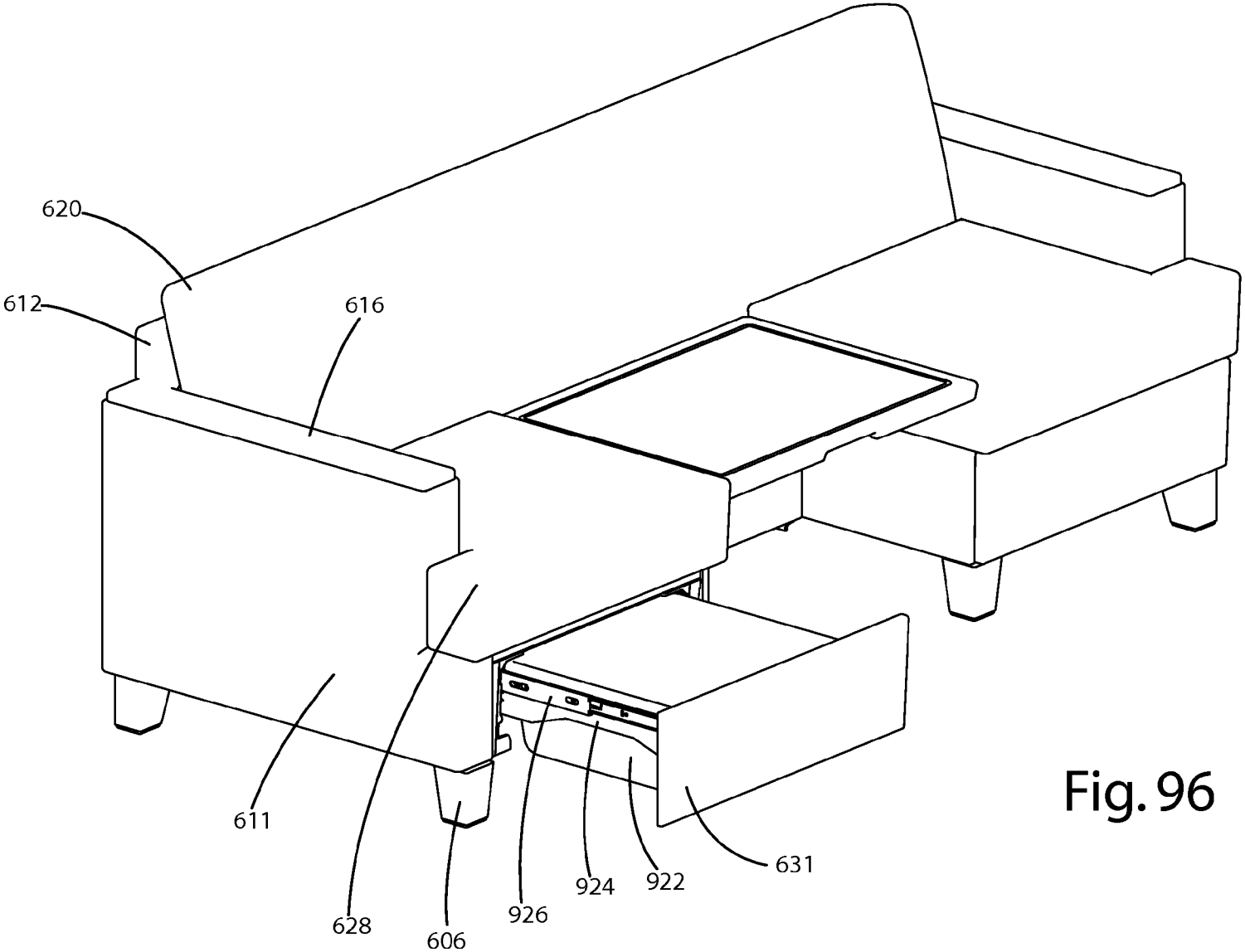
FIG. 96 is a left-side, front perspective view of the furniture system shown in FIG. 95, with the drawer assembly extended and the table in a lowermost position.
Figure 97:
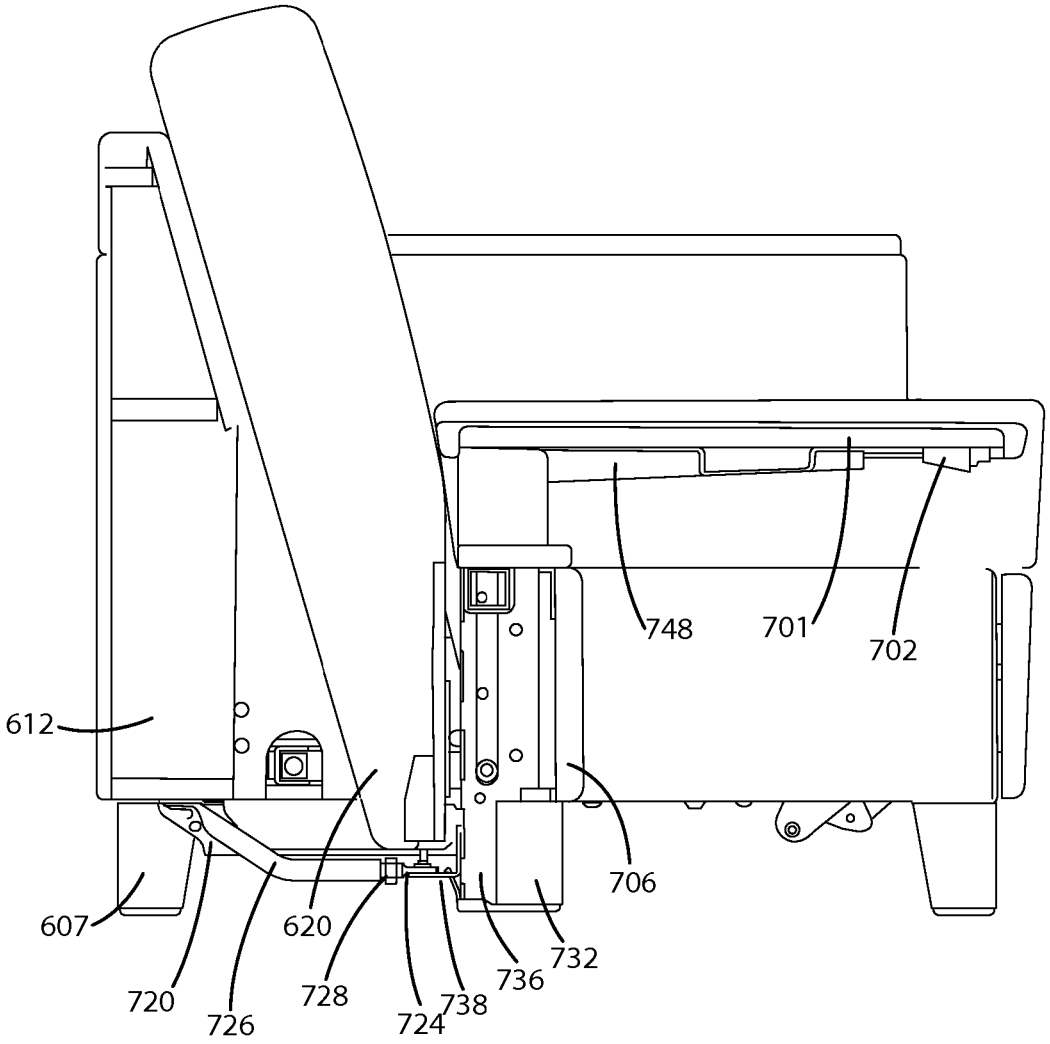
FIG. 97 is a left-side elevation view, shown in a partially cutaway portion so as to illustrate the leveling mechanism for the adjustable table mechanism.
Figure 98:
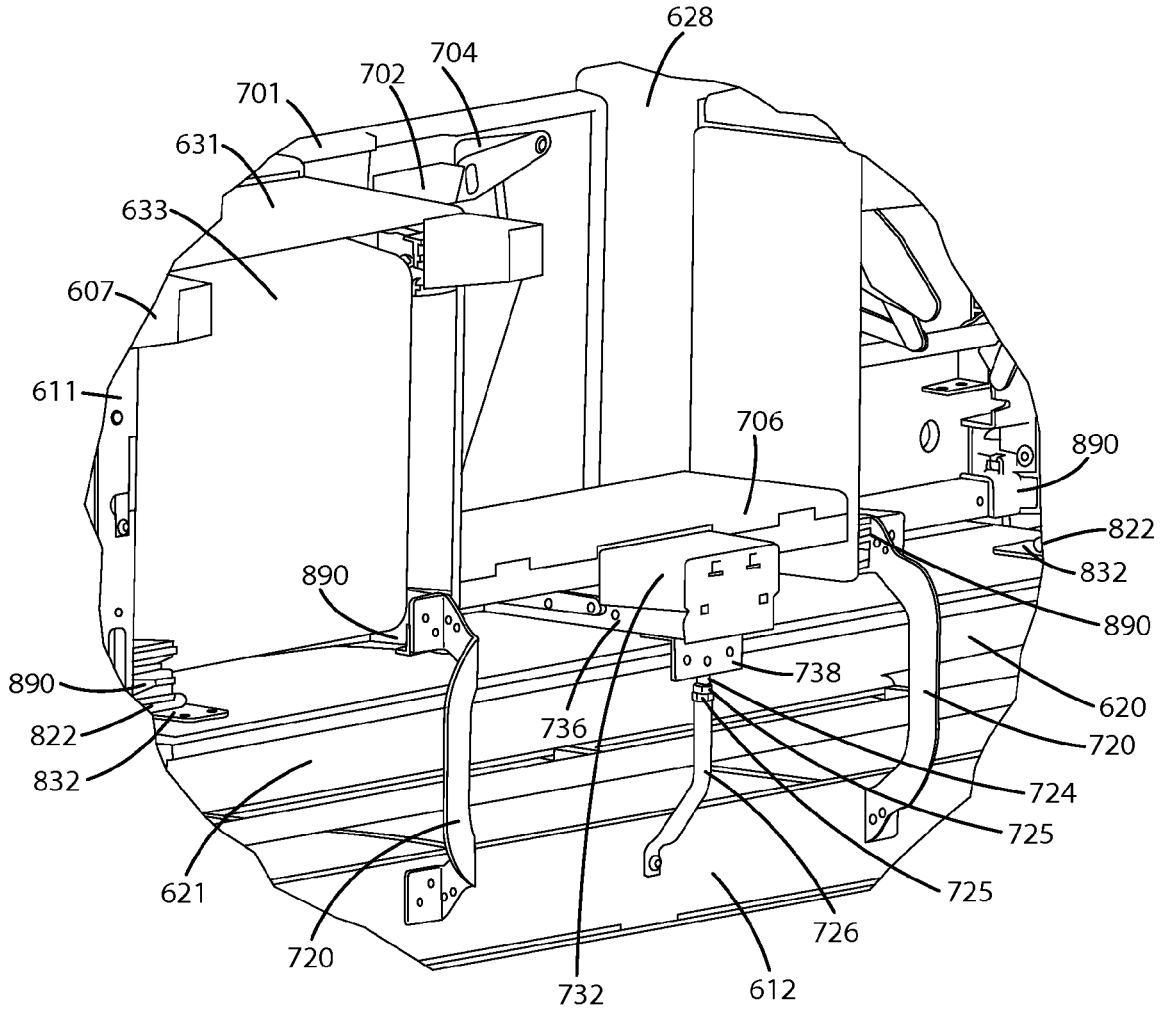
FIG. 98 is a rear, perspective view of the furniture system shown in FIG. 97, and further showing details of the table mechanism leveling system.
Figure 99:
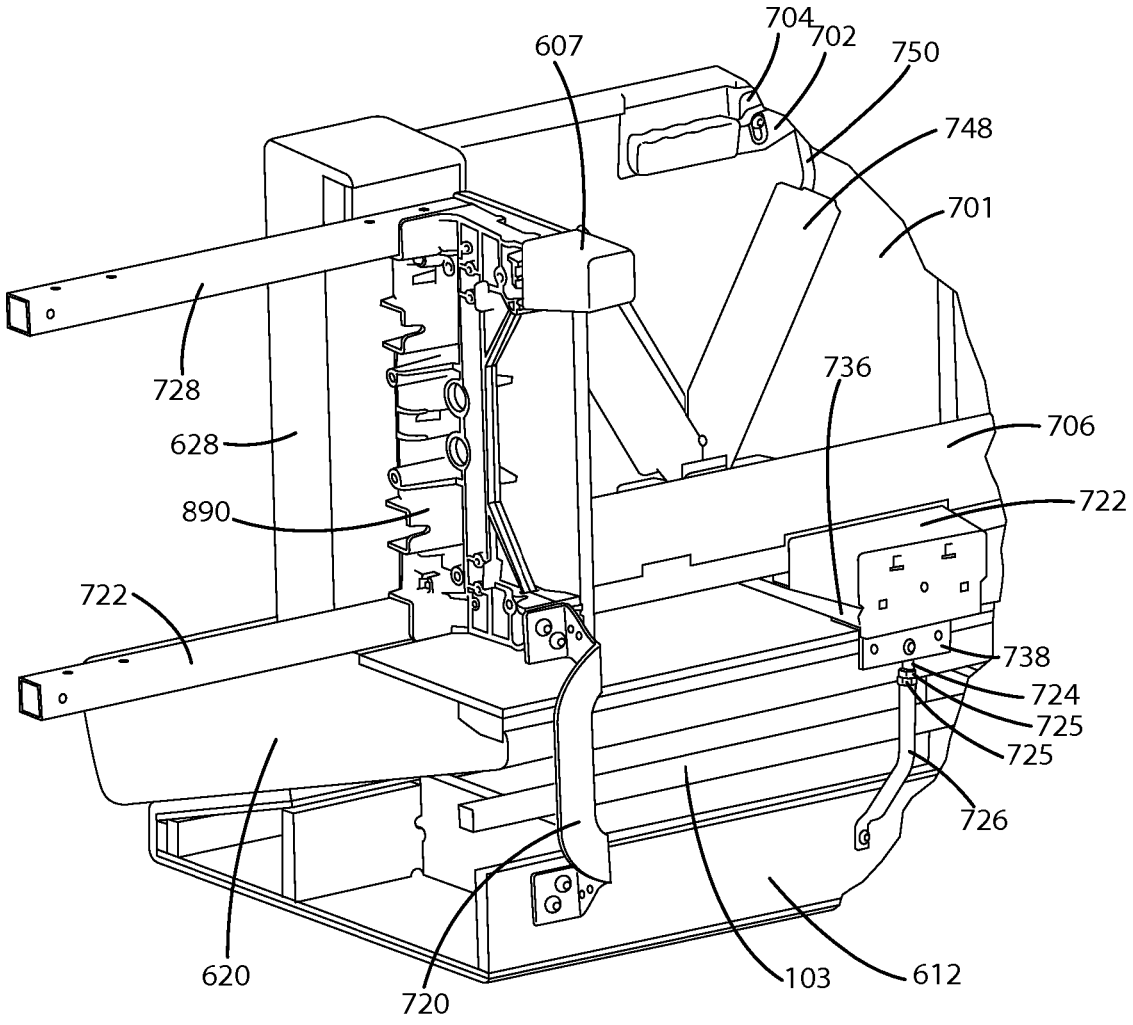
FIG. 99 is a rear, perspective view of a portion of the furniture system shown in FIG. 98, and further showing the configuration of the frame support bracket.

In addition to the ottoman assemblies 900, the furniture system 600 can also include drawer assemblies as also previously described herein. As an example, FIGS. 95 and 96 illustrate a conventional drawer assembly 920 in an extended position. The drawer assembly 920 is shown as having a drawer tub 922, formed within a drawer frame 924. A conventional and commercially available drawer slide 926 can be utilized to extend and retract the drawer assembly 920.

In accordance with the foregoing, extremely comfortable and versatile seating arrangements have been provided as furniture systems in accordance with the invention, with certain of the furniture systems combining and adding the needs of desking and sleeping into a single space-efficient furniture unit. In this manner, a virtual "family room" can be provided inside, for example, a hospital patient room. This furniture system provides versatility, while continuing to maintain a small, compact footprint that does not encroach upon any "working space" of the hospital room. That is, hospital staff can move effortlessly about, even while in emergency situations, with the family and friends warmly and comfortably embraced within the furniture system. It is this novel combination of functionality which forms the basis of a number of the concepts of the invention. Such functionality includes the integration of seating, work surface/desking and sleep configurations. Also, certain furniture systems in accordance with invention include integrated footrests or ottomans, as well as integrated storage. Conversion between a sitting configuration and a sleep configuration is provided within the furniture system's own footprint. Still further, the sleep surface provided by the back front surface 410 is separate from the sitting surface provided by the seats 424. Also, the conversion mechanisms, such as the linkage mechanism 470, are concealed within the arms 428. Still further, and as previously described, the seats 424 provide for alternative seating positions, including a forward position and a sideways position. In addition, the desk or work surface essentially converts to a working position, without moving out of the footprint of the furniture systems.

It will be apparent to those skilled in the pertinent arts that other embodiments of furniture systems in accordance with the invention, including sleep systems with various combinations, can be designed. That is, the principles of furniture systems in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A standalone furniture assembly adapted for conversion between various configurations, the assembly comprising:

a supporting frame;

a seat supported by the supporting frame and having an upper surface on which a user may sit when the assembly is in a sitting configuration;

a back supported by the supporting frame and movable to cover the seat when the assembly is in a sleep configuration;

a horizontal table; and a table mechanism coupled to the horizontal table and to the supporting frame;

wherein the table mechanism is operable to move the horizontal table between at least two operable positions relative to the supporting frame, a first position at a first horizontal table height and a second position at a second horizontal table height different than the first horizontal table height.

2. A standalone furniture assembly in accordance with claim 1, characterized in that the table mechanism is further operable to lower the horizontal table to a sleep position as the [system assembly] *standalone furniture assembly* is moved from the sitting configuration to the sleep configuration.

3. A standalone furniture assembly in accordance with claim 1, characterized in that either the first position or the second position of the table is a position which permits users located to the sides of the table to sit on the [system assembly] *standalone furniture assembly* with their knees comfortably positioned under the horizontal table.

4. A standalone furniture assembly in accordance with claim 1, characterized in that a foot print of the standalone furniture assembly is maintained as a predetermined foot print independent of the particular one of said configurations at any given time, including being independent of any particular table position at any given time.

5. A standalone furniture assembly in accordance with claim 4, characterized in that when the standalone furniture assembly is in the sitting configuration, the [seats] *seat* of the standalone furniture assembly [remain] *remains* in the same position as [they exist] *it exists* when the standalone furniture assembly is in the sleep configuration.

6. A standalone furniture assembly in accordance with claim 1, characterized in that the table mechanism operates so as to store the horizontal table between opposing seats of the assembly, when the assembly is in the sleep configuration.

7. A standalone furniture assembly in accordance with claim 1, characterized in that the assembly comprises at least one integrated foot rest, movable between an extended position and a hidden, retracted position.

8. A standalone furniture assembly in accordance with claim 1, characterized in that the assembly comprises at least one drawer assembly, movable between an extended position, and a hidden, retracted position.

9. A standalone furniture assembly in accordance with claim 1, characterized in that when the assembly is in the sleep configuration, *the back further comprises* an inner back [functions] so as to provide a sleep surface for the user.

10. A standalone furniture assembly in accordance with claim 1, characterized in that the assembly comprises user actuated means coupled to a linkage mechanism for converting the [system assembly] *standalone furniture assembly* between configurations.

11. A standalone furniture assembly in accordance with claim 10, characterized in that the linkage mechanism comprises an assist cylinder activated by manual operations of the user so as to initially overcome inertial forces and initiate movement of an inner back when the sleep system is moving from [a] *the* sitting configuration to [a] *the* sleep configuration.

12. A standalone furniture assembly in accordance with claim 1, characterized in that the table mechanism comprises:

means attached to [a table top] *the horizontal table* and manually operable by the user for initiating release of the [table top] *horizontal table* from a functional position.

13. A convertible standalone furniture system assembly comprising:

at least one seat having an upper surface;

at least one back having a front surface and a rear surface, and wherein the least one back is movable between a sitting configuration where the front surface and the at least one seat are exposed and a sleep configuration where the rear surface is exposed and the at least one seat is not exposed;

a horizontal table operably positioned adjacent said at least one seat; and table mechanism coupled to the horizontal table wherein said table mechanism is operable to move the horizontal table between at least two operable positions, a first position at a first horizontal table height and a second position at a second horizontal table height different than the first horizontal table height.

14. The convertible furniture system assembly of claim 13 wherein [a] *the* first [of the at least two operable positions] *position* comprises the horizontal table being disposed at a seat height wherein an upper portion of the horizontal table is at or below a horizontal plane formed by an upper horizontal surface of the at least one seat.

15. The convertible furniture system assembly of claim 13 wherein [a] *the* second [of the at least two operable positions] *position* comprises the horizontal table being disposed at a horizontal table height wherein an upper portion of the horizontal table is above a horizontal plane formed by an upper horizontal surface of the at least one seat far enough for a user to sit on at least one seat with knees comfortably positioned under the horizontal table.

16. The convertible furniture system assembly of claim 13 wherein the horizontal table is positioned so that no portion thereof extends beyond a vertical plane defined by [the] *a* front *surface* of the at least one seat wherein the footprint of the convertible furniture system assembly will not change as the horizontal table is moved between at least two operable positions.

17. The standalone furniture assembly of claim 12 further comprising a table mechanism brake release handle mounted to and pivoting on a release handle attachment plate *coupled to the horizontal table*.

18. The standalone furniture assembly of claim 17 further comprising a table mechanism brake link attached to the table mechanism brake release handle.

19. The standalone furniture assembly of claim 18 wherein the table mechanism brake link connects to elements within a table mechanism inner column assembly.

20. The standalone furniture assembly of claim 19 wherein the table mechanism inner column assembly engages a table mechanism outer column assembly, with the [brake mechanism] *table mechanism brake line* locking the table mechanism column assemblies together at a plurality of desired functional positions.

*21. A standalone furniture assembly adapted for conversion between various configurations, comprising:*

*a supporting frame;*

*a seat supported by the supporting frame and having an upper surface on which a user may sit when the standalone furniture assembly is in a sitting configuration;*

*a back supported by the supporting frame and movable to cover the seat when the standalone furniture assembly is in a sleep configuration;*

*at least one linkage mechanism connecting one of the seat or the back to the supporting frame and operable to assist movement of the standalone furniture assembly between sitting and sleep configurations;*

*a horizontal table; and*

*a table mechanism coupled to the horizontal table and to the supporting frame, and operable to move the horizontal table between at least two operable positions relative to the supporting frame, a first position at a first horizontal table height and a second position at a second horizontal table height different than the first horizontal table height;*

*wherein the supporting frame, the seat, the back, and the horizontal table define a predetermined footprint that remains constant and does not change as the standalone furniture assembly converts between the sitting configuration and the sleep configuration, or as the horizontal table is moved between the first and second positions.*

*22. The standalone furniture assembly of claim 21 wherein the at least one linkage mechanism is hidden from view.*

*23. A standalone furniture assembly adapted for conversion between various configurations, comprising:*

*a right-side base and a left-side base spaced from each other;*

*a seat supported on each of the right-side base and the left-side base and having an upper surface on which a user may sit when the standalone furniture assembly is in a sitting configuration;*

*a back movable to cover the seats when the standalone furniture assembly is in a sleep configuration;*

*a horizontal table; and*

*a table mechanism coupled to the horizontal table and operable to move the horizontal table between at least two operable positions relative to the seats, a first position at a first horizontal table height above the space between the right-side base and the left-side base, and a second position at a second horizontal table height different than the first horizontal table height;*

*wherein the bases, the seats, the back, and the horizontal table define a predetermined footprint that remains constant and does not change as the standalone furniture assembly converts between the sitting configuration and the sleep configuration, or as the horizontal table is moved between the first and second positions.*

*24. The standalone furniture assembly of claim 23 wherein the horizontal table is dimensioned to fit between the seats in the second position.*

* * * * *